US012666039B2

(12) United States Patent
Ruiz Coll

(10) Patent No.: US 12,666,039 B2
(45) Date of Patent: Jun. 23, 2026

(54) CLUSTERING BVP CANDIDATES

(71) Applicant: Comcast Cable Communications, LLC, Philadelphia, PA (US)

(72) Inventor: Damian Ruiz Coll, Reston, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 29 days.

(21) Appl. No.: 18/658,185

(22) Filed: May 8, 2024

(65) Prior Publication Data

US 2024/0380895 A1 Nov. 14, 2024

Related U.S. Application Data

(60) Provisional application No. 63/464,871, filed on May 8, 2023.

(51) Int. Cl.
*H04N 19/14* (2014.01)
*H04N 19/105* (2014.01)
*H04N 19/176* (2014.01)

(52) U.S. Cl.
CPC ........... *H04N 19/14* (2014.11); *H04N 19/105* (2014.11); *H04N 19/176* (2014.11)

(58) Field of Classification Search
CPC .... H04N 19/105; H04N 19/14; H04N 19/176; H04N 19/52; H04N 19/593
See application file for complete search history.

(56) References Cited

U.S. PATENT DOCUMENTS

| | | | |
|---|---|---|---|
| 11,595,686 B2 | 2/2023 | Xu et al. | |
| 2022/0182664 A1* | 6/2022 | Xu | H04N 19/61 |
| 2025/0150599 A1* | 5/2025 | Deng | H04N 19/86 |

FOREIGN PATENT DOCUMENTS

| | | | |
|---|---|---|---|
| EP | 3253059 A1 | 12/2017 | |
| WO | 2019032765 A1 | 2/2019 | |
| WO | WO-2024220591 A2 * | 10/2024 | ............. H04N 19/13 |

OTHER PUBLICATIONS

JVET-AC0060-v2, Joint Video Experts Team (JVET) of ITU-T SG 16 WP 3 and ISO/IEC JTC 1/SC 29 29th Meeting, by teleconference, Jan. 11-20, 2023, Source: Ofinno, LLC, Title: EE2-3.4: BVP candidates clustering and BVD sign derivation for Reconstruction-Reordered IBC mode.

JVET-AC2025, Joint Video Experts Team (JVET) of ITU-T SG 16 WP 3 and ISO/IEC JTC 1/SC 29 29th Meeting, by teleconference, Jan. 11-20, 2023, Source: Editors, Title: Algorithm description of Enhanced Compression Model 8 (ECM 8).

Sep. 18, 2024—European Search Report—EP App. No. 24174925.8.

JVET-AA0070-v3, Joint Video Experts Team (JVET) of ITU-T SG 16 WP 3 and ISO/IEC JTC 1/SC 29 27th Meeting, by teleconference, Jul. 13-22, 2022, Source: Bytedance Inc., Title: EE2-3.2: Reconstruction-Reordered IBC for screen content coding.

(Continued)

*Primary Examiner* — Anner Holder

(74) *Attorney, Agent, or Firm* — Banner & Witcoff, Ltd.

(57) ABSTRACT

A flipping or non-flipping type of each BVP candidate in a candidate list may require correct classification/identification, for example, for correct reordering and accurate refinement A block vector predictor (BVP) candidate list may be adjusted to provide a more accurate prediction of a block vector (BV). A coder (e.g., encoder or decoder) may determine a final candidate list, for example, by pruning invalid candidates.

20 Claims, 25 Drawing Sheets

Example A:
Tagging IBC BVP Candidates in IBC Merge List:

| Candidate | BVP Type | Flip Type | TM cost |
|---|---|---|---|
| $BVP_1$ | $S_1 (A_0)$ | Non-Flip | H |
| $BVP_2$ | $S_2 (A_1)$ | H-Flip | B |
| $BVP_3$ | $S_3 (B_0)$ | V-Flip | F |
| $BVP_4$ | $S_4 (B_1)$ | Non-Flip | S |
| $BVP_5$ | $S_5 (B_2)$ | Non-Flip | M |
| $BVP_6$ | $H_3$ | V-Flip | P |
| $BVP_7$ | $H_5$ | H-Flip | A |
| $BVP_8$ | $H_9$ | V-Flip | K |
| $BVP_9$ | $H_{10}$ | Non-Flip | J |
| $BVP_{10}$ | $H_{12}$ | H-Flip | D |
| $BVP_{11}$ | $H_{13}$ | H-Flip | E |
| $BVP_{12}$ | $H_{17}$ | Non-Flip | G |
| $BVP_{13}$ | $H_{18}$ | V-Flip | C |
| $BVP_{14}$ | $H_{19}$ | Non-Flip | R |
| $BVP_{15}$ | $PW_1$ | Non-Flip | T |
| $BVP_{16}$ | $P_1$ | Non-Flip | Q |
| $BVP_{17}$ | $P_2$ | Non-Flip | I |
| $BVP_{18}$ | $P_3$ | Non-Flip | O |
| $BVP_{19}$ | $P_4$ | Non-Flip | L |
| $BVP_{20}$ | $P_5$ | Non-Flip | N |

Merge List (Size = 20)

S1...S5: Spatial Candidates
H1...Hn: HMVP Candidates
PW1: Pairwise Candidate
P1...Pn: Padding Candidates Reconstructed Region / Prediction Block / Template Non-Flip / Template H-Flip / Template V-Flip

(56)                    References Cited

OTHER PUBLICATIONS

JVET-AB0173-v3, Joint Video Experts Team (JVET) of ITU-T SG 16 WP 3 and ISO/IEC JTC 1/SC 29 28th Meeting, Mainz, DE, Oct. 20-28, 2022, Source: Ofinno, LLC, Title: AHG12: BVP candidates clustering and BVD sign derivation for Reconstruction-Reordered IBC mode.

JVET-X0133-v3, Joint Video Experts Team (JVET) of ITU-T SG 16 WP 3 and ISO/IEC JTC 1/SC 29 24th Meeting, by teleconference, Oct. 6-15, 2021, Source: Qualcomm Inc., Alibaba group, Title: EE2-related: MV candidate type-based ARMC, Accompanying PowerPoint.

JVET-Y0058, Joint Video Experts Team (JVET) of ITU-T SG 16 WP 3 and ISO/IEC JTC 1/SC 29 25th Meeting, by teleconference, Jan. 12-21, 2022, Source: Bytedance Inc., Title: EE2-3.13: Modifications of IBC Merge/AMVP List Construction.

JVET-Y0160, Joint Video Experts Team (JVET) of ITU-T SG 16 WP 3 and ISO/IEC JTC 1/SC 29 25th Meeting, by teleconference, Jan. 12-21, 2022, Source: Bytedance Inc., Title: EE2-3.13-related: Enlarged HMVP table for IBC.

JVET-Z0075, Joint Video Experts Team (JVET) of ITU-T SG 16 WP 3 and ISO/IEC JTC 1/SC 29 26th Meeting, by teleconference, Apr. 20-29, 2022, Source: Bytedance Inc., Title: EE2-3.3: Enlarged HMVP table for IBC.

JVET-Z0084-v1, Joint Video Experts Team (JVET) of ITU-T SG 16 WP 3 and ISO/IEC JTC 1/SC 29 26th Meeting, by teleconference, Apr. 20-29, 2022, Source: InterDigital, Title: EE2-3.4: IBC with Template Matching.

JVET-Z0159-v1, Joint Video Experts Team (JVET) of ITU-T SG16 WP3, 26th Meeting, by teleconference, Apr. 20-29, 2022, Source: Bytedance Inc., Title: Non-EE2: Reconstruction-Reordered IBC for screen content coding, Accompanying PowerPoint.

JVET-Z0165-v3, Joint Video Experts Team (JVET) of ITU-T SG 16 WP 3 and ISO/IEC JTC 1/SC 29 26th Meeting, by teleconference, Apr. 20-29, 2022, Source: Bytedance Inc., Title: EE2-3.6: Combination tests of EE2-3.2+EE2-3.3+EE2-3.4+EE2-3.5.

* cited by examiner

Horizontal Ternary Tree Partition
608

Vertical Ternary Tree Partition
606

Horizontal Binary Tree Partition
604

Vertical Binary Tree Partition
602

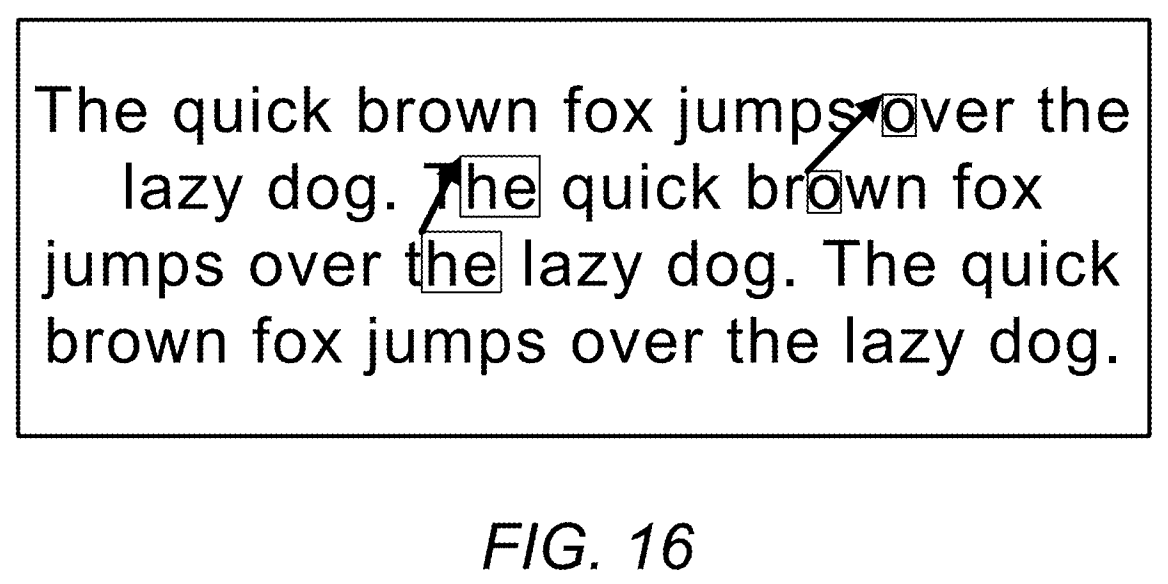

The quick brown fox jumps over the lazy dog. The quick brown fox jumps over the lazy dog. The quick brown fox jumps over the lazy dog.

*FIG. 16*

Example C:
Identification of BVP Candidate Flipping Types for IBC Merge Modes:

| | Regular IBC Merge List | IBC-TM Refined Merge List | IBC-MBVD Refined Merge List |
|---|---|---|---|
| Spatial BVPs | Non-Flip & *Flip* | Non-Flip | Non-Flip |
| HMVP BVPs | Non-Flip & *Flip* | Non-Flip | Non-Flip & *Flip* |
| Pairwise BVPs | Non-Flip | Non-Flip | Non-Flip |
| Reorder based on Flip Mode | Yes | No | HMVP only |
| Refine based on Flip Mode | --- | No | Yes |

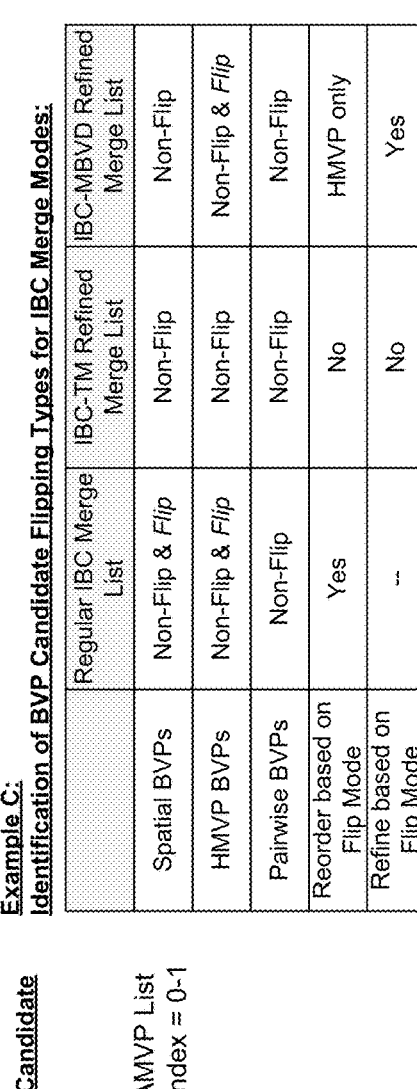

Example B:
Final BVP Merge Candidate List:

S1, S5 — AMVP List Index = 0-1

S1, S5, H3, PW, P2, P3 — Merge List Index = 0-5

Example A:
Initial BVP Merge Candidate List:

S1 ($A_0$), S2 ($A_1$), S3 ($B_0$), S4 ($B_1$), S5 ($B_2$) — AMVP List (Size = 6)

H1 ... Hn, PW1, P1 ... Pn — Merge List (Size = 28)

S1...S5: Spatial Candidates
H1...Hn: HMVP Candidates
PW1: Pairwise Candidate
P1...Pn: Padding Candidates

*FIG. 18B*

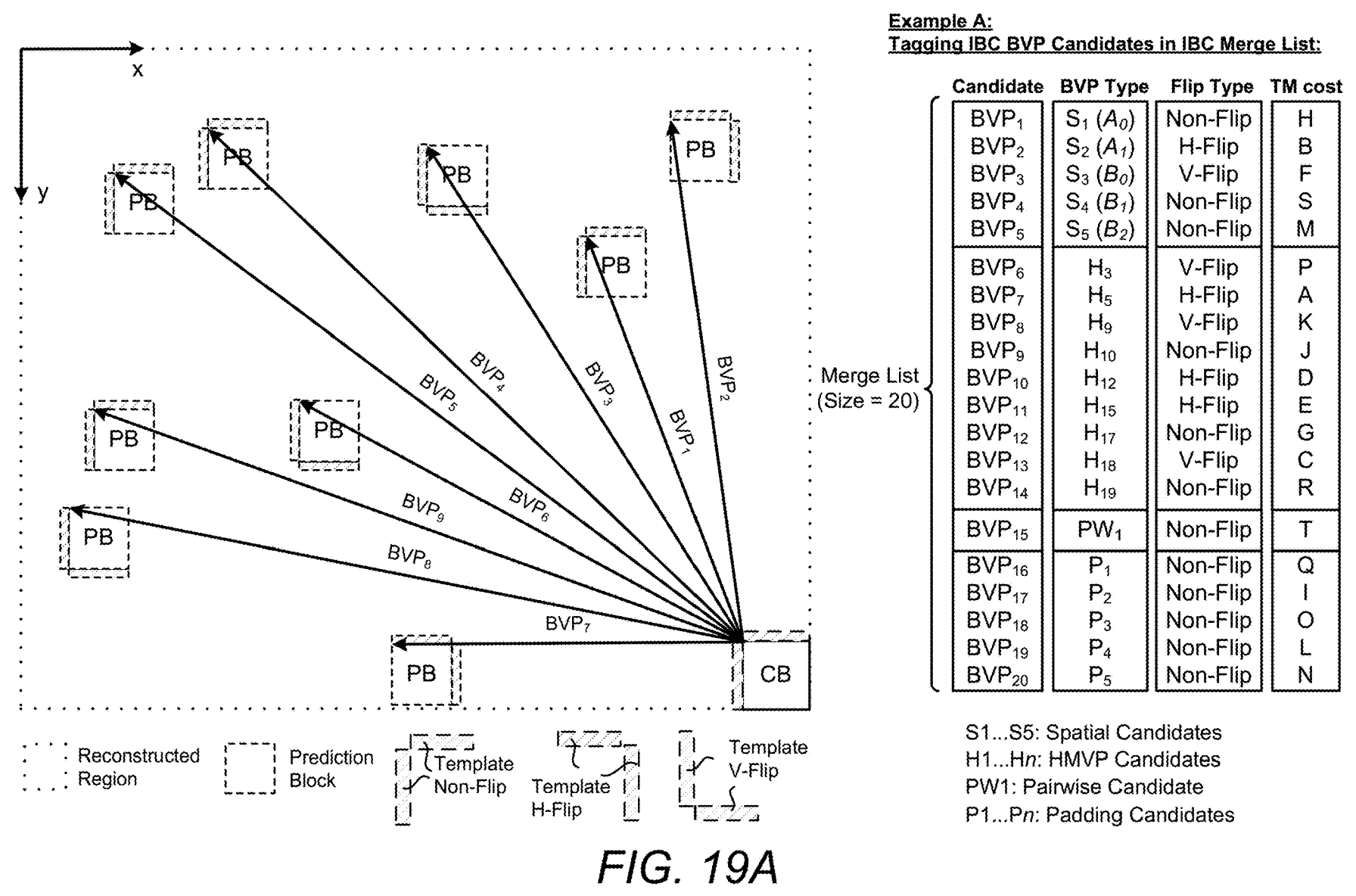

Example A:
Tagging IBC BVP Candidates in IBC Merge List:

| Candidate | BVP Type | Flip Type | TM cost |
|---|---|---|---|
| BVP_1 | S_1 (A_0) | Non-Flip | H |
| BVP_2 | S_2 (A_1) | H-Flip | B |
| BVP_3 | S_3 (B_0) | V-Flip | F |
| BVP_4 | S_4 (B_1) | Non-Flip | S |
| BVP_5 | S_5 (B_2) | Non-Flip | M |
| BVP_6 | H_3 | V-Flip | P |
| BVP_7 | H_5 | H-Flip | A |
| BVP_8 | H_9 | V-Flip | K |
| BVP_9 | H_10 | Non-Flip | J |
| BVP_10 | H_12 | H-Flip | D |
| BVP_11 | H_15 | H-Flip | E |
| BVP_12 | H_17 | Non-Flip | G |
| BVP_13 | H_18 | V-Flip | C |
| BVP_14 | H_19 | Non-Flip | R |
| BVP_15 | PW_1 | Non-Flip | T |
| BVP_16 | P_1 | Non-Flip | Q |
| BVP_17 | P_2 | Non-Flip | I |
| BVP_18 | P_3 | Non-Flip | O |
| BVP_19 | P_4 | Non-Flip | L |
| BVP_20 | P_5 | Non-Flip | N |

Merge List
(Size = 20)

S1...S5: Spatial Candidates
H1...Hn: HMVP Candidates
PW1: Pairwise Candidate
P1...Pn: Padding Candidates

BVP_2
BVP_1
BVP_3
BVP_4
BVP_5
BVP_6
BVP_9
BVP_8
BVP_7

PB
CB

Template
V-Flip

Template
H-Flip

Template
Non-Flip

Prediction
Block

Reconstructed
Region

*FIG. 19A*

Example A:
Tagging of IBC BVP Candidates in IBC Merge List:

| | | | |
|---|---|---|---|
| BVP$_1$ | S$_1$ (A$_0$) | Non-Flip | H |
| BVP$_2$ | S$_2$ (A$_1$) | H-Flip | B |
| BVP$_3$ | S$_3$ (B$_0$) | V-Flip | F |
| BVP$_4$ | S$_4$ (B$_1$) | Non-Flip | S |
| BVP$_5$ | S$_5$ (B$_2$) | Non-Flip | M |
| BVP$_6$ | H$_3$ | V-Flip | P |
| BVP$_7$ | H$_5$ | H-Flip | A |
| BVP$_8$ | H$_9$ | V-Flip | K |
| BVP$_9$ | H$_{10}$ | Non-Flip | J |
| BVP$_{10}$ | H$_{12}$ | H-Flip | D |
| BVP$_{11}$ | H$_{15}$ | H-Flip | E |
| BVP$_{12}$ | H$_{17}$ | Non-Flip | G |
| BVP$_{13}$ | H$_{18}$ | V-Flip | C |
| BVP$_{14}$ | H$_{19}$ | Non-Flip | R |
| BVP$_{15}$ | PW$_1$ | Non-Flip | T |
| BVP$_{16}$ | P$_1$ | Non-Flip | Q |
| BVP$_{17}$ | P$_2$ | Non-Flip | I |
| BVP$_{18}$ | P$_3$ | Non-Flip | O |
| BVP$_{19}$ | P$_4$ | Non-Flip | L |
| BVP$_{20}$ | P$_5$ | Non-Flip | N |

Example B:
IBC Merge List Reordering based on TM cost:

| | | | |
|---|---|---|---|
| BVP$_7$ | H$_5$ | H-Flip | A |
| BVP$_2$ | S$_2$ (A$_1$) | H-Flip | B |
| BVP$_{13}$ | H$_{18}$ | V-Flip | C |
| BVP$_{10}$ | H$_{12}$ | H-Flip | D |
| BVP$_{11}$ | H$_{15}$ | H-Flip | E |
| BVP$_3$ | S$_3$ (B$_0$) | V-Flip | F |
| BVP$_{12}$ | H$_{17}$ | Non-Flip | G |
| BVP$_1$ | S$_1$ (A$_0$) | Non-Flip | H |
| BVP$_{17}$ | P$_2$ | Non-Flip | I |
| BVP$_9$ | H$_{10}$ | Non-Flip | J |
| BVP$_8$ | H$_9$ | V-Flip | K |
| BVP$_{19}$ | P$_4$ | Non-Flip | L |
| BVP$_5$ | S$_5$ (B$_2$) | Non-Flip | M |
| BVP$_{20}$ | P$_5$ | Non-Flip | N |
| BVP$_{18}$ | P$_3$ | V-Flip | O |
| BVP$_6$ | H$_3$ | Non-Flip | P |
| BVP$_{16}$ | P$_1$ | Non-Flip | Q |
| BVP$_{14}$ | H$_{19}$ | Non-Flip | R |
| BVP$_4$ | S$_4$ (B$_1$) | Non-Flip | S |
| BVP$_{15}$ | PW$_1$ | Non-Flip | T |

Example C:
IBC Merge List Cluster Selection:

| | | | |
|---|---|---|---|
| BVP$_7$ | H$_5$ | H-Flip | A |
| BVP$_2$ | S$_2$ (A$_1$) | H-Flip | B |
| BVP$_{10}$ | H$_{12}$ | H-Flip | D |
| BVP$_{11}$ | H$_{15}$ | H-Flip | E |
| BVP$_{12}$ | H$_{17}$ | Non-Flip | G |
| BVP$_1$ | S$_1$ (A$_0$) | Non-Flip | H |

*FIG. 20B*

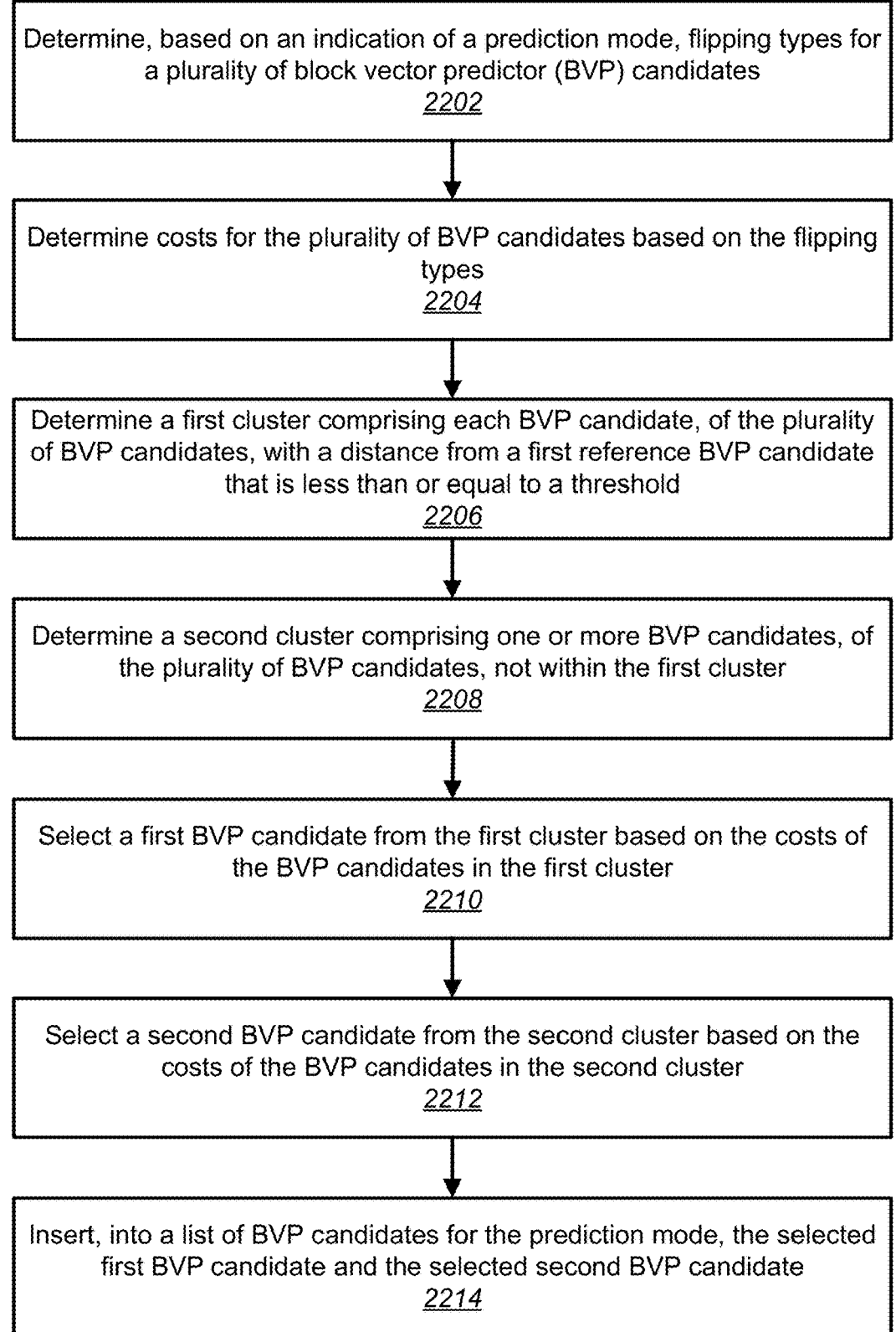

Determine, based on an indication of a prediction mode, flipping types for a plurality of block vector predictor (BVP) candidates
*2202*

Determine costs for the plurality of BVP candidates based on the flipping types
*2204*

Determine a first cluster comprising each BVP candidate, of the plurality of BVP candidates, with a distance from a first reference BVP candidate that is less than or equal to a threshold
*2206*

Determine a second cluster comprising one or more BVP candidates, of the plurality of BVP candidates, not within the first cluster
*2208*

Select a first BVP candidate from the first cluster based on the costs of the BVP candidates in the first cluster
*2210*

Select a second BVP candidate from the second cluster based on the costs of the BVP candidates in the second cluster
*2212*

Insert, into a list of BVP candidates for the prediction mode, the selected first BVP candidate and the selected second BVP candidate
*2214*

CLUSTERING BVP CANDIDATES

CROSS-REFERENCE TO RELATED APPLICATIONS

This application claims the benefit of U.S. Provisional Application No. 63/464,871 filed on May 8, 2023. The above referenced application is hereby incorporated by reference in its entirety.

BACKGROUND

A computing device processes video for storage, transmission, reception, and/or display. Processing a video comprises encoding and decoding, for example, to reduce a data size associated with the video.

SUMMARY

The following summary presents a simplified summary of certain features. The summary is not an extensive overview and is not intended to identify key or critical elements.

A video may comprise a sequence of frames displayed consecutively. A block vector predictor (BVP) candidate list may be adjusted to provide a more accurate prediction of a block vector (BV). A flipping or non-flipping type of each BVP candidate in a candidate list may require correct classification/identification, for example, for correct reordering and accurate refinement. Flipping types of BVP candidates may not be indicated correctly since the identification of BVP candidates may not be homogenous. Accordingly, incorrect BVP candidates may be pruned from the BVP candidate list.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 16 shows an example of intra block copy (IBC) for encoding.

FIG. 18B shows an example of constructing an initial BVP candidate list and a final BVP candidate list.

FIG. 19A shows an example of constructing an IBC merge BVP candidate list.

FIG. 20B shows an example of determining a plurality of clusters of BVP candidates.

FIG. 22 shows an example method for determining a list of BVP candidates for a prediction mode.

DETAILED DESCRIPTION

Figure 1:
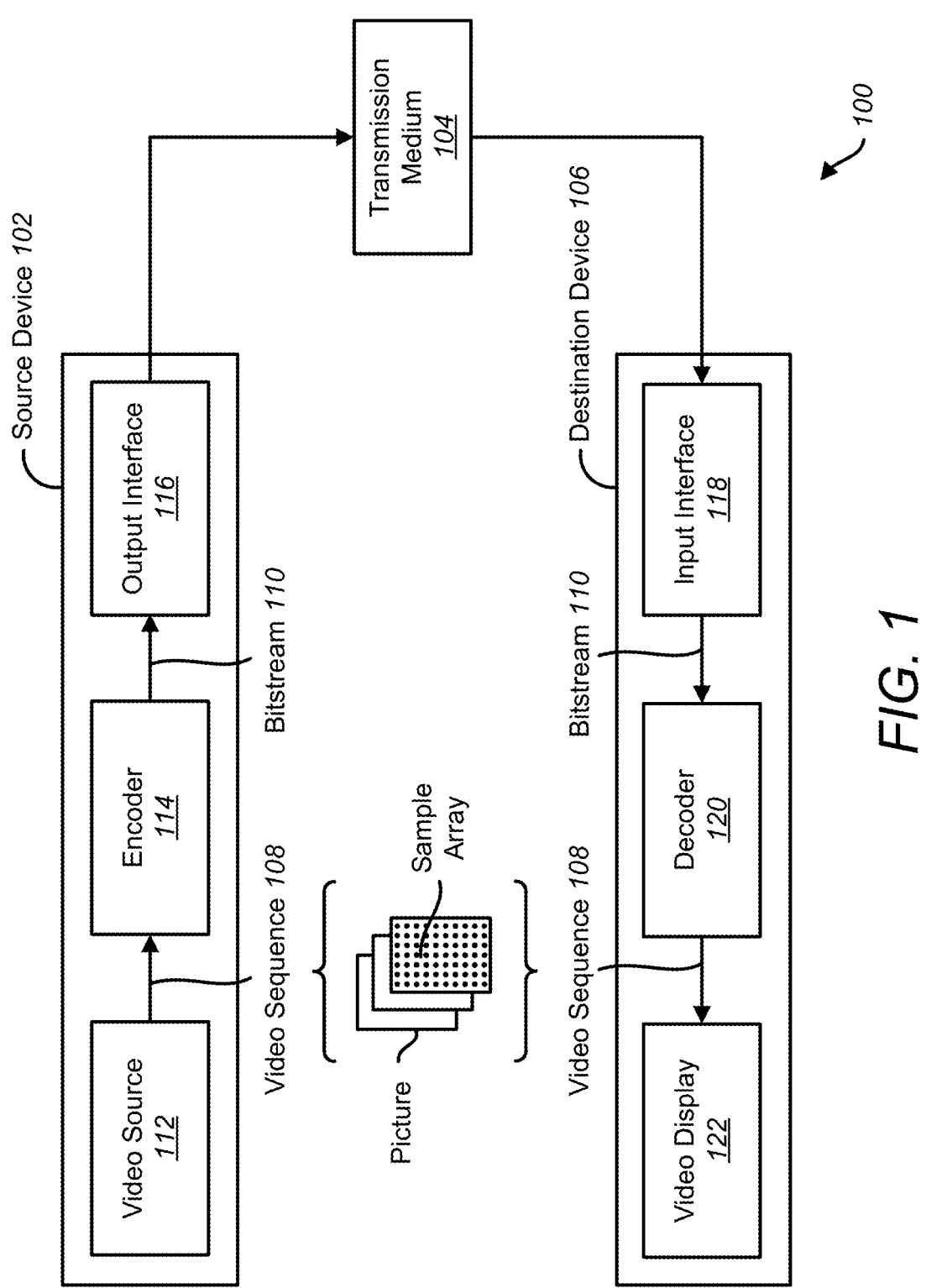
FIG. 1 shows an example video coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/reception. More particularly, the technology disclosed herein may relate to video compression as used in encoding and/or decoding devices and/or systems.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system. Video coding/decoding system 100 may comprise a source device 102, a transmission medium 104, and a destination device 106. The source device 102 may encode a video sequence 108 into a bitstream 110 for more efficient storage and/or transmission. The source device 102 may store and/or send/transmit the bitstream 110 to the destination device 106 via the transmission medium 104. The destination device 106 may decode the bitstream 110 to display the video sequence 108. The destination device 106 may receive the bitstream 110 from the source device 102 via the transmission medium 104. The source device 102 and/or the destination device 106 may be any of a plurality of different devices (e.g., a desktop computer, laptop computer, tablet computer, smart phone, wearable device, television, camera, video gaming console, set-top box, video streaming device, etc.).

The source device 102 may comprise (e.g., for encoding the video sequence 108 into the bitstream 110) one or more of a video source 112, an encoder 114, and/or an output interface 116. The video source 112 may provide and/or generate the video sequence 108 based on a capture of a natural scene and/or a synthetically generated scene. A synthetically generated scene may be a scene comprising computer generated graphics and/or screen content. The video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays may be possible based on different color schemes (e.g., a red, green, blue (RGB) color scheme). A pixel, in a color picture, may refer to/comprise/be associated with all intensity values (e.g., luma component, chroma components), for a given location, in the sample arrays used to represent color pictures. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

The encoder 114 may encode the video sequence 108 into the bitstream 110. The encoder 114 may apply/use (e.g., to encode the video sequence 108) one or more prediction techniques to reduce redundant information in the video sequence 108. Redundant information may comprise information that may be predicted at a decoder and need not be transmitted to the decoder for accurate decoding of the video sequence 108. For example, the encoder 114 may apply spatial prediction (e.g., intra-frame or intra prediction), temporal prediction (e.g., inter-frame prediction or inter prediction), inter-layer prediction, and/or other prediction techniques to reduce redundant information in the video sequence 108. The encoder 114 may partition pictures comprising the video sequence 108 into rectangular regions referred to as blocks, for example, prior to applying one or more prediction techniques. The encoder 114 may then encode a block using the one or more of the prediction techniques.

The encoder 114 may search for a block similar to the block being encoded in another picture (e.g., a reference picture) of the video sequence 108, for example, for temporal prediction. The block determined during the search (e.g., a prediction block) may then be used to predict the block being encoded. The encoder 114 may form a prediction block based on data from reconstructed neighboring samples of the block to be encoded within the same picture of the video sequence 108, for example, for spatial prediction. A reconstructed sample may be a sample that was encoded and then decoded. The encoder 114 may determine a prediction error (e.g., a residual) based on the difference between a block being encoded and a prediction block. The prediction error may represent non-redundant information that may be sent/transmitted to a decoder for accurate decoding of the video sequence 108.

The encoder 114 may apply a transform to the prediction error (e.g. using a discrete cosine transform (DCT), or any other transform) to generate transform coefficients. The encoder 114 may form the bitstream 110 based on the transform coefficients and other information used to determine prediction blocks using/based on prediction types, motion vectors, and prediction modes. The encoder 114 may perform one or more of quantization and entropy coding of the transform coefficients and/or the other information used to determine the prediction blocks, for example, prior to forming the bitstream 110. The quantization and/or the entropy coding may further reduce the quantity of bits needed to store and/or transmit the video sequence 108.

The output interface 116 may be configured to write and/or store the bitstream 110 onto the transmission medium 104 for transmission to the destination device 106. The output interface 116 may be configured to send/transmit, upload, and/or stream the bitstream 110 to the destination device 106 via the transmission medium 104. The output interface 116 may comprise a wired and/or a wireless transmitter configured to send/transmit, upload, and/or stream the bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol).

The transmission medium 104 may comprise wireless, wired, and/or computer readable medium. For example, the transmission medium 104 may comprise one or more wires, cables, air interfaces, optical discs, flash memory, and/or magnetic memory. The transmission medium 104 may comprise one or more networks (e.g., the internet) or file servers configured to store and/or send/transmit encoded video data.

The destination device 106 may decode the bitstream 110 into the video sequence 108 for display. The destination device 106 may comprise one or more of an input interface 118, a decoder 120, and/or a video display 122. The input interface 118 may be configured to read the bitstream 110 stored on the transmission medium 104 by the source device 102. The input interface 118 may be configured to receive, download, and/or stream the bitstream 110 from the source device 102 via the transmission medium 104. The input interface 118 may comprise a wired and/or a wireless receiver configured to receive, download, and/or stream the bitstream 110 in accordance with one or more proprietary, open-source, standardized communication protocols, and/or any other communication protocol (e.g., such as referenced herein).

The decoder 120 may decode the video sequence 108 from the encoded bitstream 110. The decoder 120 may generate prediction blocks for pictures of the video sequence 108 in a similar manner as the encoder 114 and determine the prediction errors for the blocks, for example, to decode the video sequence 108. The decoder 120 may generate the prediction blocks using/based on prediction types, prediction modes, and/or motion vectors received in the bitstream 110. The decoder 120 may determine the prediction errors using the transform coefficients received in the bitstream 110. The decoder 120 may determine the prediction errors by weighting transform basis functions using the transform coefficients. The decoder 120 may combine the prediction blocks and the prediction errors to decode the video sequence 108. The video sequence 108 at the destination device 106 may be, or may not necessarily be, the same video sequence sent, such as the video sequence 108 as sent by the source device 102. The decoder 120 may decode a video sequence that approximates the video sequence 108, for example, because of lossy compression of the video sequence 108 by the encoder 114 and/or errors introduced into the encoded bitstream 110 during transmission to the destination device 106.

The video display 122 may display the video sequence 108 to a user. The video display 122 may comprise a cathode rate tube (CRT) display, a liquid crystal display (LCD), a plasma display, a light emitting diode (LED) display, and/or any other display device suitable for displaying the video sequence 108.

The video encoding/decoding system 100 is merely an example and video encoding/decoding systems different from the video encoding/decoding system 100 and/or modified versions of the video encoding/decoding system 100 may perform the methods and processes as described herein. For example, the video encoding/decoding system 100 may comprise other components and/or arrangements. The video source 112 may be external to the source device 102. The video display device 122 may be external to the destination device 106 or omitted altogether (e.g., if the video sequence 108 is intended for consumption by a machine and/or storage device). The source device 102 may further comprise a video decoder and the destination device 104 may further comprise a video encoder. For example, the source device 102 may be configured to further receive an encoded bit stream from the destination device 106 to support two-way video transmission between the devices.

The encoder 114 and/or the decoder 120 may operate according to one or more proprietary or industry video coding standards. For example, the encoder 114 and/or the decoder 120 may operate in accordance with one or more proprietary, open-source, and/or standardized protocols (e.g., International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC)), ITU-T H.265 and MPEG-I Part 3 (also known as Versatile Video Coding (VVC)), the WebM VP8 and VP9 codecs, and/or AOMedia Video 1 (AV1), and/or any other video coding protocol).

Figure 2:
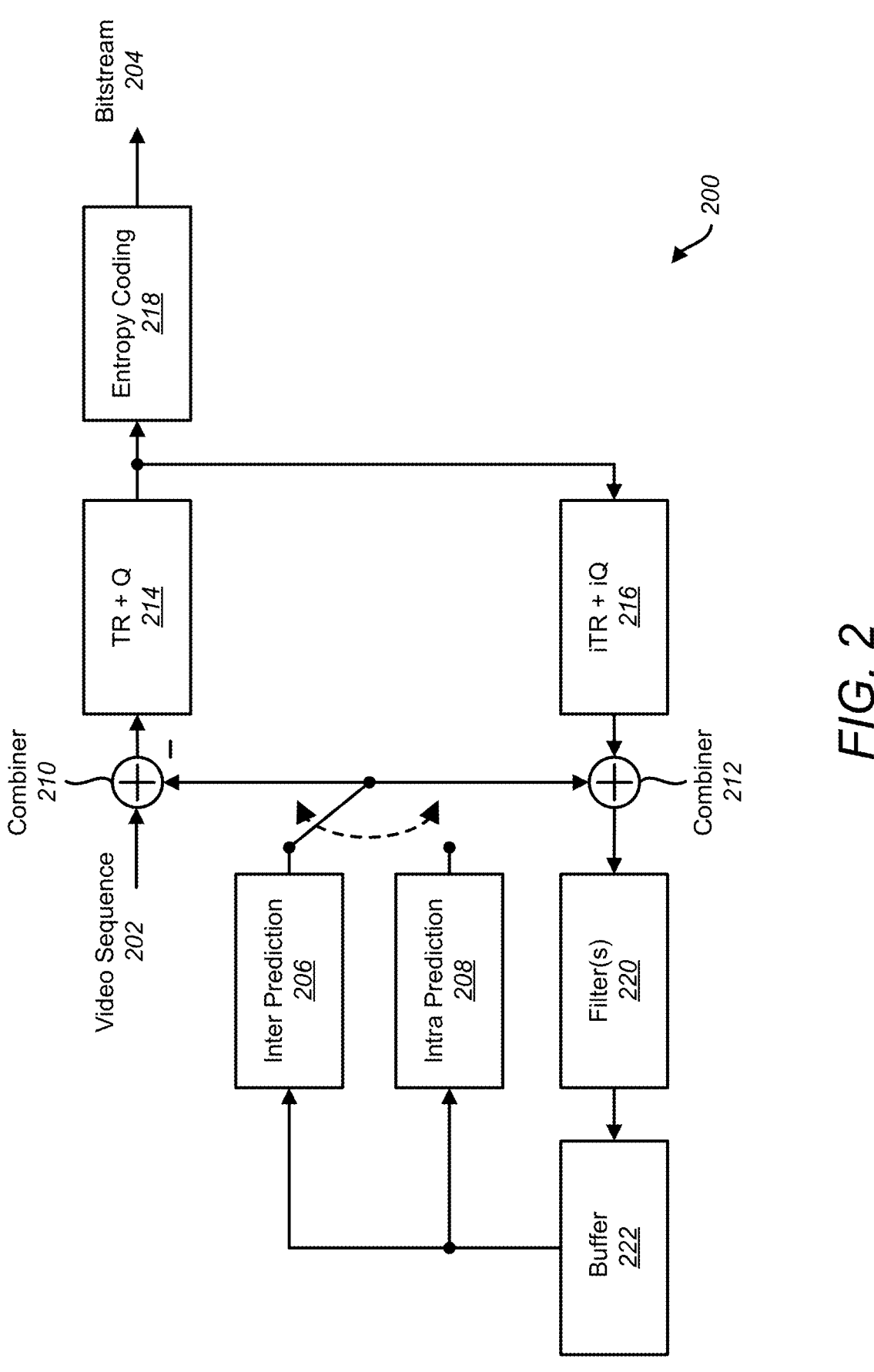
FIG. 2 shows an example encoder.

FIG. 2 shows an example encoder. The encoder 200 as shown in FIG. 2 may implement one or more processes described herein. The encoder 200 may encode a video sequence 202 into a bitstream 204 for more efficient storage and/or transmission. The encoder 200 may be implemented in the video coding/decoding system 100 as shown in FIG. 1 (e.g., as the encoder 114) or in any computing, communication, or electronic device (e.g., desktop computer, laptop computer, tablet computer, smart phone, wearable device, television, camera, video gaming console, set-top box, video streaming device, etc.). The encoder 200 may comprise one or more of an inter prediction unit 206, an intra prediction unit 208, combiners 210 and 212, a transform and quantization unit (TR+Q) 214, an inverse transform and quantization unit (iTR+iQ) 216, an entropy coding unit 218, one or more filters 220, and/or a buffer 222.

The encoder 200 may partition pictures (e.g., frames) of (e.g., comprising) the video sequence 202 into blocks and encode the video sequence 202 on a block-by-block basis. The encoder 200 may perform/apply a prediction technique on a block being encoded using either the inter prediction unit 206 or the intra prediction unit 208. The inter prediction unit 206 may perform inter prediction by searching for a block similar to the block being encoded in another, reconstructed picture (e.g., a reference picture) of the video sequence 202. The reconstructed picture may be a picture that was encoded and then decoded. The block determined during the search (e.g., a prediction block) may then be used to predict the block being encoded to remove redundant information. The inter prediction unit 206 may exploit temporal redundancy or similarities in scene content from picture to picture in the video sequence 202 to determine the prediction block. For example, scene content between pictures of the video sequence 202 may be similar except for differences due to motion and/or affine transformation of the screen content over time.

The intra prediction unit 208 may perform intra prediction by forming a prediction block based on data from reconstructed neighboring samples of the block to be encoded within the same picture of the video sequence 202. The reconstructed sample may be a sample that was encoded and then decoded. The intra prediction unit 208 may exploit spatial redundancy or similarities in scene content within a picture of the video sequence 202 to determine the prediction block. For example, the texture of a region of scene content in a picture may be similar to the texture in the immediate surrounding area of the region of the scene content in the same picture.

The combiner 210 may determine a prediction error (e.g., a residual) based on the difference between the block being encoded and the prediction block. The prediction error may represent non-redundant information that may be sent/transmitted to a decoder for accurate decoding of the video sequence 202.

The transform and quantization unit (TR+Q) 214 may transform and quantize the prediction error. The transform and quantization unit 214 may transform the prediction error into transform coefficients by applying, for example, a DCT to reduce correlated information in the prediction error. The transform and quantization unit 214 may quantize the coefficients by mapping data of the transform coefficients to a predefined set of representative values. The transform and quantization unit 214 may quantize the coefficients to reduce irrelevant information in the bitstream 204. The Irrelevant information may be information that may be removed from the coefficients without producing visible and/or perceptible distortion in the video sequence 202 after decoding (e.g., at a receiving device).

The entropy coding unit 218 may apply one or more entropy coding methods to the quantized transform coefficients to further reduce the bit rate. For example, the entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form the bitstream 204.

The inverse transform and quantization unit (iTR+iQ) 216 may inverse quantize and inverse transform the quantized transform coefficients to determine a reconstructed prediction error. The combiner 212 may combine the reconstructed prediction error with the prediction block to form a reconstructed block. The filter(s) 220 may filter the reconstructed block, for example, using a deblocking filter and/or a sample-adaptive offset (SAO) filter. The buffer 222 may store the reconstructed block for prediction of one or more other blocks in the same and/or different picture of the video sequence 202.

The encoder 200 may further comprise an encoder control unit. The encoder control unit may be configured to control one or more units of the encoder 200 as shown in FIG. 2. The encoder control unit may control the one or more units of the encoder 200 such that the bitstream 204 may be generated in conformance with the requirements of one or more proprietary coding protocols, industry video coding standards, and/or any other video cording protocol. For example, the encoder control unit may control the one or more units of the encoder 200 such that bitstream 204 may be generated in conformance with one or more of ITU-T H.263, AVC, HEVC, VVC, VP8, VP9, AV1, and/or any other video coding standard/format.

The encoder control unit may attempt to minimize (or reduce) the bitrate of bitstream 204 and/or maximize (or increase) the reconstructed video quality (e.g., within the constraints of a proprietary coding protocol, industry video coding standard, and/or any other video cording protocol). For example, the encoder control unit may attempt to minimize or reduce the bitrate of bitstream 204 such that the reconstructed video quality may not fall below a certain level/threshold, and/or may attempt to maximize or increase the reconstructed video quality such that the bit rate of bitstream 204 may not exceed a certain level/threshold. The encoder control unit may determine/control one or more of: partitioning of the pictures of the video sequence 202 into blocks, whether a block is inter predicted by the inter prediction unit 206 or intra predicted by the intra prediction unit 208, a motion vector for inter prediction of a block, an intra prediction mode among a plurality of intra prediction modes for intra prediction of a block, filtering performed by the filter(s) 220, and/or one or more transform types and/or quantization parameters applied by the transform and quantization unit 214. The encoder control unit may determine/control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to the entropy coding unit 218 to be further compressed (e.g., to reduce the bit rate). The prediction type, prediction information, and/or transform and/or quantization parameters may be packed with the prediction error to form the bitstream 204.

The encoder 200 is merely an example and encoders different from the encoder 200 and/or modified versions of the encoder 200 may perform the methods and processes as described herein. For example, the encoder 200 may comprise other components and/or arrangements. One or more of the components shown in FIG. 2 may be optionally included in the encoder 200 (e.g., the entropy coding unit 218 and/or the filters(s) 220).

Figure 3:
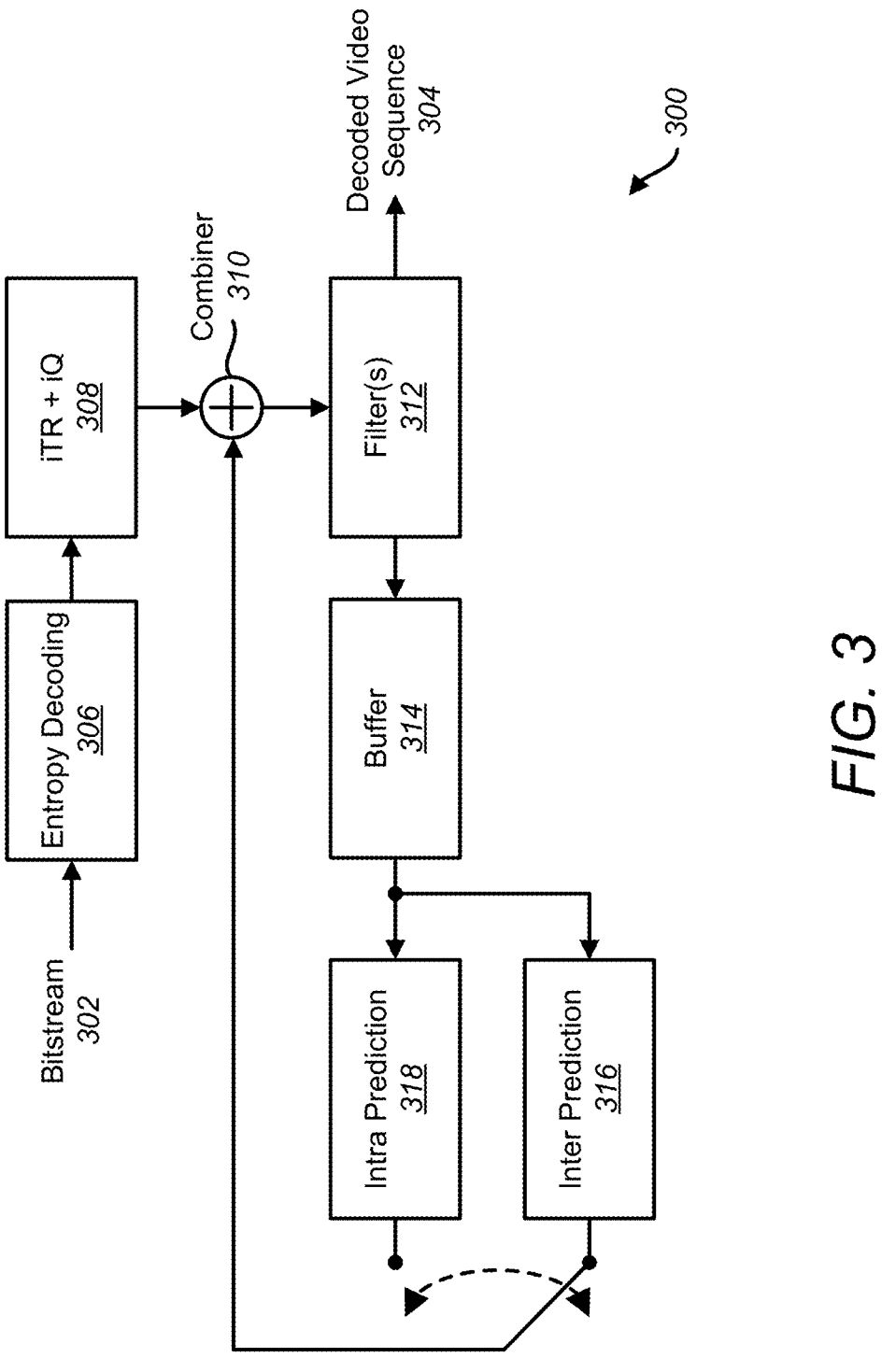
FIG. 3 shows an example decoder.

FIG. 3 shows an example decoder. A decoder 300 as shown in FIG. 3 may implement one or more processes described herein. The decoder 300 may decode a bitstream 302 into a decoded video sequence 304 for display and/or some other form of consumption. The decoder 300 may be implemented in the video encoding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). The decoder 300 may comprise an entropy decoding unit 306, an inverse transform and quantization (iTR+iQ) unit 308, a combiner 310, one or more filters 312, a buffer 314, an inter prediction unit 316, and/or an intra prediction unit 318.

The decoder 300 may comprise a decoder control unit configured to control one or more units of decoder 300. The decoder control unit may control the one or more units of decoder 300 such that the bitstream 302 is decoded in conformance with the requirements of one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by the inter prediction unit 316 or intra predicted by the intra prediction unit 318, a motion vector for inter prediction of a block, an intra prediction mode among a plurality of intra prediction modes for intra prediction of a block, filtering performed by the filter(s) 312, and/or one or more inverse transform types and/or inverse quantization parameters to be applied by the inverse transform and quantization unit 308. One or more of the control parameters used by the decoder control unit may be packed in bitstream 302.

The Entropy decoding unit 306 may entropy decode the bitstream 302. The inverse transform and quantization unit 308 may inverse quantize and/or inverse transform the quantized transform coefficients to determine a decoded prediction error. The combiner 310 may combine the decoded prediction error with a prediction block to form a decoded block. The prediction block may be generated by the intra prediction unit 318 or the inter prediction unit 316 (e.g., as described above with respect to encoder 200 in FIG. 2). The filter(s) 312 may filter the decoded block, for example, using a deblocking filter and/or a sample-adaptive offset (SAO) filter. The buffer 314 may store the decoded block for prediction of one or more other blocks in the same and/or different picture of the video sequence in the bitstream 302. The decoded video sequence 304 may be output from the filter(s) 312 as shown in FIG. 3.

The decoder 300 is merely an example and decoders different from the decoder 300 and/or modified versions of the decoder 300 may perform the methods and processes as described herein. For example, the decoder 300 may have other components and/or arrangements. One or more of the components shown in FIG. 3 may be optionally included in the decoder 300 (e.g., the entropy decoding unit 306 and/or the filters(s) 312).

Although not shown in FIGS. 2 and 3, each of the encoder 200 and the decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of 2"×2" samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtrec. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and/or intra prediction. A PB may be a rectangular block of samples on which the same prediction type/mode may be applied. For transformations, a CB may be partitioned into one or more transform blocks (TBs). A TB may be a rectangular block of samples that may determine/indicate an applied transform size.

Figure 4:
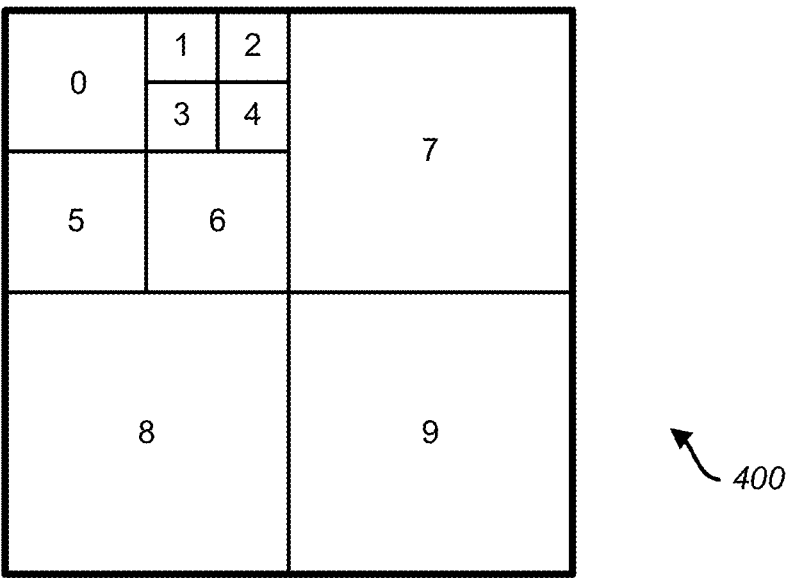
FIG. 4 shows an example quadtree partitioning of a coding tree block (CTB).
Figure 5:
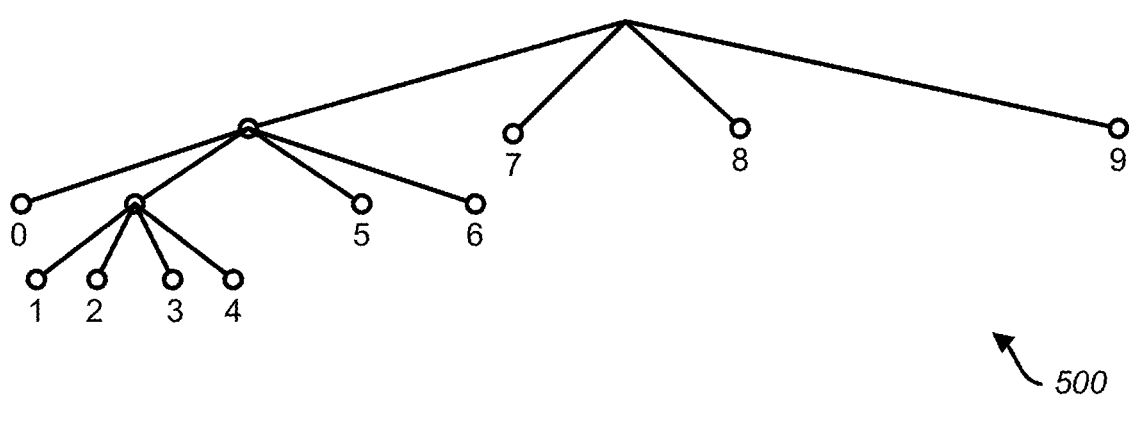
FIG. 5 shows an example quadtree corresponding to the example quadtree partitioning of the CTB in FIG. 4.

FIG. 4 shows an example quadtree partitioning of a CTB. FIG. 5 shows a quadtree corresponding to the example quadtree partitioning of the CTB 400 in FIG. 4. As shown in FIGS. 4 and 5, the CTB 400 may first be partitioned into four CBs of half vertical and half horizontal size. Three of the resulting CBs of the first level partitioning of CTB 400 may be leaf CBs. The three leaf CBs of the first level partitioning of CTB 400 are respectively labeled 7, 8, and 9 in FIGS. 4 and 5. The non-leaf CB of the first level partitioning of CTB 400 may be partitioned into four sub-CBs of half vertical and half horizontal size. Three of the resulting sub-CBs of the second level partitioning of CTB 400 may be leaf CBs. The three leaf CBs of the second level partitioning of CTB 400 are respectively labeled 0, 5, and 6 in FIGS. 4 and 5. The non-leaf CB of the second level partitioning of CTB 400 may be partitioned into four leaf CBs of half vertical and half horizontal size. The four leaf CBs may be respectively labeled 1, 2, 3, and 4 in FIGS. 4 and 5.

The CTB 400 of FIG. 4 may be partitioned into 10 leaf CBs respectively labeled 0-9, and/or any other quantity of leaf CBs. The 10 leaf CBs may correspond to 10 CB leaf nodes (e.g., 10 CB leaf nodes of the quadtree 500 as shown in FIG. 5). In other examples, a CTB may be partitioned into a different number of leaf CBs. The resulting quadtree partitioning of the CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

Figure 6:
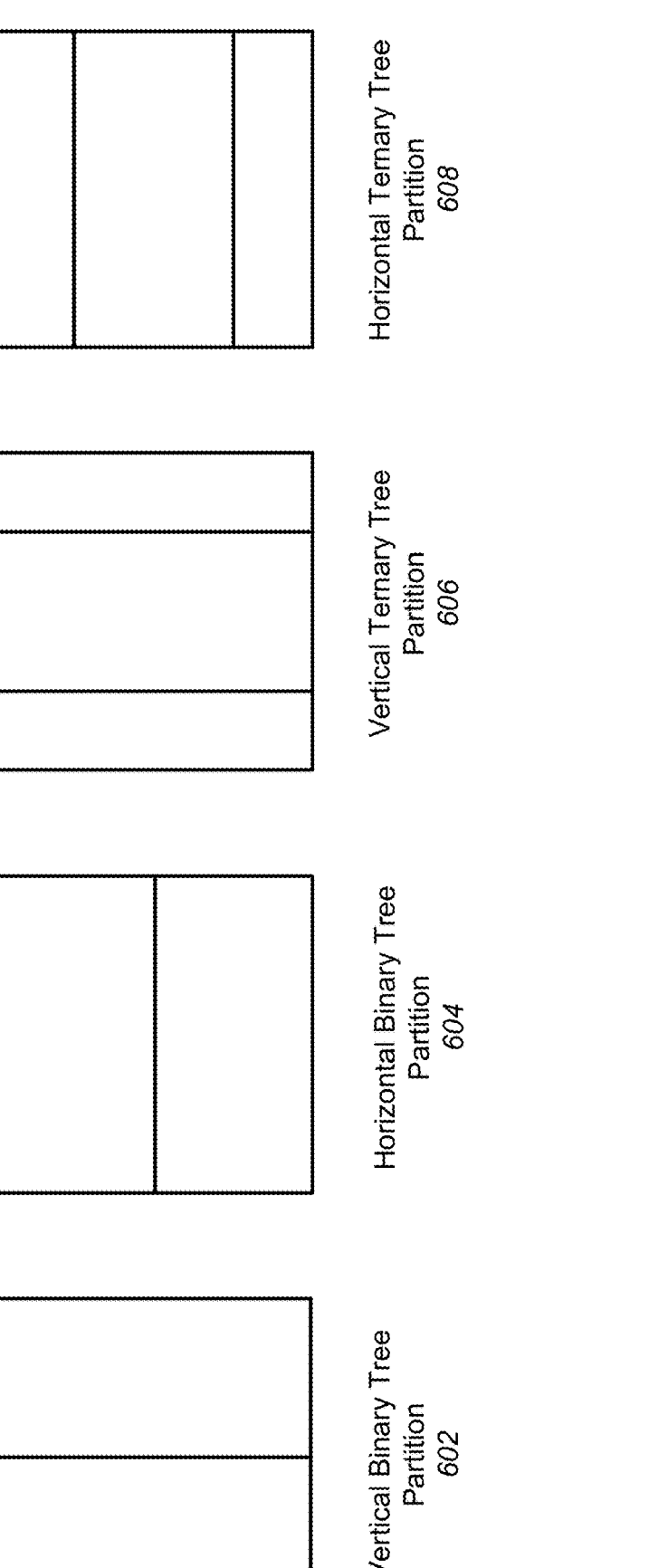
FIG. 6 shows example binary tree and ternary tree partitions.

FIG. 6 shows example binary tree and ternary tree partitions. A binary tree partition may divide a parent block in half in either a vertical direction 602 or a horizontal direction 604. The resulting partitions may be half in size as compared to the parent block. The resulting partitions may correspond to sizes that are less than and/or greater than half of the parent block size. A ternary tree partition may divide a parent block into three parts in either a vertical direction 606 or a horizontal direction 608. FIG. 6 shows an example in which the middle partition may be twice as large as the other two end partitions in the ternary trec partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as a combination of quadtree and multi-type tree partitioning (quadtree+multi-type trec partitioning) because of the addition of binary and/or ternary tree partitioning to quadtree partitioning.

Figure 7:
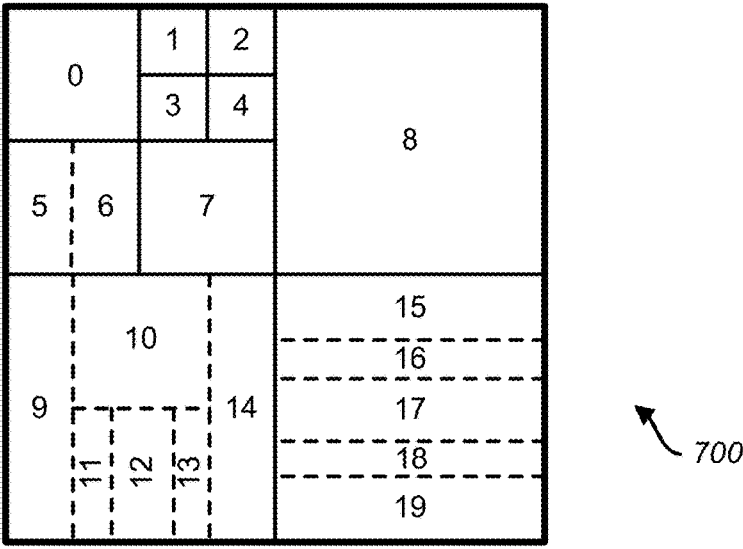
FIG. 7 shows an example of combined quadtree and multi-type tree partitioning of a CTB.
Figure 8:
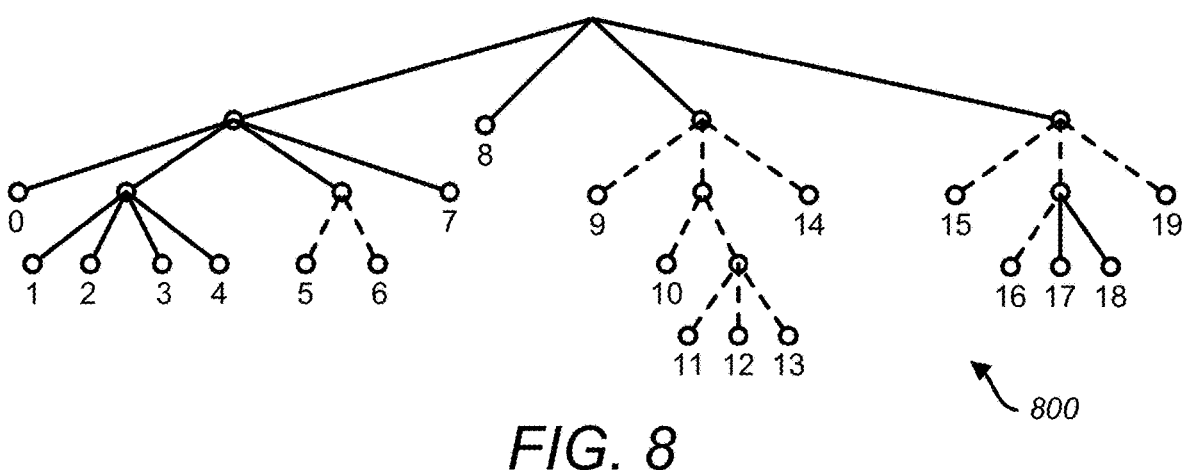
FIG. 8 shows a tree corresponding to the combined quadtree and multi-type tree partitioning of the CTB shown in FIG. 7.

FIG. 7 shows an example of combined quadtree and multi-type tree partitioning of a CTB. FIG. 8 shows a tree corresponding to the combined quadtree and multi-type trec partitioning of the CTB 700 shown in FIG. 7. In both FIGS. 7 and 8, quadtree splits are shown in solid lines and multi-type tree splits are shown in dashed lines. The CTB 700 is shown with the same quadtree partitioning as the CTB 400 described in FIG. 4, and a description of the quadtree partitioning of the CTB 700 is omitted. The quadtrec partitioning of the CTB 700 is merely an example and a CTB may be quadtree partitioned in a manner different from the CTB 700. Additional multi-type tree partitions of the CTB 700 may be made relative to three leaf CBs shown in FIG. 4. The three leaf CBs in FIG. 4 that are shown in FIG. 7 as being further partitioned may be leaf CBs 5, 8, and 9. The three leaf CBs may be further partitioned using one or more binary and/or ternary tree partitions.

The leaf CB 5 of FIG. 4 may be partitioned into two CBs based on a vertical binary tree partitioning. The two resulting CBs may be leaf CBs respectively labeled 5 and 6 in FIGS. 7 and 8. The leaf CB 8 of FIG. 4 may be partitioned into three CBs based on a vertical ternary tree partition. Two of the three resulting CBs may be leaf CBs respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. The leaf CB 9 of FIG. 4 may be partitioned into three CBs based on a horizontal ternary tree partition. Two of the three CBs may be leaf CBs respectively labeled 15 and 19 in FIGS. 7 and 8. The remaining, non-leaf CB may be partitioned into three CBs based on another horizontal ternary tree partition. The resulting three CBs may all be leaf CBs respectively labeled 16, 17, and 18 in FIGS. 7 and 8.

Altogether, the CTB 700 may be partitioned into 20 leaf CBs respectively labeled 0-19. The 20 leaf CBs may correspond to 20 leaf nodes (e.g., 20 leaf nodes of the tree 800 shown in FIG. 8). The resulting combination of quadtree and multi-type tree partitioning of the CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other coding standard/format) may define various units (e.g., in addition to specifying various blocks (e.g., CTBs, CBS, PBs, TBs)). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC, VVC, or any other coding format/standard). A block may be used to refer to similar data structures in the context of any video coding format/standard/protocol. For example, a block may refer to a macroblock in the AVC standard, a macroblock or a sub-block in the VP8 coding format, a superblock or a sub-block in the VP9 coding format, and/or a superblock or a sub-block in the AV1 coding format.

Samples of a block to be encoded (e.g., a current block) may be predicted from samples of the column immediately adjacent to the left-most column of the current block and samples of the row immediately adjacent to the top-most row of the current block, such as in intra prediction. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining the predicted samples with the prediction error.

Figure 9:
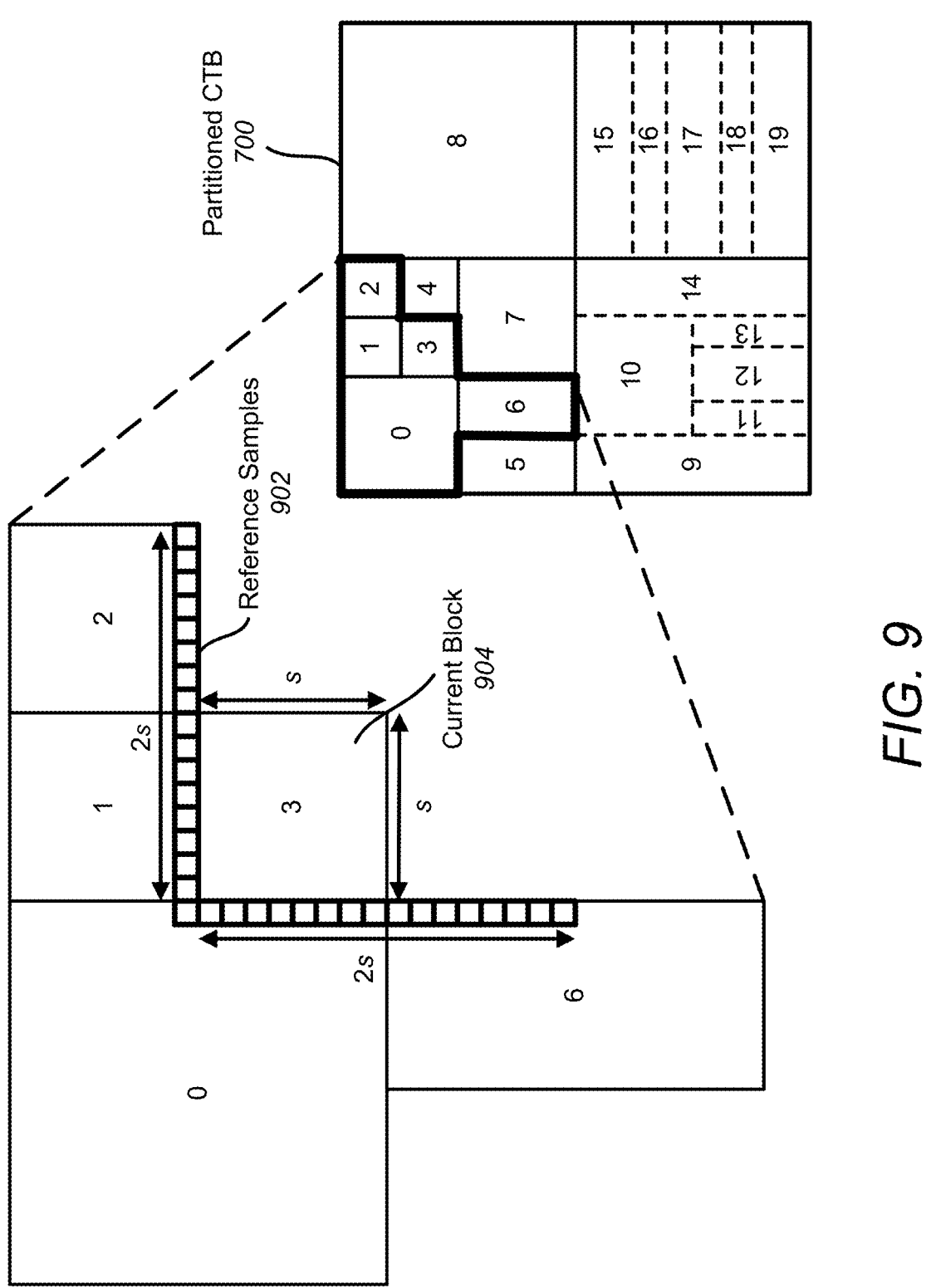
FIG. 9 shows an example set of reference samples determined for intra prediction of a current block.

FIG. 9 shows an example set of reference samples determined for intra prediction of a current block. The current block 904 may correspond to a block being encoded and/or decoded. The current block 904 may correspond to block 3 of the partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

The current block 904 may be w×h samples in size. The reference samples 902 may comprise: 2w samples (or any other quantity of samples) of the row immediately adjacent to the top-most row of the current block 904, 2*h* samples (or any other quantity of samples) of the column immediately adjacent to the left-most column of the current block 904, and the top left neighboring corner sample to the current block 904. The current block 904 may be square, such that w=h=s. In other examples, a current block need not be square, such that w≠h. Available samples from neighboring blocks of the current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples 902 may allow identical prediction results to be determined at both the encoder and decoder. Samples from neighboring blocks 0, 1, and 2 may be available to construct the reference samples 902 given that these blocks are encoded and reconstructed at an encoder and decoded at a decoder prior to coding of the current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from neighboring block 6 may not be available due to the sequence order for encoding/decoding (e.g., because the block 6 may not have already been encoded and reconstructed at the encoder and/or decoded at the decoder based on the sequence order for encoding/decoding).

Unavailable samples from the reference samples 902 may be filled with one or more of the available reference samples 902. For example, an unavailable reference sample may be filled with a nearest available reference sample. The nearest available reference sample may be determined by moving in a clock-wise direction through the reference samples 902 from the position of the unavailable reference. The reference samples 902 may be filled with the mid-value of the dynamic range of the picture being coded, for example, if no reference samples are available.

The reference samples 902 may be filtered based on the size of current block 904 being coded and an applied intra prediction mode. FIG. 9 shows an exemplary determination of reference samples for intra prediction of a block. Reference samples may be determined in a different manner than described above. For example, multiple reference lines may be used in other instances (e.g., in VVC).

Samples of the current block 904 may be intra predicted based on the reference samples 902, for example, based on (e.g., after) determination and (optionally) filtration of the reference samples. At least some (e.g., most) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
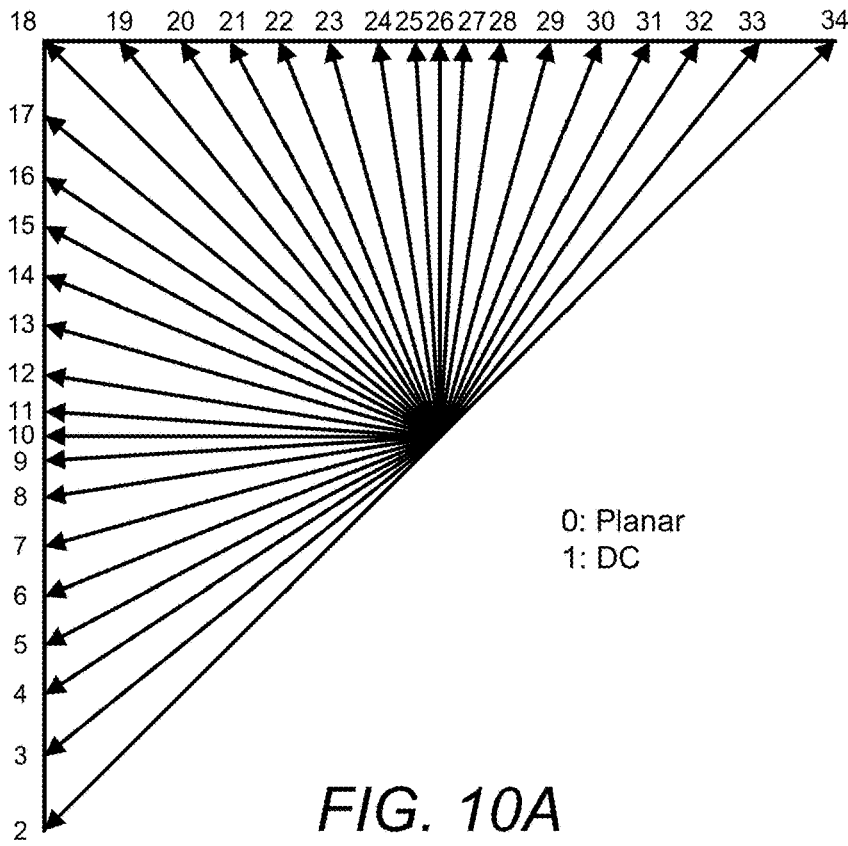
FIGS. 10A and 10B show example intra prediction modes.
Figure 10B:
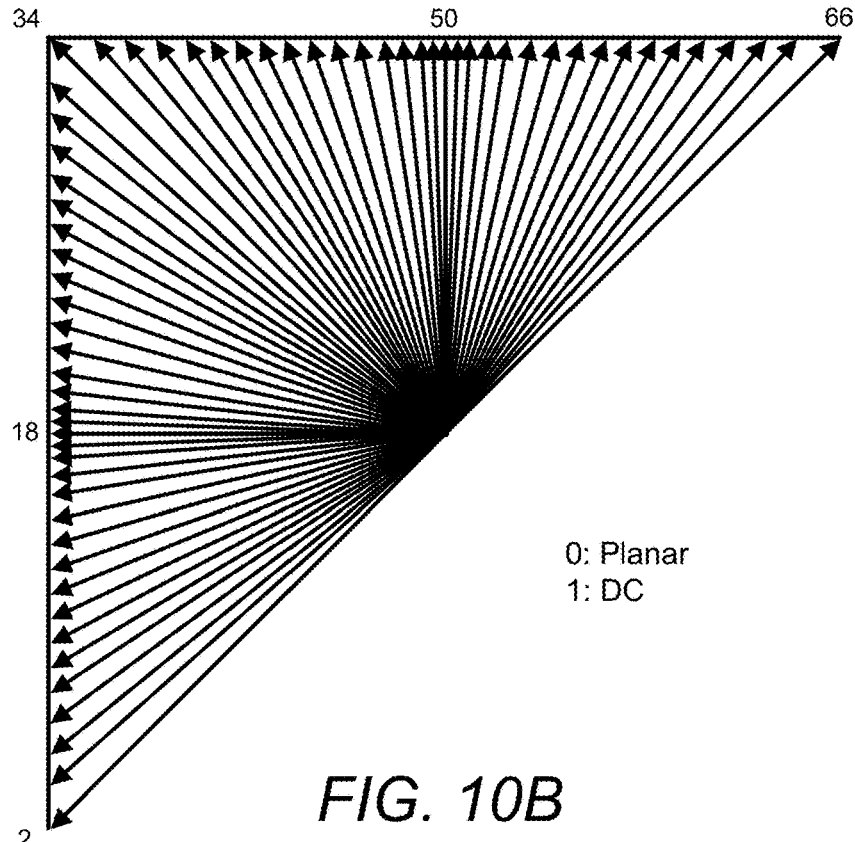

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
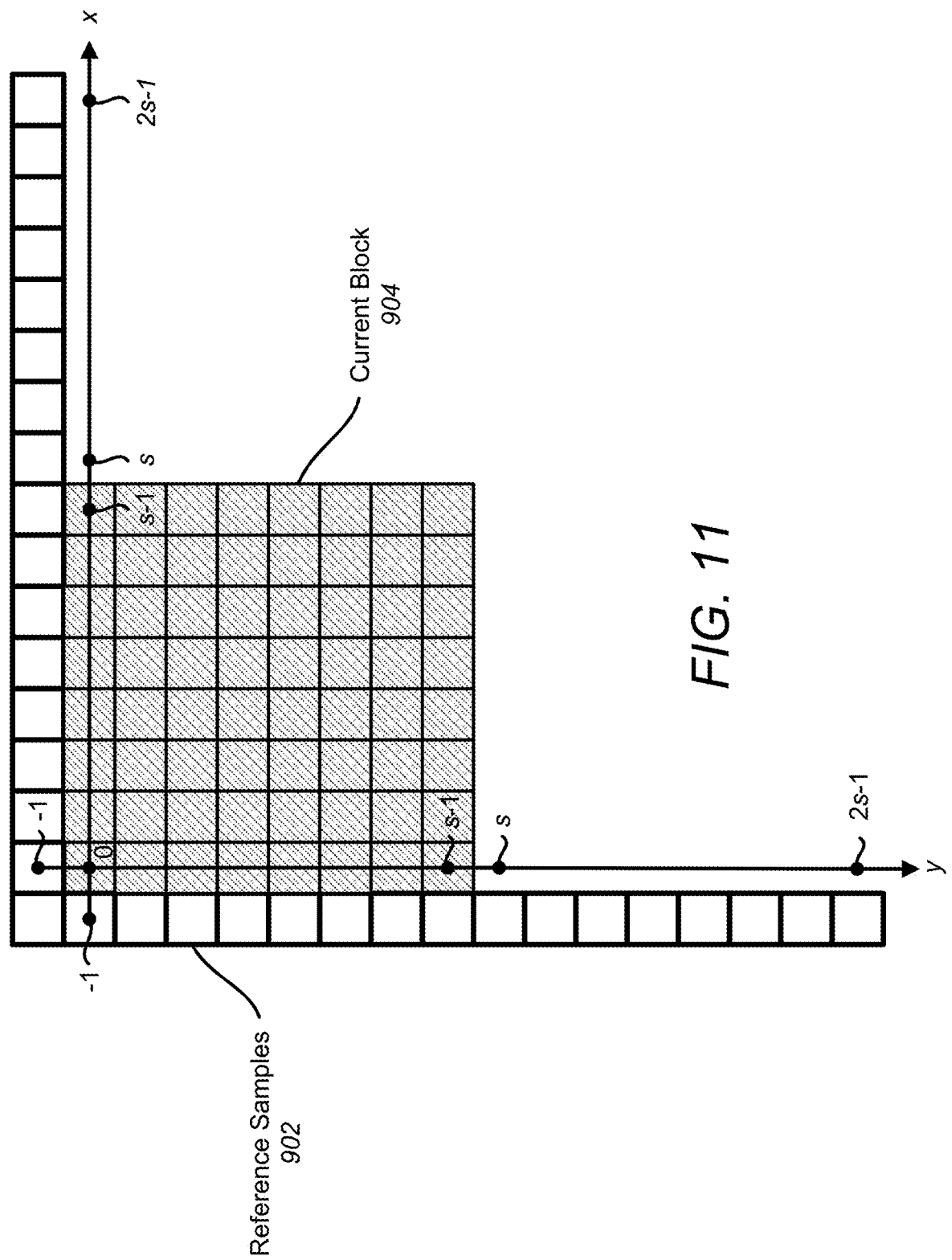
FIG. 11 shows a current block and corresponding reference samples.

FIG. 11 shows a current block and corresponding reference samples. In FIG. 11, the current block 904 and the reference samples 902 from FIG. 9 are shown in a two-dimensional x, y plane, where a sample may be referenced as p[x][y]. In order to simplify the prediction process, the reference samples 902 may be placed in two, one-dimensional arrays. The reference samples 902, above the current block 904, may be placed in the one-dimensional array $ref_1[x]$:

$$ref_1[x] = p[-1 + x][-1], \ (x \ge 0). \tag{1}$$

The reference samples 902 to the left of the current block 904 may be placed in the one-dimensional array $ref_2[y]$:

$$ref_2[y] = p[-1][-1 + y], \ (y \ge 0). \tag{2}$$

The prediction process may comprise determination of a predicted sample p[x][y] (e.g., a predicted value) at a location [x][y] in the current block 904. For planar mode, a sample at the location [x][y] in the current block 904 may be predicted by determining/calculating the mean of two interpolated values. The first of the two interpolated values may be based on a horizontal linear interpolation at the location [x][y] in the current block 904. The second of the two interpolated values may be based on a vertical linear interpolation at the location [x][y] in the current block 904. The predicted sample p[x][y] in the current block 904 may be determined/calculated as:

$$p[x][y] = \frac{1}{2 \cdot s}(h[x][y] + v[x][y] + s), \tag{3}$$

where $$h[x][y] = (s - x - 1) \cdot ref_2[y] + (x + 1) \cdot ref_1[s] \tag{4}$$

may be the horizonal linear interpolation at the location [x][y] in the current block 904 and $$v[x][y] = (s - y - 1) \cdot ref_1[x] + (y + 1) \cdot ref_2[s] \tag{5}$$

may be the vertical linear interpolation at the location [x][y] in the current block 904. s may be equal to a length of a side (e.g., a number of samples on a side) of the current block 904.

A sample at a location [x][y] in the current block 904 may be predicted by the mean of the reference samples 902, such as for a DC mode. The predicted sample p[x][y] in the current block 904 may be determined/calculated as:

$$p[x][y] = \frac{1}{2 \cdot s}\left(\sum_{x=0}^{s-1} ref_1[x] + \sum_{y=0}^{s-1} ref_2[y]\right). \tag{6}$$

A sample at a location [x][y] in the current block 904 may be predicted by projecting the location [x][y] in a direction specified by a given angular mode to a point on the horizontal or vertical line of samples comprising the reference samples 902, such as for an angular mode. The sample at the location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
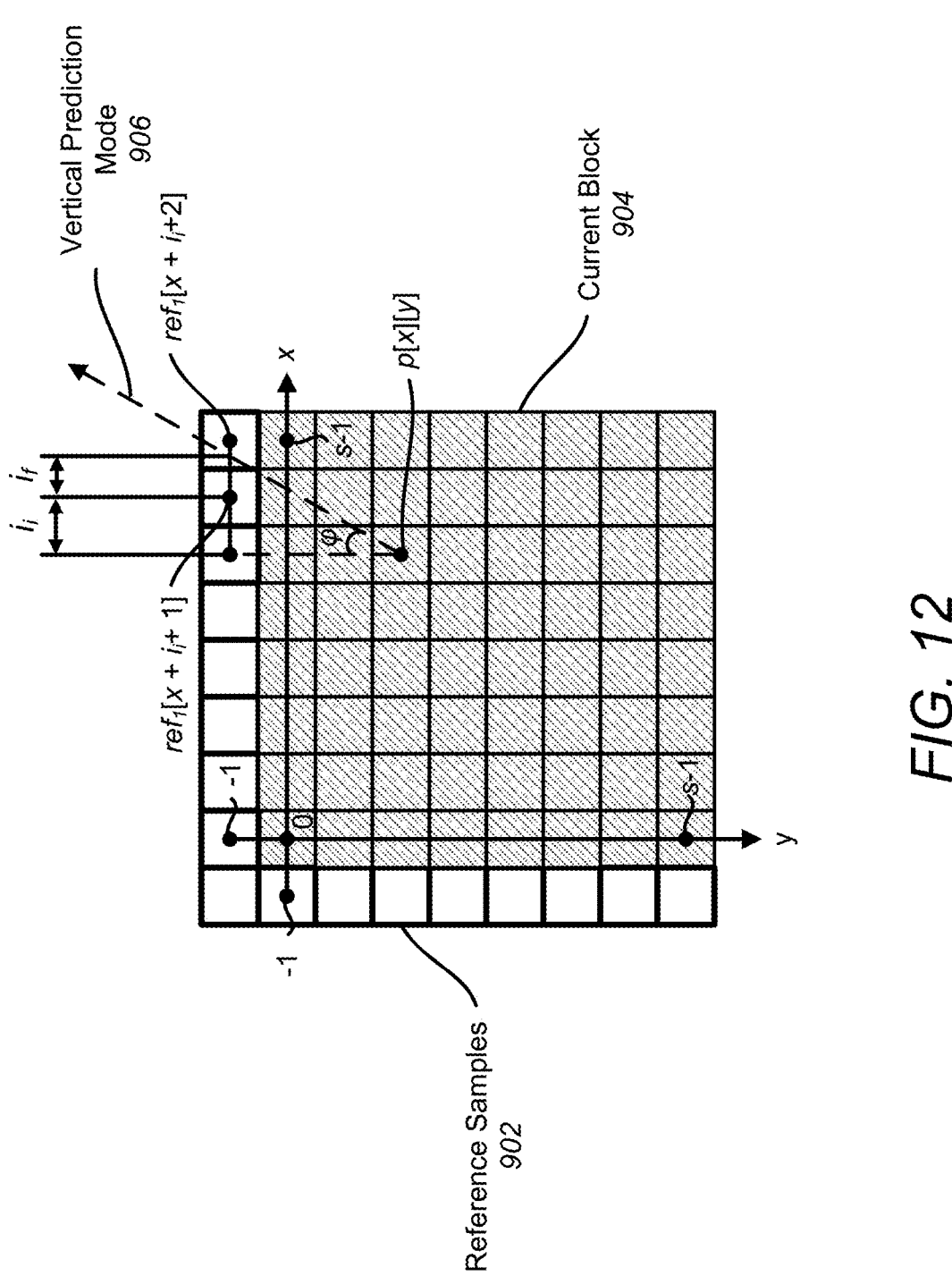
FIG. 12 shows an example application of an intra prediction mode for prediction of a current block.

FIG. 12 shows an example application of an intra prediction mode for prediction of a current block. FIG. 12 specifically shows prediction of a sample at a location [x][y] in the current block 904 for a vertical prediction mode 906. The vertical prediction mode 906 may be given by an angle φ with respect to the vertical axis. The location [x][y] in the current block 904, in vertical prediction modes, may be projected to a point (e.g., a projection point) on the horizontal line of reference samples $ref_1[x]$. The reference samples 902 are only partially shown in FIG. 12 for ease of illustration. As shown in FIG. 12, the projection point on the horizontal line of reference samples $ref_1[x]$ may not be exactly on a reference sample. A predicted sample $p[x][y]$ in the current block 904 may be determined/calculated by linearly interpolating between the two reference samples, for example, if the projection point falls at a fractional sample position between two reference samples. The predicted sample $p[x][y]$ may be determined/calculated as:

$$p[x][y] = (1 - i_f) \cdot ref_1[x + i_i + 1] + i_f \cdot ref_1[x + i_i + 2]. \quad (7)$$

$i_i$ may be the integer part of the horizontal displacement of the projection point relative to the location $[x][y]$. $i_i$ may be determined/calculated as a function of the tangent of the angle $\varphi$ of the vertical prediction mode 906 as:

$$i_i = \lfloor (y + 1) \cdot \tan\varphi \rfloor. \quad (8)$$

$i_f$ may be the fractional part of the horizontal displacement of the projection point relative to the location $[x][y]$ and may be determined/calculated as:

$$i_f = ((y + 1) \cdot \tan\varphi) - \lfloor (y + 1) \cdot \tan\varphi \rfloor, \quad (9)$$

where $\lfloor \bullet \rfloor$ is the integer floor function.

A location $[x][y]$ of a sample in the current block 904 may be projected onto the vertical line of reference samples $ref_2[y]$, such as for horizontal prediction modes. A predicted sample $p[x][y]$ for horizontal prediction modes may be determined/calculated as:

$$p[x][y] = (1 - i_f) \cdot ref_2[y + i_i + 1] + i_f \cdot ref_2[y + i_i + 2]. \quad (10)$$

$i_i$ may be the integer part of the vertical displacement of the projection point relative to the location $[x][y]$. $i_i$ may be determined/calculated as a function of the tangent of the angle $\varphi$ of the horizontal prediction mode as:

$$i_i = \lfloor (x + 1) \cdot \tan\varphi \rfloor. \quad (11)$$

$i_f$ may be the fractional part of the vertical displacement of the projection point relative to the location $[x][y]$. $i_f$ may be determined/calculated as:

$$i_f = ((x + 1) \cdot \tan\varphi) - \lfloor (x + 1) \cdot \tan\varphi \rfloor, \quad (12)$$

where $\lfloor \bullet \rfloor$ is the integer floor function.

The interpolation functions given by Equations (7) and (10) may be implemented by an encoder and/or a decoder (e.g., the encoder 200 in FIG. 2 and/or the decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by $(1-i_f)$ and $i_f$. The predicted sample $p[x][y]$, in angular intra prediction, may be calculated with some predefined level of sample accuracy (e.g., $\frac{1}{32}$ sample accuracy, or accuracy defined by any other metric). For $\frac{1}{32}$ sample accuracy, the set of two-tap FIR interpolation filters may comprise up to 32 different two-tap FIR interpolation filters-one for each of the 32 possible values of the fractional part of the projected displacement $i_f$. In other examples, different levels of sample accuracy may be used.

The FIR filters may be used for predicting chroma samples and/or luma samples. For example, the two-tap interpolation FIR filter may be used for predicting chroma samples and a same and/or a different interpolation technique/filter may be used for luma samples. For example, a four-tap FIR filter may be used to determine a predicted value of a luma sample. Coefficients of the four tap FIR filter may be determined based on $i_f$ (e.g., similar to the two-tap FIR filter). For $\frac{1}{32}$ sample accuracy, a set of 32 different four-tap FIR filters may comprise up to 32 different four-tap FIR filters-one for each of the 32 possible values of the fractional part of the projected displacement $i_f$. In other examples, different levels of sample accuracy may be used. The set of four-tap FIR filters may be stored in a look-up table (LUT) and referenced based on $i_f$. A predicted sample $p[x][y]$, for vertical prediction modes, may be determined based on the four-tap FIR filter as:

$$p[x][y] = \sum_{i=0}^{3} fT[i] \cdot ref_1[x + iIdx + i], \quad (13)$$

where $fT[i]$, $i=0 \ldots 3$, may be the filter coefficients, and Idx is integer displacement. A predicted sample $p[x][y]$, for horizontal prediction modes, may be determined based on the four-tap FIR filter as:

$$p[x][y] = \sum_{i=0}^{3} fT[i] \cdot ref_2[y + iIdx + i]. \quad (14)$$

Supplementary reference samples may be determined/constructed if the location $[x][y]$ of a sample in the current block 904 to be predicted is projected to a negative x coordinate. The location $[x][y]$ of a sample may be projected to a negative x coordinate, for example, if negative vertical prediction angles $\varphi$ are used. The supplementary reference samples may be determined/constructed by projecting the reference samples in $ref_2[y]$ in the vertical line of reference samples 902 to the horizontal line of reference samples 902 using the negative vertical prediction angle $\varphi$. Supplementary reference samples may be similarly determined/constructed, for example, if the location $[x][y]$ of a sample in the current block 904 to be predicted is projected to a negative y coordinate. The location $[x][y]$ of a sample may be projected to a negative y coordinate, for example, if negative horizontal prediction angles $\varphi$ are used. The supplementary reference samples may be determined/constructed by projecting the reference samples in $ref_1[x]$ on the horizontal line of reference samples 902 to the vertical line of reference samples 902 using the negative horizontal prediction angle $\varphi$.

An encoder may determine/predict samples of a current block being encoded (e.g., the current block 904) for a plurality of intra prediction modes (e.g., using one or more of the functions described herein). For example, an encoder may determine/predict samples of a current block for each of 35 intra prediction modes in HEVC and/or 67 intra prediction modes in VVC. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may determine/select one of the intra prediction modes to encode the current block based on the determined prediction errors. For example, the encoder may determine/select one of the intra prediction modes that results in the smallest prediction error for the current block. The encoder may determine/select the intra prediction mode to encode the current block based on a rate-distortion measure (e.g., Lagrangian rate-distortion cost) determined using the prediction errors. The encoder may send an indication of the determined/selected intra prediction mode and its corresponding prediction error (e.g., residual) to a decoder for decoding of the current block.

A decoder may determine/predict samples of a current block being decoded (e.g., the current block 904) for an intra prediction mode. For example, a decoder may receive an indication of an intra prediction mode (e.g., an angular intra prediction mode) from an encoder for a current block. The decoder may construct a set of reference samples and perform intra prediction based on the intra prediction mode indicated by the encoder for the current block in a similar manner (e.g., as described above for the encoder). The decoder may add predicted values of the samples (e.g., determined based on the intra prediction mode) of the current block to a residual of the current block to reconstruct the current block. A decoder need not receive an indication of an angular intra prediction mode from an encoder for a current block. A decoder may determine an intra prediction mode, for example, based on other criteria. While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of a video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of the object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

An encoder may determine a difference between a current block and a prediction for a current block. An encoder may determine a difference, for example, based on/after determining/generating a prediction for a current block (e.g., using inter prediction). The difference may be a prediction error and/or as a residual. The encoder may store and/or send (e.g., signal), in/via a bitstream, the prediction error and/or other related prediction information. The prediction error and/or other related prediction information may be used for decoding and/or other forms of consumption. A decoder may decode the current block by predicting the samples of the current block (e.g., by using the related prediction information) and combining the predicted samples with the prediction error.

Figure 13A:
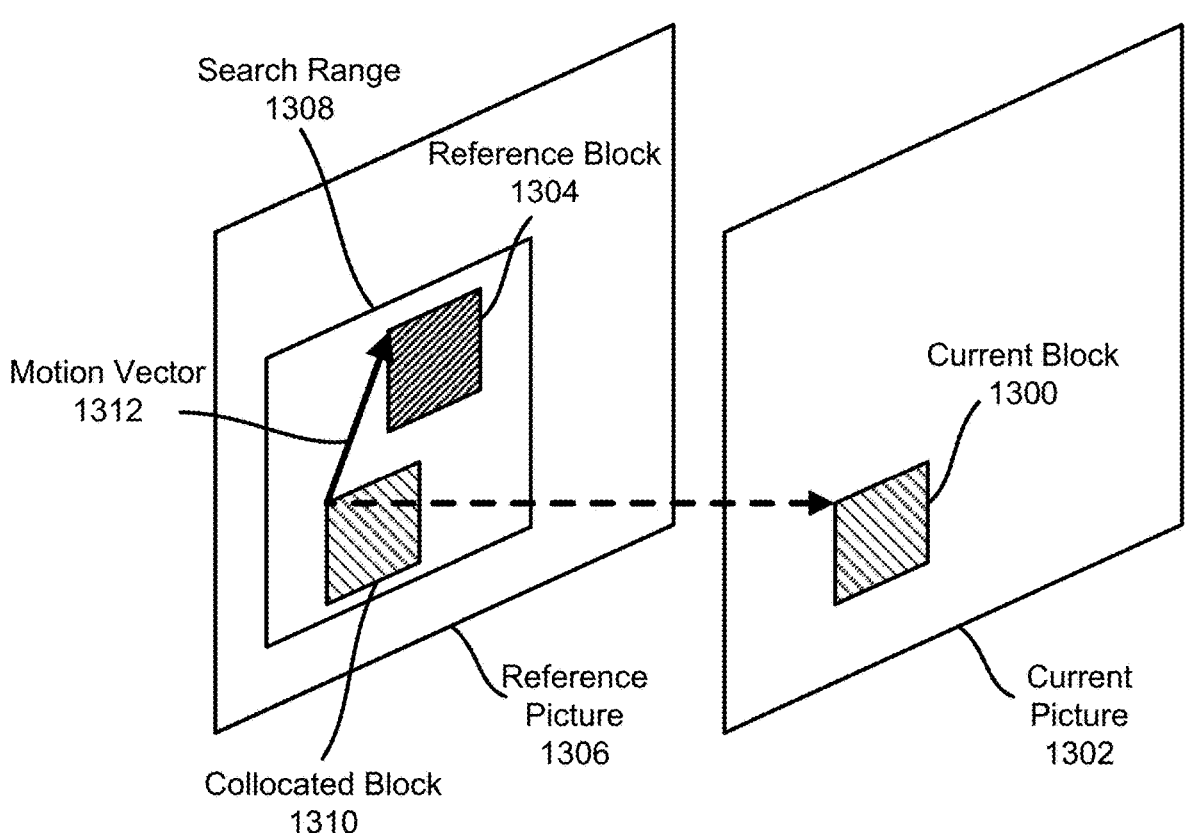
FIG. 13A shows an example of inter prediction.

FIG. 13A shows an example of inter prediction. The inter prediction may be performed for a current block 1300 in a current picture 1302 being encoded. An encoder (e.g., the encoder 200 as shown in FIG. 2) may perform inter prediction to determine and/or generate a reference block 1304 in a reference picture 1306. The reference block 1304 may be used to predict the current block 1300. Reference pictures (e.g., the reference picture 1306) may be prior decoded pictures available at the encoder and/or a decoder. Availability of a prior decoded picture may depend/be based on whether the prior decoded picture is available in a decoded picture buffer, at the time, the current block 1300 is being encoded and/or decoded. The encoder may search the one or more reference pictures 1306 for a block that is similar (or substantially similar) to the current block 1300. The encoder may determine the best matching block from the blocks tested during the searching process. The best matching block may be a reference block 1304. The encoder may determine that the reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of the reference block 1304 and original samples of the current block 1300.

The encoder may search for the reference block 1304 within a reference region (e.g., a search range 1308). The reference region (e.g., a search range 1308) may be positioned around a collocated position (or block) 1310, of the current block 1300, in the reference picture 1306. The collocated block 1310 may have a same position in the reference picture 1306 as the current block 1300 in the current picture 1302. The reference region (e.g., a search range 1308) may at least partially extend outside of the reference picture 1306. Constant boundary extension may be used, for example, if the reference region (e.g., a search range 1308) extends outside of the reference picture 1306. The constant boundary extension may be used such that values of the samples in a row or a column of reference picture 1306, immediately adjacent to a portion of the reference region (e.g., a search range 1308) extending outside of the reference picture 1306, may be used for sample locations outside of the reference picture 1306. A subset of potential positions, or all potential positions, within the reference region (e.g., a search range 1308) may be searched for the reference block 1304. The encoder may utilize one or more search implementations to determine and/or generate the reference block 1304. For example, the encoder may determine a set of candidate search positions based on motion information of neighboring blocks (e.g., a motion vector 1312) to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of the reference block 1304 may be indicated by a reference index pointing into a reference picture list comprising the reference picture 1306.

Figure 13B:
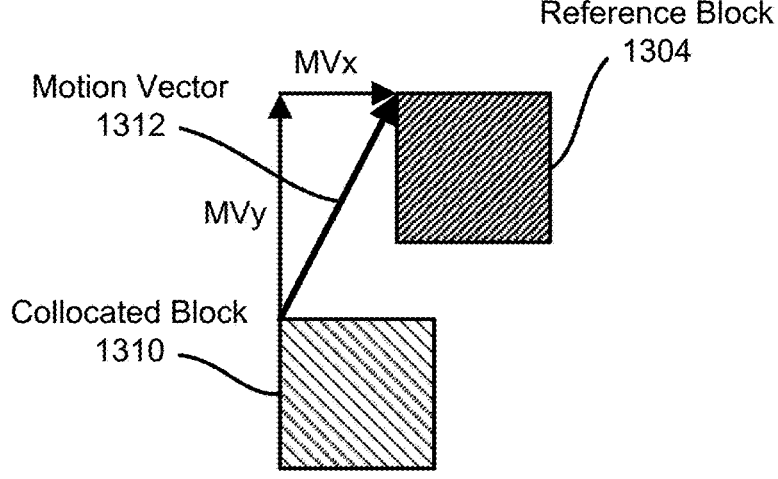
FIG. 13B shows an example motion vector.

FIG. 13B shows an example motion vector. A displacement between the reference block 1304 and the current block 1300 may be interpreted as an estimate of the motion between the reference block 1304 and the current block 1300 across their respective pictures. The displacement may be represented by a motion vector 1312. For example, the motion vector 1312 may be indicated by a horizontal component ($MV_x$) and a vertical component ($MV_y$) relative to the position of the current block 1300. A motion vector (e.g., the motion vector 1312) may have fractional or integer resolution. A motion vector with fractional resolution may point between two samples in a reference picture to provide a better estimation of the motion of the current block 1300. For example, a motion vector may have $\frac{1}{2}$, $\frac{1}{4}$, $\frac{1}{8}$, $\frac{1}{16}$, $\frac{1}{32}$, or any other fractional sample resolution. Interpolation between the two samples at integer positions may be used to generate a reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between the reference block 1304 and the current block 1300. The encoder may determine the difference between the reference block 1304 and the current block 1300, for example, based on/after the reference block 1304 is determined and/or generated, using inter prediction, for the current block 1300. The difference may be a prediction error and/or a residual. The encoder may store and/or send (e.g., signal), in/via a bitstream, the prediction error and/or related motion information. The prediction error and/or the related motion information may be used for decoding (e.g., decoding the current block 1300) and/or other forms of consumption. The motion information may comprise the motion vector 1312 and/or a reference indicator/index. The reference indicator may indicate the reference picture 1306 in a reference picture list. The motion information may comprise an indication of the motion vector 1312 and/or an indication of the reference index. The reference index may indicate reference picture 1306 in the reference picture list. A decoder may decode the current block 1300 by determining and/or generating the reference block 1304. The decoder may determine and/or generate the reference block 1304, for example, based on the prediction error and/or the related motion information. The reference block 1304 may correspond to/form (e.g., be considered as) a prediction of the current block 1300. The decoder may decode the current block 1300 based on combining the prediction with the prediction error.

Inter prediction, as shown in FIG. 13A, may be performed using one reference picture 1306 as a source of a prediction for the current block 1300. Inter prediction based on a prediction of a current block using a single picture may be referred to as uni-prediction.

Inter prediction of a current block, using bi-prediction, may be based on two pictures. Bi-prediction may be useful, for example, if a video sequence comprises fast motion, camera panning, zooming, and/or scene changes. Bi-prediction may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uni-prediction and/or bi-prediction) may depend on a slice type of current block. For example, for P slices, only uni-prediction may be available/used for performing inter prediction. For B slices, either uni-prediction or bi-prediction may be available/used for performing inter prediction. An encoder may determine and/or generate a reference block, for predicting a current block, from a reference picture list 0, for example, if the encoder is using uni-prediction. An encoder may determine and/or generate a first reference block, for predicting a current block, from a reference picture list 0 and determine and/or generate a second reference block, for predicting the current block, from a reference picture list 1, for example, if the encoder is using bi-prediction.

Figure 14:
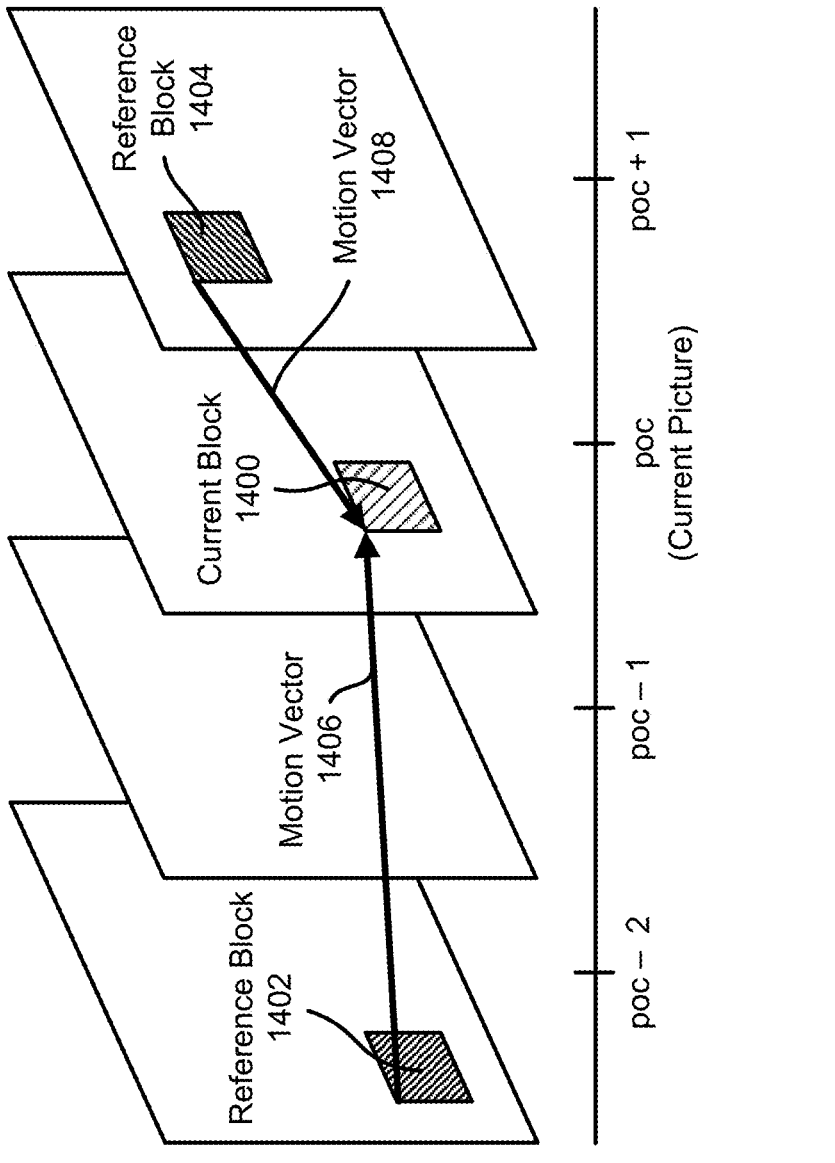
FIG. 14 shows an example of bi-prediction.

FIG. 14 shows an example of bi-prediction. Two reference blocks 1402 and 1404 may be used to predict a current block 1400. The reference block 1402 may be in a reference picture of one of reference picture list 0 or reference picture list 1. The reference block 1404 may be in a reference picture of another one of reference picture list 0 or reference picture list 1. As shown in FIG. 14, the reference block 1402 may be in a first picture that precedes (e.g., in time) a current picture of the current block 1400, and the reference block 1404 may be in a second picture that succeeds (e.g., in time) the current picture of the current block 1400. The first picture may precede the current picture in terms of a picture order count (POC). The second picture may succeed the current picture in terms of the POC. The reference pictures may both precede or both succeed the current picture in terms of POC. A POC may be/indicate an order in which pictures are output (e.g., from a decoded picture buffer). A POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to one or more inter prediction reference blocks. An encoder may enable the use of weighted prediction using a flag in a picture parameter set (PPS). The encoder may send/signal the weight and/or offset parameters in a slice segment header for the current block 1400. Different weight and/or offset parameters may be sent/signaled for luma and/or chroma components.

The encoder may determine and/or generate the reference blocks 1402 and 1404 for the current block 1400 using inter prediction. The encoder may determine a difference between the current block 1400 and each of the reference blocks 1402 and 1404. The differences may be prediction errors or residuals. The encoder may store and/or send/signal, in/via a bitstream, the prediction errors and/or their respective related motion information. The prediction errors and their respective related motion information may be used for decoding and/or other forms of consumption. The motion information for the reference block 1402 may comprise a motion vector 1406 and/or a reference indicator/index. The reference indicator may indicate a reference picture, of the reference block 1402, in a reference picture list. The motion information for the reference block 1402 may comprise an indication of the motion vector 1406 and/or an indication of the reference index. The reference index may indicate the reference picture, of the reference block 1402, in the reference picture list.

The motion information for the reference block 1404 may comprise a motion vector 1408 and/or a reference index/indicator. The reference indicator may indicate a reference picture, of the reference block 1408, in a reference picture list. The motion information for the reference block 1404 may comprise an indication of motion vector 1408 and/or an indication of the reference index. The reference index may indicate the reference picture, of the reference block 1404, in the reference picture list.

A decoder may decode the current block 1400 by determining and/or generating the reference blocks 1402 and 1404. The decoder may determine and/or generate the reference blocks 1402 and 1404, for example, based on the prediction errors and/or the respective related motion information for the reference blocks 1402 and 1404. The reference blocks 1402 and 1404 may correspond to/form (e.g., be considered as) the predictions of the current block 1400. The decoder may decode the current block 1400 based on combining the predictions with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same as (or similar to) the motion of objects in the neighboring block(s). Motion information prediction techniques may comprise advanced motion vector prediction (AMVP) and/or inter prediction block merging.

An encoder (e.g., the encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, and/or blocks at or near the collocated position of the current block in other reference pictures. The encoder and/or a decoder may generate and/or determine the list of candidate MVPs.

The encoder may determine/select an MVP from the list of candidate MVPs. The encoder may send/signal, in/via a bitstream, an indication of the selected MVP and/or a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector that indicates a position (e.g., represented by a horizontal component $(MV_x)$ and a vertical component $(MV_y)$) relative to a position of the current block being coded, the MVD may be represented by two components $MVD_x$ and $MVD_y$. $MVD_x$ and $MVD_y$ may be determined/calculated as:

$$MVD_x = MV_x - MVP_x, \qquad (15)$$

$$MVD_y = MV_y - MVP_y. \qquad (16)$$

$MVD_x$ and $MVD_y$ may respectively represent horizontal and vertical components of the MVD. $MVP_x$ and $MVP_y$ may respectively represent horizontal and vertical components of the MVP. A decoder (e.g., the decoder 300 as shown in FIG. 3) may decode the motion vector by adding the MVD to the MVP indicated in/via the bitstream. The decoder may decode the current block by determining and/or generating the reference block. The decoder may determine and/or generate the reference block, for example, based on the decoded motion vector. The reference block may correspond to/form (e.g., be considered as) the prediction of the current block. The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two (or any other quantity of) spatial candidate MVPs determined/derived from five (or any other quantity of) spatial neighboring blocks of a current block being coded; one (or any other quantity of) temporal candidate MVP determined/derived from two (or any other quantity of) temporal, co-located blocks (e.g., if both of the two spatial candidate MVPs are not available or are identical); and/or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
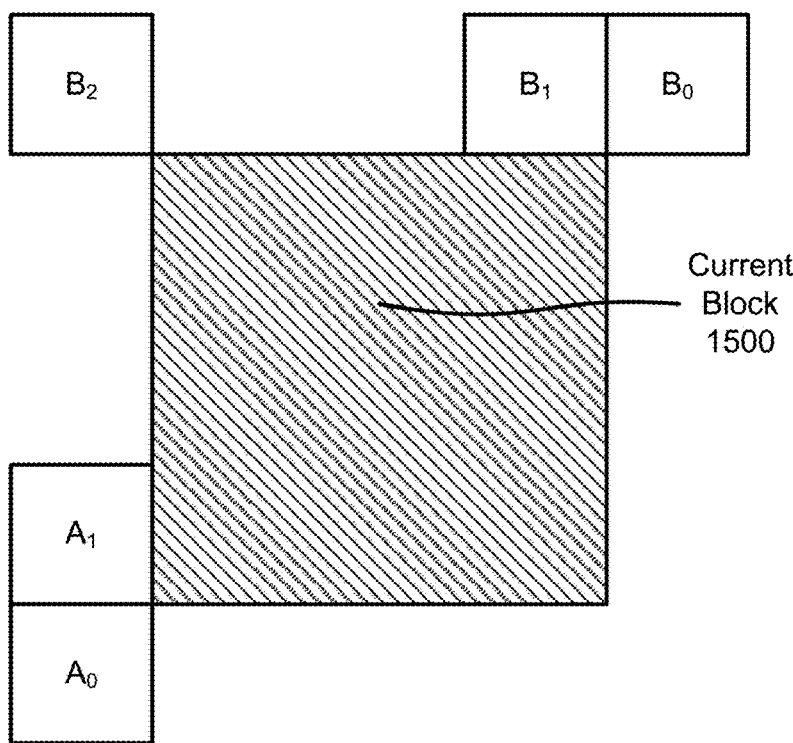
FIG. 15A shows example spatial candidate neighboring blocks for a current block.
Figure 15B:
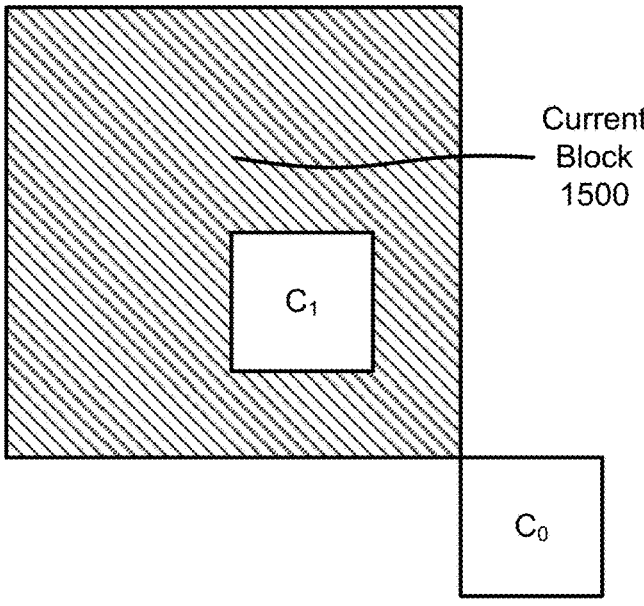
FIG. 15B shows example temporal, co-located blocks for a current block.

FIG. 15A shows spatial candidate neighboring blocks for a current block. For example, five (or any other quantity of) spatial candidate neighboring blocks may be located relative to a current block 1500 being encoded. The five spatial candidate neighboring blocks may be $A_0$, $A_1$, $B_0$, $B_1$, and $B_2$. FIG. 15B shows temporal, co-located blocks for the current block. For example, two (or any other quantity of) temporal, co-located blocks may be located relative to the current block 1500. The two temporal, co-located blocks may be $C_0$ and $C_1$. The two temporal, co-located blocks may be in one or more reference pictures that may be different from the current picture of the current block 1500.

An encoder (e.g., the encoder 200 as shown in FIG. 2) may code a motion vector using inter prediction block merging (e.g., a merge mode). The encoder (e.g., using merge mode) may reuse the same motion information of a neighboring block (e.g., one of neighboring blocks $A_0$, $A_1$, $B_0$, $B_1$, and $B_2$) for inter prediction of a current block. The encoder (e.g., using merge mode) may reuse the same motion information of a temporal, co-located block (e.g., one of temporal, co-located blocks $C_0$ and $C_1$) for inter prediction of a current block. An MVD need not be sent (e.g., indicated, signaled) for the current block because the same motion information as that of a neighboring block or a temporal, co-located block may be used for the current block (e.g., at the encoder and/or a decoder). A signaling overhead for sending/signaling the motion information of the current block may be reduced because the MVD need not be indicated for the current block. The encoder and/or the decoder may generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting motion information of the current block being coded. The encoder may signal/send, in/via a bit stream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding formats/standards/protocols) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. The spatial neighboring blocks and the temporal, co-located blocks used for merge mode may be the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History based motion vector prediction (HMVP), combined intra/inter prediction mode (CIIP), and/or merge mode with motion vector difference (MMVD) (e.g., as described in VVC) may be performed/used and are within the scope of the present disclosure.

Block matching may be used (e.g., in inter prediction) to determine a reference block in a different picture than that of a current block being encoded. Block matching may be used to determine a reference block in a same picture as that of a current block being encoded. The reference block, in a same picture as that of the current block, as determined using block matching may often not accurately predict the current block (e.g., for camera captured videos). Prediction accuracy for screen content videos may not be similarly impacted, for example, if a reference block in the same picture as that of the current block is used for encoding. Screen content videos may comprise, for example, computer generated text, graphics, animation, etc. Screen content videos may comprise (e.g., may often comprise) repeated patterns (e.g., repeated patterns of text and/or graphics) within the same picture. Using a reference block (e.g., as determined using block matching), in a same picture as that of a current block being encoded, may provide efficient compression for screen content videos.

A prediction technique may be used (e.g., in HEVC, VVC, and/or any other coding standards/formats/protocols) to exploit correlation between blocks of samples within a same picture (e.g., of screen content videos). The prediction technique may be intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples of the current picture. The reference block may comprise decoded blocks of samples of the current picture prior to being processed by in-loop filtering operations (e.g., deblocking and/or SAO filtering).

FIG. 16 shows an example of IBC for encoding. The example IBC shown in FIG. 16 may correspond to screen content. The rectangular portions/sections with arrows beginning at their boundaries may be the current blocks being encoded. The rectangular portions/sections that the arrows point to may be the reference blocks for predicting the current blocks.

A reference block may be determined and/or generated, for a current block, for IBC. The encoder may determine a difference (e.g., a corresponding sample-by-sample difference) between the reference block and the current block. The difference may be a prediction error or residual. The encoder may store and/or send/signal, in/via a bitstream the prediction error and/or related prediction information. The prediction error and/or the related prediction information may be used for decoding and/or other forms of consumption. The prediction information may comprise a BV. The prediction information may comprise an indication of the BV. A decoder (e.g., the decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction of the current block. The decoder may decode the current block by combining the prediction with the prediction error.

A BV may be predictively coded (e.g., in HEVC, VVC, and/or any other coding standards/formats/protocols) before being stored and/or sent/signaled in/via a bit stream. The BV for a current block may be predictively coded based on a BV of one or more blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., the encoder 200 as shown in FIG. 2) performing BV prediction and coding may code a BV as a difference between the BV of a current block being coded and a block vector predictor (BVP). An encoder may select/ determine the BVP from a list of candidate BVPs. The candidate BVPs may comprise/correspond to previously decoded BVs of neighboring blocks in the current picture of the current block. The encoder and/or a decoder may generate or determine the list of candidate BVPs.

The encoder may send/signal, in/via a bitstream, an indication of the selected BVP and a block vector difference (BVD). The encoder may indicate the selected BVP in the bitstream using an index/indicator. The index may indicate the selected BVP in the list of candidate BVPs. The BVD may be determined/calculated based on a difference between a BV of the current block and the selected BVP. For example, for a BV that indicates a position (e.g., represented by a horizontal component ($BV_x$) and a vertical component ($BV_y$)) relative to a position of the current block being coded, the BVD may represented by two components $BVD_x$ and $BVD_y$. $BVD_x$ and $BVD_y$ may be determined/calculated as:

$$BVD_x = BV_x - BVP_x, \qquad (17)$$

$$BVD_y = BV_y - BVP_y. \qquad (18)$$

$BVD_x$ and $BVD_y$ may respectively represent horizontal and vertical components of the BVD. $BVP_x$ and $BVP_y$ may respectively represent horizontal and vertical components of the BVP. A decoder (e.g., the decoder 300 as shown in FIG. 3), may decode the BV by adding the BVD to the BVP indicated in/via the bitstream. The decoder may decode the current block by determining and/or generating the reference block. The decoder may determine and/or generate the reference block, for example, based on the decoded BV. The reference block may correspond to/form (e.g., be considered as) the prediction of the current block. The decoder may decode the current block by combining the prediction with the prediction error.

A same BV as that of a neighboring block may be used for the current block and a BVD need not be separately signaled/sent for the current block, such as in the merge mode. A BVP (in the candidate BVPs), which may correspond to a decoded BV of the neighboring block, may itself be used as a BV for the current block. Not sending the BVD may reduce the signaling overhead.

A list of candidate BVPs (e.g., in HEVC, VVC, and/or any other coding standard/format/protocol) may comprise two (or more) candidates. The candidates may comprise candidates A and B. Candidates A and B may comprise: up to two (or any other quantity of) spatial candidate BVPs determined/derived from five (or any other quantity of) spatial neighboring blocks of a current block being encoded; and/or one or more of last two (or any other quantity of) coded BVs (e.g., if spatial neighboring candidates are not available). Spatial neighboring candidates may not be available, for example, if neighboring blocks are encoded using intra prediction or inter prediction. Locations of the spatial candidate neighboring blocks, relative to a current block, being encoded using IBC may be illustrated in a manner similar to spatial candidate neighboring blocks used for coding motion vectors in inter prediction (e.g., as shown in FIG. 15A). For example, five spatial candidate neighboring blocks for IBC may be respectively denoted $A_0$, $A_1$, $B_0$, $B_1$, and $B_2$.

Referring back to FIG. 16, in an Intra Block Copy (IBC) mode used for screen content, a Reference Block (RB) may be determined as a "best matching" RB to a Current Block (CB). For example, the arrows in FIG. 16 may correspond to Block Vectors (BVs) that indicate respective displacements from respective Current Blocks (CBs) to respective Reference Blocks (RBs) that "best match" the respective CBs. The RBs may match the respective CBs, and the calculated residuals may be small, if not zero. Video content may be more efficiently encoded by considering symmetry properties. Symmetry may be often present in video content, especially in text character regions and computer-generated graphics in screen content video.

As an extension to Intra Block Copy (IBC) mode, a Reconstruction-Reordered Intra Block Copy (RRIBC) mode (e.g., also referred to as IBC mirror mode) may be for screen content video coding to take advantage of symmetry within video content to further improve the coding efficiency of IBC. The RRIBC mode may be adopted into the Enhanced Compression Model (ECM) software algorithm that is currently under coordinated exploration study by the Joint Video Exploration Team (JVET) of ITU-T Video Coding Experts Group (VCEG) and ISO/IEC MPEG as a potential enhanced video coding technology beyond the capabilities of VVC. A residual for the CB may be calculated based on samples of a Reference Block (RB) (e.g., samples corresponding to an original RB being encoded and decoded to form a reconstructed block) being flipped relative to the CB according to a flip direction indicated for the CB, for example, if the RRIBC mode is indicated for encoding a Current Block (CB). At the encoder side, the CB (to be predicted) may be flipped, for example, before matching and residual calculation, and the RB (used to predict the current block) may be derived without flipping. Similarly, at the decoder side, the CB (that was flipped at the encoder) may be determined based on the RB and residual information, and may be flipped back to restore the original orientation of the current block before being flipped at the encoder side. The RB may be flipped instead of the CB being flipped, such that the RB may be flipped to encode the CB (at the encoder) and may be flipped back (at the decoder) to restore the original orientation of the RB at the encoder. Throughout this detailed specification, reference to flipping the CB may alternatively refer to flipping the RB and not the CB such that the RB and the CB may be flipped in the flipping direction with respect to each other.

The flipping direction, in the RRIBC mode, may include one of a horizontal direction or a vertical direction for RRIBC coded blocks. A first indication (e.g., a first syntax flag; also referred to as a RRIBC type flag or an IBC mirror mode flag) for a Current Block (CB) coded in the RRIBC mode (e.g., an IBC Advanced Motion Vector Prediction (AMVP) coded block) may indicate/signal whether to use flipping to encode/decode the CB. A second indication (e.g., a second syntax flag; also referred to as a RRIBC direction flag or an IBC mirror mode direction flag) for the CB may indicate/signal the direction for flipping (e.g., a vertical or horizontal flipping direction). The flipping direction for IBC merge mode may be inherited from neighboring blocks, without syntax signaling. Flipping of a CB (or a Reference Block (RB) in an alternative embodiment) for RRIBC in a horizontal and a vertical direction can be represented in equations (19) and (20), respectively:

$$\text{Reference}(x, y) = \text{Sample}(w - 1 - x, y) \qquad (19)$$

$$\text{Reference}(x, y) = \text{Sample}(x, h - 1 - y) \qquad (20)$$

where w and h are the width and height of a CB, respectively. For example, Sample (x, y) may indicate a sample value located in (x, y), and Reference (x, y) may indicate a corresponding reference sample value, for example, after flipping. In other words, for horizontal flipping, (19) shows that the CB is flipped in the horizontal direction by sampling from right to left. Similarly, for vertical flipping, (20) shows that the CB is flipped in the vertical direction by sampling the CB from down to up Considering the horizontal or vertical symmetry, the current block and the reference block may normally be aligned horizontally or vertically, respectively. The reference block may be determined from a reference region (e.g., including candidate reference blocks) aligned in the same flipping direction, for example, based on the RRIBC mode and a flipping direction. The vertical component ($BV_y$) of the BV (e.g., indicating a displacement from the current block to the reference block) may not need to be signaled because it may be inferred to be equal to zero (0), for example, if flipping in a horizontal direction is used/applied/indicated. The horizontal component ($BV_x$) of the BV may not need to be signaled because it may be inferred to be equal to zero (0), for example, if flipping in a vertical direction is used/applied/indicated. Only one component, aligned with the direction for flipping, of the BV may be encoded and signaled for the current block.

Figure 17:
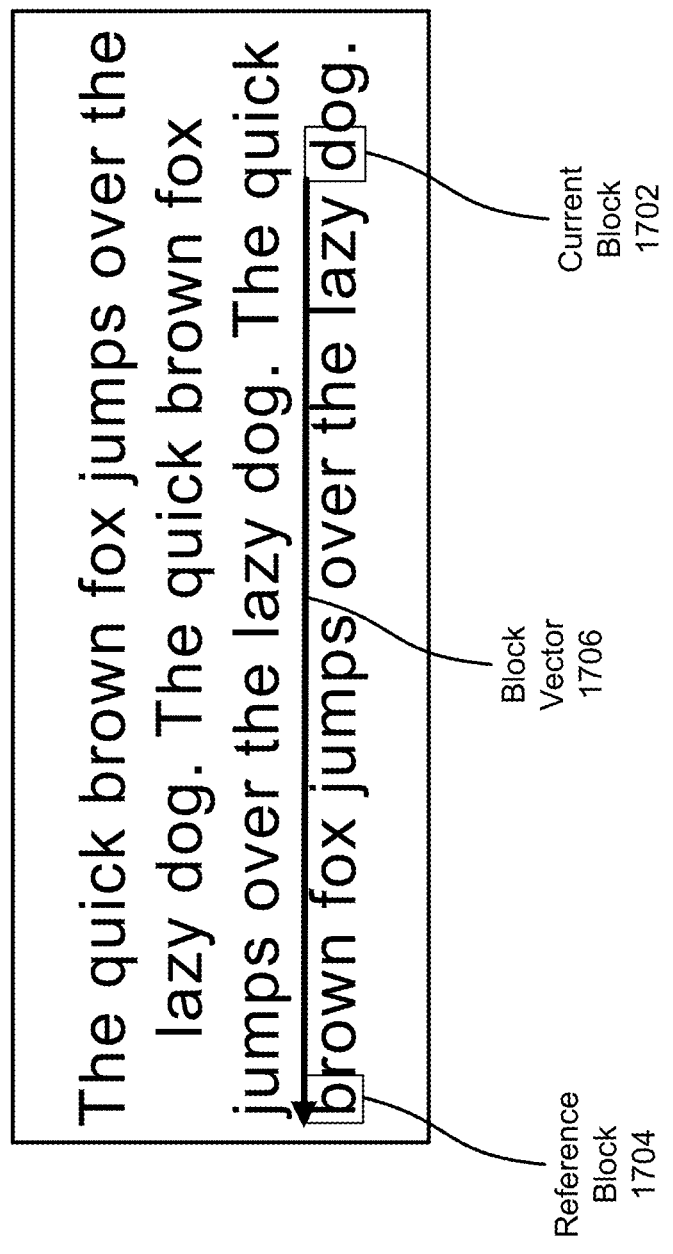
FIG. 17 shows an example of RRIBC used/applied for screen content.

FIG. 17 shows an example of Reconstruction-Reordered Intra Block Copy (RRIBC) mode. A RRIBC mode may be used for screen content to utilize symmetry within text regions to increase efficiency for coding video content. An encoder, similar to the encoder described herein with respect to FIG. 16 (e.g., encoder 114 of FIG. 1) may determine that a reference block (RB) 1704 is the "best matching" reference block for a current block (CB) 1702. The encoder may determine that RB 1704 is the "best matching" RB for CB 1702, for example, based on using (e.g., applying) horizontal flipping The encoder may select reference block 1704 as the "best matching" reference block, for example, based on one or more cost criterion, such as a rate-distortion criterion, as described herein. The one or more cost criterion may be used with respect to reference block 1704 flipped in the horizontal direction relative to current block 1702. Current block 1702 may be flipped, for example, before the one or more cost criterion are used to determine reference block 1704. Reference block 1704, for flipping in the horizontal direction, may be located in a reference region, where the reference region may be in horizontal alignment with current block 1702. A block vector (BV) 1706, indicating a displacement between current block 1702 and reference block 1704, may be represented as only a horizontal component ($BV_x$) of BV 1706 because, due to the constraints on possible locations of reference blocks, the vertical component of BV 1706 may be equal to zero (0), for example, if horizontal flipping is indicated/applied/used.

A BV for the current block, coded in IBC mode, may be constrained to indicate a relative displacement from the current block to a reference block within an IBC reference region. A BVP used to predictively code a BV, for example, may be similarly constrained. This is because a BVP may be derived from a BV of a spatially neighboring block of the current block or a prior coded BV. A BVD may be determined as a difference between the BV and the BVP, for example, based on the BVP. The BVD may be encoded and transmitted along with an indication of the selected BVP in a bitstream to enable decoding of the current block. A reference block (e.g., that is flipped in a direction relative to the current block) may be constrained to (i.e., selected from) an RRIBC reference region, corresponding to the direction, that may be a subset or within the IBC reference region. The BVP may be used to predictively code a BV, for a current block, indicating a relative displacement from the current block to a reference block within a reference region (e.g., RRIBC region). The reference region (e.g., an RRIBC reference region) may be determined that corresponds to the direction for flipping, for example, based on the RRIBC mode being indicated and based on a direction for flipping a reference block relative to a current block. The reference region may indicate a region within a picture frame from which the reference block may be selected (e.g., after flipping of the CB).

A TMP mode may be used for (e.g., applied to) a current block, for example, to determine a reference block in IBC. Reference templates, corresponding to candidate reference blocks, may be searched for a reference template that "best" matches a current template of the current block to determine the reference block for coding the current block. The reference templates may, for example, match the current template in size, shape, and orientation. The TMP mode may consider one or more other template types if searching for a reference block, for example, to take advantage of horizontal or vertical symmetry of content. The TMP mode may, for example, use candidate templates that are flipped in a direction with respect to the current template. The candidate templates may match the current template in shape and size, but not in orientation. The candidate templates may match the current template, for example, after flipping in the direction, in shape, size, and orientation. A TMP search region for TMP mode using flipped templates may be extended to search for candidate refence blocks that may not be aligned in the same row or column as the current block.

Figure 18A:
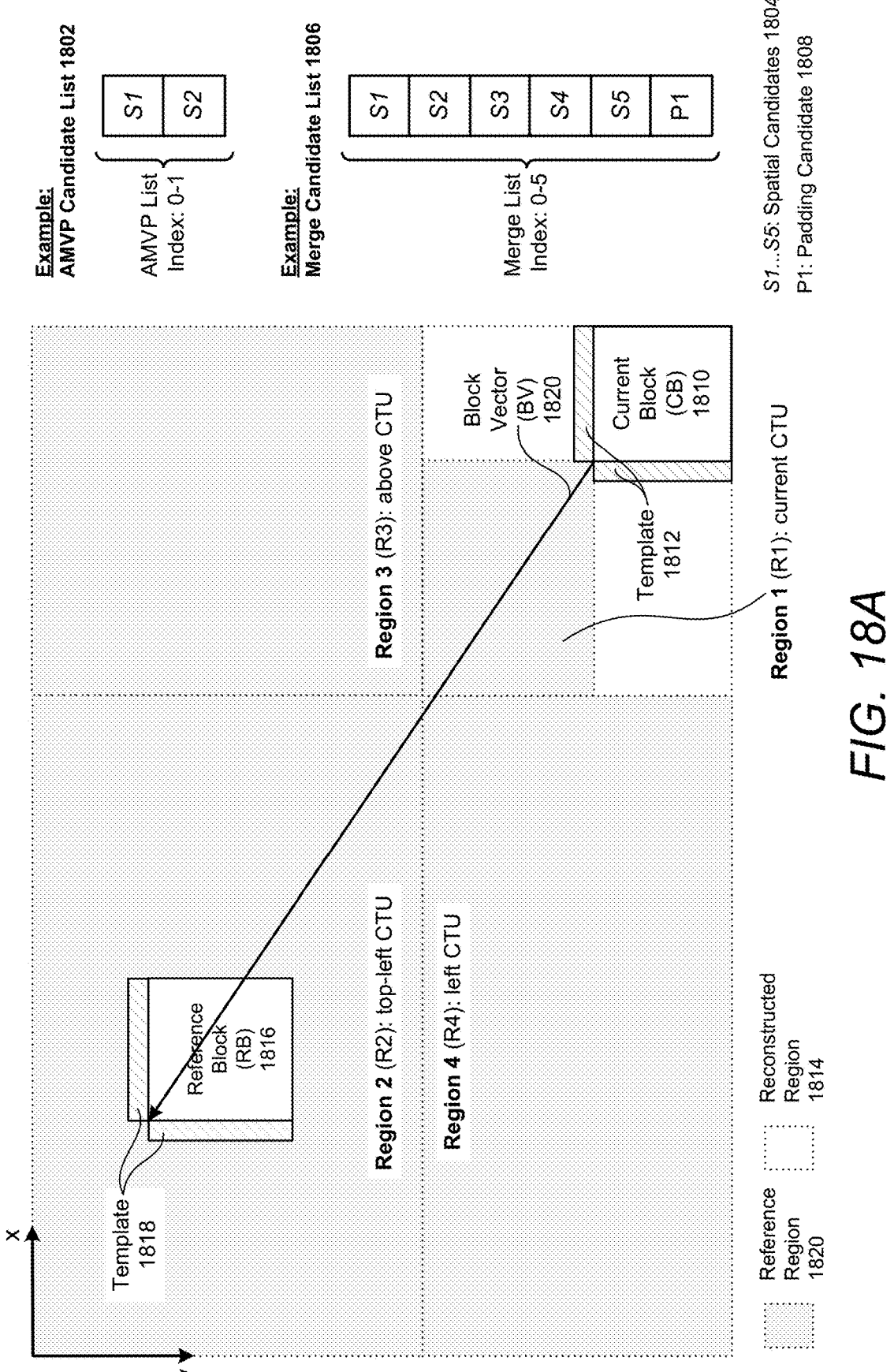
FIG. 18A shows an example of constructing an AMVP candidate list or an IBC merge candidate list.

FIG. 18A shows an example of constructing an AMVP candidate list or an IBC merge candidate list. Prediction methods implemented by the encoder and decoder may include AMVP for IBC and IBC merge mode, for example, in HEVC, VVC, and other implementations.

An encoder and decoder may generate, determine, or construct a list of candidate vectors that may be used for predicting (or decoding) a current block (CB), for example, in AMVP for IBC. The candidate vectors may comprise block vector predictors (BVPs), and the list of candidate vectors may comprise an AMVP List, for example, in AMVP for IBC. A constructed AMVP candidate list 1802 may comprise two candidate vectors referred to as spatial candidates S1 and S2, which are derived from spatial candidates 1804 (e.g., S1, S2, S3, S4, and S5), for example, as shown in FIG. 18A. The encoder may select one of the two candidate vectors in AMVP candidate list 1802 for encoding the CB. The encoder may signal an index to the selected candidate vector in AMVP candidate list 1802 to the decoder in a bitstream. The AMVP candidate list 1802 may have a size of two candidates, corresponding to an example index range of 0-1, as shown in FIG. 18A. The decoder may further generate, determine, or construct the list of candidate vectors in the same manner as the encoder. The decoder may use the signaled index indicating the selected candidate vector in the list of candidate vectors for decoding the CB.

The encoder and decoder may generate, determine, or construct a list of candidate vectors that may be used for predicting (or decoding) a current block (CB), for example, in IBC merge mode. The candidate vectors may comprise block vectors (BVs), and the list of candidate vectors may comprise an IBC merge list, for example, in IBC merge mode. The candidate vectors may comprise block vector predictors (BVPs), and the list of candidate vectors may comprise an IBC merge list, for example, in IBC merge mode. A constructed merge candidate list 1806 may comprise five candidate vectors, referred to as spatial candidates 1804 (e.g., S1, S2, S3, S4, and S5), as shown in FIG. 18A. The merge candidate list 1806 may further comprise an additional padding candidate 1808, referred to as P1, for example, as shown in FIG. 18A. The encoder may select one of the six candidate vectors in merge candidate list 1806 for encoding the CB. The encoder may signal an index to the selected candidate vector in merge candidate list 1806 to the decoder in a bitstream. The merge candidate list 1806 may have a size of six candidates, corresponding to an example index range of 0-5, as shown in FIG. 18A. The decoder may further generate, determine, or construct the list of candidate vectors in the same manner as the encoder. The decoder may determine an RB for decoding the CB based on the signaled index indicating the selected candidate vector in the list of candidate vectors.

Template matching prediction (TMP) is another prediction method that may be implemented by the encoder and decoder. A reconstructed region may be searched for a template of a reference block (RB) that matches a template of a current block (CB), for example, in TMP. The template of the RB may indicate a location of the RB in the reconstructed region, and the RB at this location may be used to predict (or decode) the CB.

FIG. 18A further shows an example of TMP for predicting current block (CB) 1810. CB 1810 may comprise a rectangular block of samples to be encoded by an encoder. The encoder may determine or construct a template 1812 of CB 1810 for predicting CB 1810, for example, if TMP mode is used/applied. The encoder may determine or construct template 1812 based on samples in a reconstructed region 1814. Template 1812 may comprise samples in reconstructed region 1814 that may be adjacent to the samples of CB 1810. Template 1812 may comprise samples in reconstructed region 1814 to the left and/or above CB 1810.

The encoder may search reconstructed region 1814 for a template of a reference block (RB) (e.g., RB 1816) that may be determined to match template 1812 of CB 1810. The encoder may search reconstructed region 1814 for the template of the RB that may be determined to match template 1812 of CB 1810, for example, if template 1812 of CB 1810 has been determined or constructed. The encoder may search reconstructed region 1814 for a template of an RB that matches template 1812 of CB 1810, for example, based on determining a cost between template 1812 and one or more templates of one or more reference blocks (RBs) in reconstructed region 1814. The cost may be, for example, based on a difference (e.g., sum of squared differences (SSD), sum of absolute differences (SAD), sum of absolute transformed differences (SATD), or difference determined based on a hash function) between a template of an RB and template 1812 of CB 1810. The template 1818 of RB 1816 may be determined to match template 1812 of CB 1810 (e.g., based on the cost between template 1812 of CB 1810 and template 1818 of RB 1816), as shown in FIG. 18A. A block vector (BV) (e.g., BV 1820) may indicate the displacement of an RB (e.g., RB 1816) relative to a CB (e.g., CB 1810).

The encoder may use RB 1816 to predict CB 1810. The encoder may use RB 1816 to predict CB 1810, for example, after determining that template 1818 of RB 1816 matches template 1812 of CB 1810. The encoder may determine a difference (e.g., a corresponding sample-by-sample difference) between CB 1810 and RB 1816. The difference may be referred to as a prediction error or residual. The encoder may store and/or signal in a bitstream the prediction error or residual for decoding by a decoder.

A decoder may perform the same operations as the encoder. A decoder may perform the same operations as the encoder, for example, if TMP mode is used/applied, as described herein with respect to FIG. 18A. The decoder may determine or construct template 1812 of CB 1810, for example, based on receiving an indication from the encoder that TMP is used to predict CB 1810 (e.g., via a flag). The decoder may search reconstructed region 1814 for a template of an RB that is determined to match template 1812 of CB 1810, for example, if template 1812 has been determined or constructed. The decoder may, for example, determine that template 1818 of RB 1816 matches template 1812 of CB 1810. The decoder may use RB 1816 to predict (or decode) CB 1810, for example, if template 1818 of RB 1816 matches template 1812 of CB 1810. The decoder may combine the residual received from the encoder with RB 1816 to reconstruct CB 1810.

FIG. 18A further shows an example reference region 1820. Reference region 1820 may comprise a portion of reconstructed region 1814. Reference region 1820 may indicate the regions that the encoder or decoder may search, for example, if TMP is performed/used/applied for one or more templates of RBs that match template 1812 of CB 1810. Reference region 1820 may include four regions. Region 1 (R1) may be the current CTU, region 2 (R2) may be the top-left CTU, region 3 (R3) may be the above CTU, and region 4 (R4) may be the left CTU, for example, relative to CB 1810. The CTUs may be a result of picture partitioning operations. An encoder or decoder may search for a matching template within reference region 1820 (e.g., within each of R1, R2, R3, and R4). Template 1818 of RB 1816 may be determined to match template 1812 of CB 1802, for example, based on determining a cost. The cost may be based on a difference (e.g., sum of squared differences (SSD), sum of absolute differences (SAD), sum of absolute transformed differences (SATD), or difference determined based on a hash function) between template 1818 of RB 1816 and template 1812 of CB 1810. The decoder may use RB 1816 to reconstruct (or decode) CB 1810.

The dimensions of reference region 1820 (referred to as SearchRange_w, SearchRange_h) may be set proportionally to the dimensions of CB 1810 (referred to as BlkW, BlkH), for example, for a fixed number of SAD comparisons (or other difference comparisons) per pixel. The dimensions of reference region 1820 may be calculated as follows:

$$SearchRange\_w = a * BlkW \tag{21}$$

$$SearchRange\_h = a * BlkH \tag{22}$$

where 'a' (or alpha) may be a constant that controls a gain/complexity trade-off for the encoder or decoder. 'a' may, for example, be equal to 5 or another similar constant value. The dimensions of the regions of reference region 1820 and reconstructed region 1814 may vary, and one or more of the regions may not be present. Portions of reconstructed region 1814 directly above and directly left of CB 1810 may not be available for prediction and may be excluded from reference region 1820, for example, as shown in FIG. 18A. This may be because an RB in these portions may overlap with CB 1810, which may be an invalid location for the prediction of CB 1810. A similar restriction may also be based on the unavailability of samples because of the sequence order of encoding or decoding, or because the samples may be outside of the reference region or the current picture.

FIG. 18B shows an example of constructing an initial BVP candidate list and a final BVP candidate list. More specifically, FIG. 18B shows an example of constructing an initial BVP candidate list and a final BVP candidate list from varying types of BVP candidates. An IBC merge or AMVP candidate list may initially comprise a plurality of BVP candidates of varying types and from varying sources, for example, as shown in FIG. 18B.

An initial IBC merge candidate list may comprise up to 28 BVP candidates, which may be added to the candidate list in the following order, for example, as shown in FIG. 18B. Up to five (5) spatial BVP candidates may be added to the candidate list from the left and top neighboring blocks to the current block. The spatial BVP candidates may be designated or referred to as, for example, Left ($A_1$), Above ($B_1$), Above-Right ($B_0$), Bottom-Left ($A_0$), and Above-Left ($B_2$). The spatial candidates (e.g., S1, S2, S3, S4, and S5; denoted as S1 to Sn) may comprise candidate block vector predictors (BVPs) which may indicate locations of reference blocks (RBs) (denoted as $A_0$, $A_1$, $B_0$, $B_1$, and $B_2$) relative to a current block within a reference region. Up to twenty (20) history-based motion vector prediction (HMVP) candidates may be added to the candidate list, for example, based on IBC BVP candidates previously used for prediction. The HMVP candidates may be denoted as H1 to Hn, and may be derived from IBC BVP candidates previously used for prediction independently of the location of these candidates within the reference region, for example, as shown in FIG. 18B. A pairwise average (PA) candidate may be added to the candidate list. The PA candidate may be constructed, for example, based on calculating the average of each of the horizontal and vertical vector components of $BVP_0$ and $BVP_1$. The PA candidate may be denoted as PW1, for example, as shown in FIG. 18B. Up to six (6) non-zero padding BVP candidates may be added to the candidate list, for example, based on the location and dimensions of the current block. The padding candidates may be denoted as P1 to Pn, for example, as shown in FIG. 18B. The padding candidates may be added to the candidate list, for example, if spatial, HMVP, and/or pairwise average candidates are not valid or available for prediction.

An encoder or decoder may construct an initial IBC merge/AMVP candidate list with a target size of a certain number of prediction candidates prior to pruning the list, for example, to create a final merge/AMVP candidate list. An encoder or decoder may determine whether candidates may be valid for prediction. Determining whether a candidate may be valid for prediction may include, for example, determining whether the candidate is available (e.g., the candidate is located within a reconstructed region), as well as determining whether the candidate is identical to another prediction candidate already included in the candidate list (also referred to as determining whether the candidate is a duplicate). A candidate may not be available for prediction because a reference block in a particular location may overlap with the current block, which may be an invalid location for the prediction of the current block. A candidate may not be available for prediction, for example, based on the unavailability of samples because of the sequence order of encoding or decoding, or because the samples may be outside of the reference region or the current picture. An encoder or decoder may determine invalid candidates for removing (or "pruning") invalid candidates from the initial list to create a final list to be used for prediction (or decoding).

The number of candidates in a candidate list may be expanded or reduced, for example, due to efficiency trade-offs based on memory requirements or computational complexity. More or fewer candidates, as well as candidates other than spatial candidates, HMVP candidates, pairwise candidates, and padding candidates, may be considered and included in the initial BVP candidate list and the final BVP candidate list.

The candidates may be checked to be valid, for example, before a candidate may be included in the initial list. The validity may comprise checking that the BVP is pointing to a place inside the reference region (RR), that the entire reference block is inside the RR, and that BVP is not already in the list, for example, to avoid duplicates candidates on the list that would reduce candidate diversity.

A first approach, referred to as "IBC Merge List modification," may be based on the BVP candidates being reordered according to the TM cost between the samples of the top row and left column template (currently only one row and one column are used) of the reference block, and the samples of the top and left templates of the current block. The first 6 candidates with the lowest template matching costs may be selected as the final candidates in the IBC merge list, for example, after reordering. The 6 candidates may comprise the final IBC merge list.

A second approach, referred to as "IBC with Template Matching" (IBC-TM), may be based on refining the IBC merge candidates in the list. This second approach may be based on refining the IBC merge candidates in the list, for example, if reordering based on the template matching (TM) cost of the candidates. The best IBC-TM merge candidate may compete with the best regular IBC merge candidate. A TM-merge flag may be signaled to indicate to which list the candidate belongs, for example, the regular IBC merge list or the refined IBC-TM merge list.

A third approach, referred to as "IBC Merge Mode with Block Vector Differences (IBC-MBVD)," may be based on the refinement of the 5 first IBC Merge candidates in the list. This third approach may be based on the refinement of the 5 first IBC Merge candidates in the list, for example if the list reordering is performed. IBC-MBVD may compute the TM costs in 80 positions around each of the selected BVPs in the horizontal and vertical direction, using a predefined offset value (e.g., {1-pel, 2-pel, 4-pel, 8-pel, 12-pel, 16-pel, 24-pel, 32-pel, 40-pel, 48-pel, 56-pel, 64-pel, 72-pel, 80-pel, 88-pel, 96-pel, 104-pel, 112-pel, 120-pel, 128-pel}). The TM costs of the new 8 refined candidates (20×4) may be used to reorder the new candidates, and the 8 refined candidates with the lower cost may be selected. A flag and an index to the best candidates of the 8 refined candidates may be signaled to specify whether IBC-MBVD mode is used for IBC Merge mode, for example, if the best-refined candidate using IBC-MBVD mode is selected for the IBC merge mode instead of the regular IBC merge mode or the IBC-TM mode.

A fourth approach, referred to as "Reconstruction-Reordered IBC (RRIBC)," may exploit the character and object symmetry that frequently occur in the screen and synthetic video content, for example, by using as a prediction/reference block a horizontal or vertical flipped version of the reference block (RB). A BVP in the IBC Merge/AMVP list may indicate a location of an RB in the search region, which may be used as a prediction block in three distinct types: 1) Non-Flip: an RB may be used as a prediction block without any processing; 2) H-Flip: the RB pixels may be mirrored with respect to the vertical axis passing through the center of the block; and, 3) V-Flip: the RB pixels may be mirrored with respect to the horizontal axis passing through the center of the block. The IBC spatial, HMVP, and pairwise candidates in the IBC merge list may indicate a non-flipped or Horizontal/Vertical flipped BVP candidate. The flipping or non-flipping type of each BVP candidate in the list may be indicated by a tag or label in the IBC Merge list, for example, for correct reordering of the list according to the TM cost of BVP candidates and for accurate refining using the IBC-TM or IBC-MBVD.

The flipping or non-flipping type of each BVP candidate in the list should be correctly classified or indicated by a tag or label in the IBC Merge list, for example, for correct reordering in the list according to their TM cost and for accurate refining using the IBC-TM or IBC-MBVD. A problem with existing approaches arises because the identification of BVP candidates is not homogeneous. The flipping types of the BVP candidates may not be indicated correctly, for example, based on the candidate type (e.g., spatial, HMVP, or pairwise), and the IBC merge mode evaluated in the encoder or the IBC Merge mode signaled to the decoder (e.g., Regular, IBC-TM, or IBC-MBVD), as shown by FIG. 18B, Example C. The spatial and HMVP candidates may be correctly tagged according to the BVP's origin, and the reordering may be applied using the correct templates, for example, for regular IBC Merge mode. The pairwise candidate may always be classified as a non-flipped candidate, even though the two first candidates in the list used to determine the pairwise BVP may be flipped BVPs in the same direction. The left and top templates may be used, for example, for the non-flipped BVPs. The current block's top and left templates may be horizontally flipped and compared with the reference block's top and right non-flipped templates, for example, for the left-flipped BVPs. The current block's left and top templates may be vertically flipped and compared with the reference block's bottom and left non-flipped templates, for example for the vertically flipped BVPs. All BVP candidates, independently of the flip type of BVP candidates, may be tagged as if they were non-flipped candidates because the IBC-TM mode may not consider that a BVP may indicate a flipped RB, for example, for the IBC-TM mode. TM cost may be computed by the list reordering and for the refinement process using the non-flipped top and left templates of the current and reference block. Only the HMVPs candidates may be correctly tagged according to the flip type of the BVPs, for example, for the IBC-MBVD mode. The Spatial and Pairwise candidates may always be classified as non-Flipped BVPs. The reordering and refinement may only be used/applied correctly to the HMVPs candidates. The incorrect classification of the BVPs may have an effect on list reordering and candidate refinement. For example, an incorrect candidate reordering may cause the 6 first reordered candidates pruned in the list to be used as the valid IBC Merge candidates, which may not be the best predictors in the list for the current block. As another example a refinement using the incorrect templates may cause the incorrect BVP candidate to be selected due to an inaccurate cost computation.

Improvements described herein include advantages such as determining a list of BVP candidates for a prediction mode, based on a plurality of clusters of BVP candidates and flipping types of the BVP candidates. An encoder or decoder may determine flipping types for a plurality of block vector predictor (BVP) candidates, for example, based on an indication of a prediction mode. The encoder or decoder may determine costs for the plurality of BVP candidates, for example, based on the flipping types. The encoder or decoder may determine a first cluster comprising each BVP candidate, of the plurality of BVP candidates, with a distance from a first reference BVP candidate that is less than or equal to a threshold. The encoder or decoder may determine a second cluster comprising one or more BVP candidates, of the plurality of BVP candidates, not within the first cluster. The encoder or decoder may select a first BVP candidate from the first cluster, for example, based on the costs of the BVP candidates in the first cluster. The encoder or decoder may select a second BVP candidate from the second cluster, for example, based on the costs of the BVP candidates in the second cluster. The encoder or decoder may insert, into a list of BVP candidates for the prediction mode, the selected first BVP candidate and the selected second BVP candidate. The flipping or non-flipping type of each BVP candidate in the list may be indicated by a tag or label in the IBC Merge list, for example, by inserting an indication of the flipping type of each of the selected BVP candidates into the list of BVP candidates.

FIG. 19A shows an example of constructing an IBC merge BVP candidate list. More specifically, FIG. 19A shows an example of constructing an IBC merge BVP candidate list including tagging flipping types of BVP candidates. An initial IBC Merge list may comprise twenty (20) BVP candidates, for example, as shown in FIG. 19A. The first five candidates may correspond to the five spatial BVPs (e.g., $S_1$, $S_2$, $S_3$, $S_4$, and $S_5$). The following nine candidates may comprise nine HMVP candidates (e.g., $H_3$, $H_5$, $H_9$, $H_{10}$, $H_{12}$, $H_{15}$, $H_{17}$, $H_{18}$, and $H_{19}$), followed by one pairwise average candidate ($PW_1$), and followed by five non-zero padding candidates (e.g., $P_1$, $P_2$, $P_3$, $P_4$, and $P_5$).

The third column in the table of Example A shows each BVP candidate's flipping type in the initial IBC Merge list. The figure on the left shows the first nine BVP candidates in the list, showing the templates that may be used according to the flipping type of the BVP candidates. The reordering and refinement based on template matching (TM) costs may use the left and top template of the reference block, for example, for the candidates with a non-flipping type (e.g., $BVP_1$, $BVP_4$, $BVP_5$, and $BVP_9$). The top and right templates may be used to determine TM costs to be consistent with the horizontal flipping type, for example, for the BVP candidates tagged with a horizontal flipping type (e.g., $BVP_2$ and $BVP_7$). The reference block's left and bottom templates may be used to determine TM costs to be consistent with the vertical flipping type, for example, for vertically flipped candidates (e.g., $BVP_3$ and $BVP_6$).

Figure 19B:
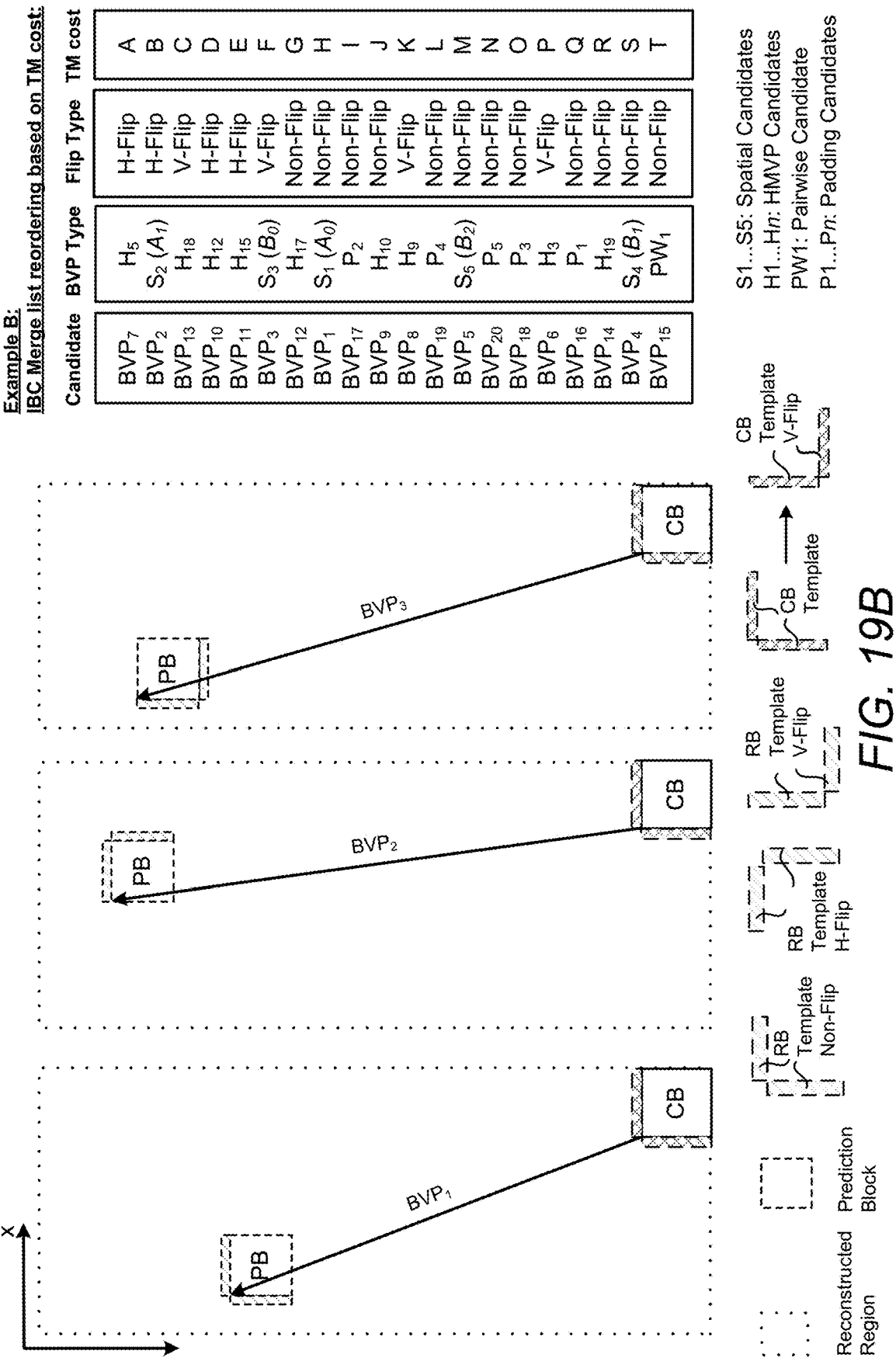
FIG. 19B shows an example of reordering an IBC merge BVP candidate list.

FIG. 19B shows an example of reordering an IBC merge BVP candidate list. More specifically, FIG. 19B shows an example of reordering an IBC merge BVP candidate list including reordering BVP candidates based on template matching (TM) costs and flipping types. The initial IBC merge BVP candidate list shown in FIG. 19A may be reordered, for example, based on template matching (TM) costs, as shown in FIG. 19B. The TM costs may be reordered in ascending order, as shown in FIG. 19B. The TM costs may be computed according to the flipping types of the BVP candidates. The first candidate (e.g., $BVP_7$) may have the lowest (or smallest) TM cost denoted by the first alphabetic character (e.g., A), and the last candidate (e.g., $BVP_{15}$) may have the highest (or largest) TM cost in the list, indicated by the last alphabetic character (e.g., T) in the list, for example, as shown in FIG. 19B.

The template of the reference block (RB) may be flipped in a horizontal flipping direction or a vertical flipping direction to determine TM costs, for example depending on the flipping type of a BVP candidate. The template of the current block (CB) may be flipped in a horizontal flipping direction or vertical flipping direction to determine TM costs. A template of the flipped reference block may correspond to a template of the current block flipped in that direction, for example, for a reference block flipped in a direction (e.g., horizontal or vertical). A corresponding reference block template may match the flipped current block template in at least shape, size, and orientation. The sizes of the reference template and the current template may not exactly match, for example, if the current template is down sampled. Further examples relating to flipping templates of a reference block or a current block are discussed herein with regard to FIG. 17, FIGS. 18A-B, and FIG. 19A.

Figure 20A:
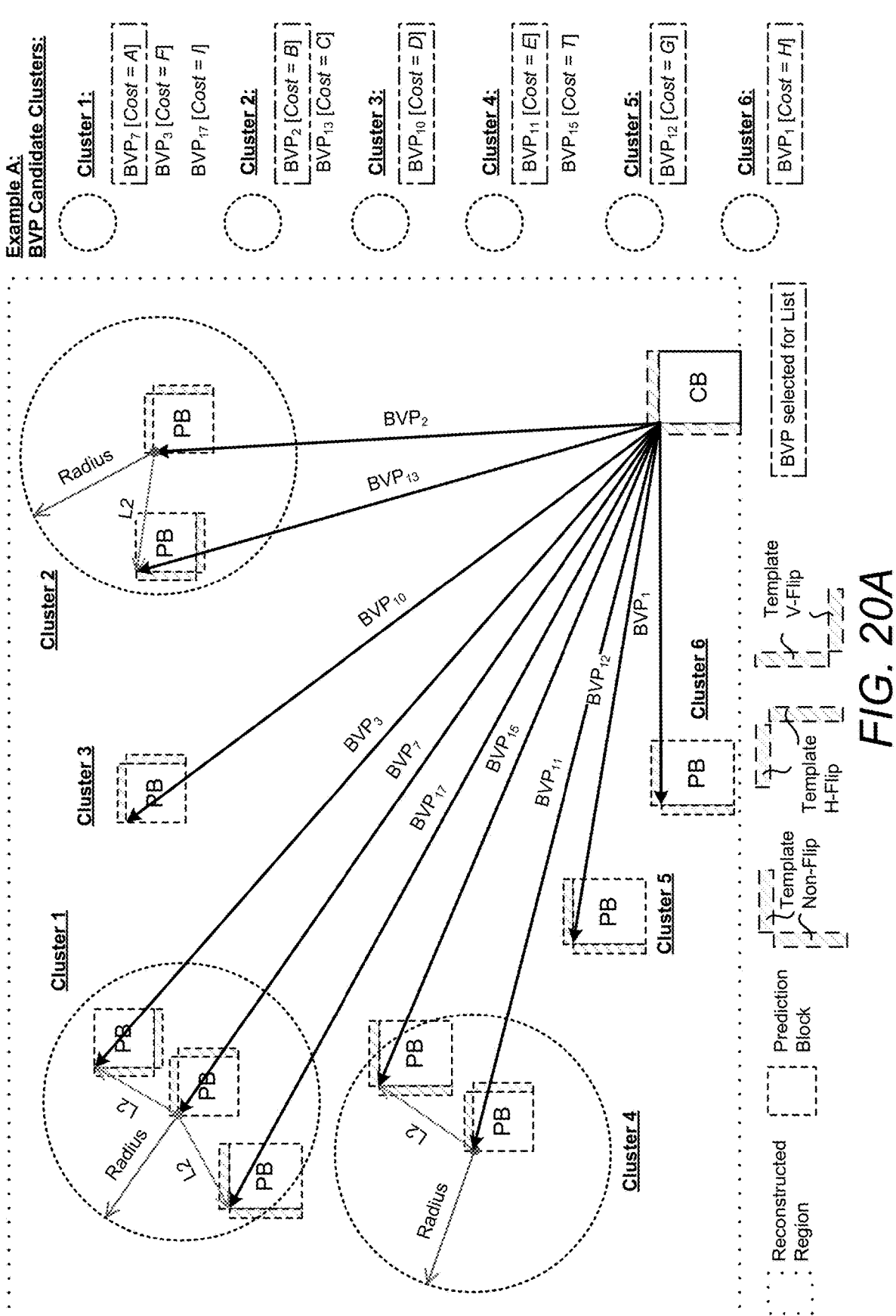
FIG. 20A shows an example of determining a plurality of clusters of BVP candidates.

FIG. 20A shows an example of determining a plurality of clusters of BVP candidates. More specifically, FIG. 20A shows an example of determining a plurality of clusters of BVP candidates based on an IBC merge BVP candidate list. The BVP candidate with the lowest TM cost (e.g., $BVP_7$ with Cost='A') may be selected as a pivot candidate (also referred to as a reference BVP candidate) for the first cluster (e.g., 'Cluster 1'), for example, for determining a first cluster. Two BVP candidates in the ordered list of BVP candidates, $BVP_3$ and $BVP_{17}$, may have an L2 distance to $BVP_7$ less than a specified radius (also referred to as the L2 distance being less than a threshold). $BVP_3$ and $BVP_{17}$ may be added to the first cluster and may be removed from the ordered list of BVP candidates.

An L2 distance may be based on a distance between an endpoint of a reference BVP candidate and an endpoint of each BVP candidate belonging to a particular cluster. The L2 distance may also be referred to as a Euclidean distance, or an L2 norm of a distance vector between the reference BVP candidate and each BVP candidate of a cluster. The threshold may be a radius value, represented in units of pixels, of a circle centered at an endpoint of the first reference BVP candidate, and each BVP candidate of the first cluster may have an endpoint inside the circle.

The method may be repeated (or iterated), for example, for subsequent clusters. The next valid BVP candidate in the ordered list may be determined, e.g., $BVP_2$, as a pivot or reference BVP candidate for the second cluster, for example, as shown in FIG. 20A. The next BVP candidate with an L2 distance to $BVP_2$ less than a specified radius (or threshold) may be $BVP_{13}$. $BVP_{13}$ may be added to the second cluster and may be removed from the ordered list of BVP candidates. The next valid candidate in the ordered list may be $BVP_{10}$, which may be selected as a pivot or reference BVP candidate for the third cluster. In the example shown in FIG. 20A, no other candidates in the list may have a distance to $BVP_{10}$ less than the specified radius (or threshold). The method may be iterated until the number of clusters reaches the maximum number of BVP candidates in the IBC merge list, for example, six clusters for determining an IBC merge list. The BVP candidate, within each cluster, having the lowest TM cost within that cluster may be selected for insertion into the IBC merge list, for example, such that the number of selected BVP candidates in the IBC merge list may be equal to the maximum number of BVP candidates for IBC merge list (e.g., six selected BVP candidates).

FIG. 20B shows an example of determining a plurality of clusters of BVP candidates. More specifically, FIG. 20B shows an example of determining a plurality of clusters of BVP candidates based on an IBC merge BVP candidate list including reordering BVP candidates based on TM costs and flipping types.

Referring to FIG. 20B, Example A may represent the IBC merge list tagged with flipping types of the BVP candidates, for example, as shown in FIG. 19A. The initial IBC merge list may, for example, comprise 20 BVP candidates, indicating the type of predictor (e.g., spatial, HMVP, pairwise average or non-zero padding), the flip type, and the TM cost computed according to their flip type for each of the BVP candidates. Referring to FIG. 20B, Example B may represent the IBC merge list reordered according to ascending TM costs, for example, as shown in FIG. 19B. Example C may represent the IBC merge list, for example, after it is pruned by selecting a BVP candidate having the lowest TM cost from each of the six clusters of BVP candidates, as described in more detail herein with regard to FIG. 20A and FIG. 21. The encoder and decoder may determine the IBC merge list in substantially the same manner as described herein.

Figure 21:
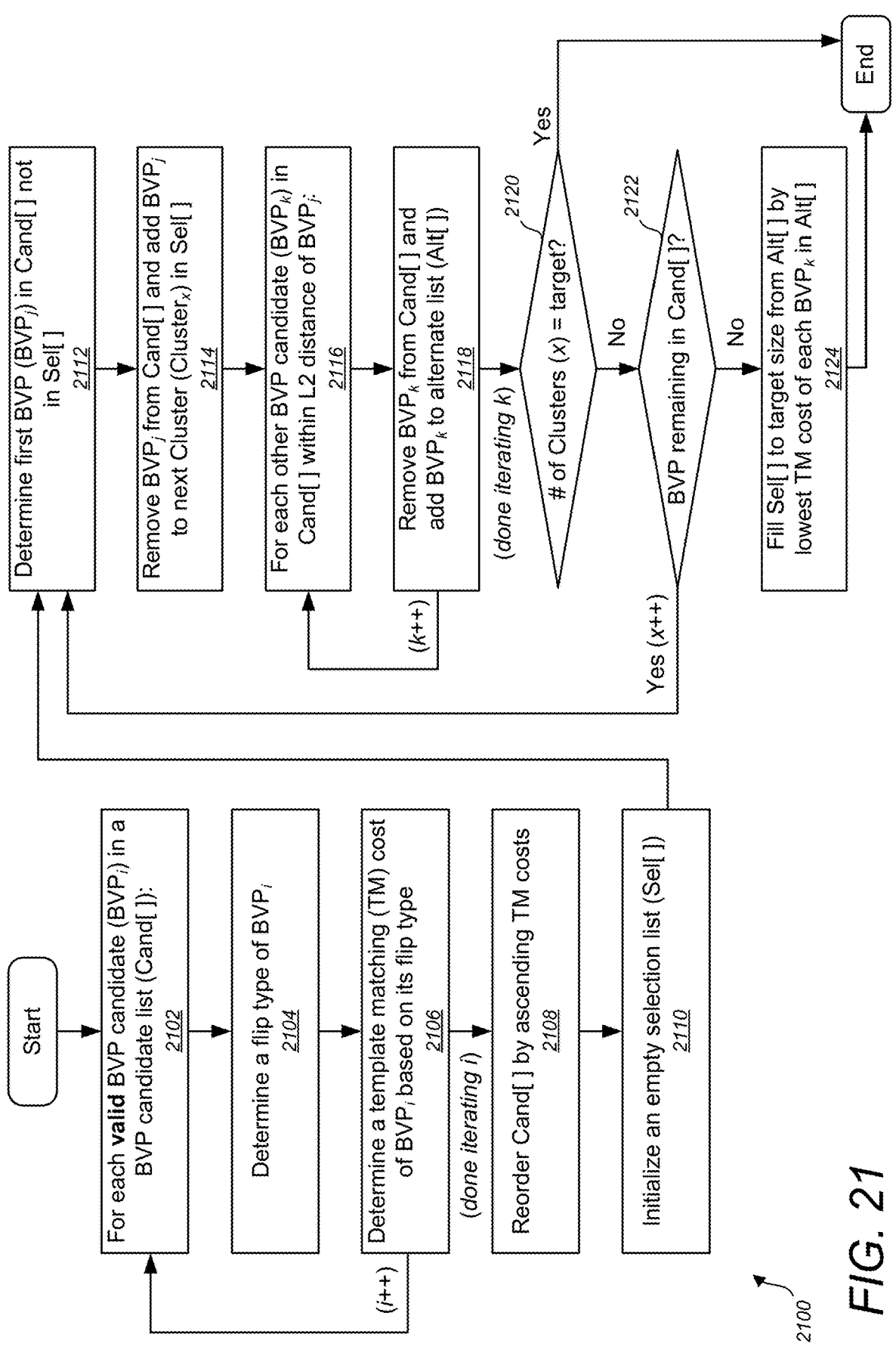
FIG. 21 shows an example method for determining a plurality of clusters of BVP candidates.

FIG. 21 shows an example method for determining a plurality of clusters of BVP candidates. More specifically, FIG. 21 shows an example method for determining a plurality of clusters of BVP candidates based on an IBC merge BVP candidate list including reordering BVP candidates based on TM costs and flipping types.

Determining the plurality of clusters of BVP candidates may include the following aspects. An encoder or decoder may include tagging all types of BVPs in the IBC merge list according to their flip type. The flipping type of the BVP candidates may be considered, for example, if calculating or determining the pairwise candidate, since the pairwise candidate may be calculated from two BVP candidates. Clustering of the IBC AMVP list may be used/applied for clustering to a maximum size of two (2) clusters. Clustering may be adapted to six clusters instead of two clusters, and the clustering algorithm may be used for (e.g., applied to) the reordered list of BVP candidates, since the number of BVP candidates that may be signaled in the IBC Merge mode is six (6).

The clustering algorithm may be based on the following steps a) through f). In step a), all the candidates in the list may be classified as "valid," and the clustering for the first group may begin. In step b), the first "valid" BVP in the ordered list may be selected as the pivot candidate for the group and may be chosen as the BVP candidate for this group (e.g., the reminder candidates in the IBC merge list have higher TM costs because the list is reordered by ascending TM cost). In step c), the pivot candidate may be removed from the list (e.g., they are tagged as "invalid"). In step d), the list may be scrolled down, and all the candidates in the list who are inside of the radius of this group may be removed from the list. In step e), steps b) to d) may be repeated for the subsequent groups until the ordered candidate list is empty. In step f), the remaining positions in the list may be filled with the non-selected BVPs with lower TM costs (e.g., the first BVPs in the list), for example, if the number of groups is less than 6 (the maximum number of merge candidates that may be signaled).

Clustering method 2100 may be implemented, for example, by an encoder (e.g., encoder 200 in FIG. 2) or a decoder (e.g., decoder 300 in FIG. 3). The clustering method 2100 may include one or more of the following steps. Step 2102 may include, for each valid BVP candidate (BVP$_j$) in a BVP candidate list (Cand[ ]), performing steps 2104 and 2106. Step 2104 may include determining a flip type of each valid BVP candidate (BVP$_i$). Step 2106 may include determining a template matching (TM) cost of each valid BVP candidate (BVP$_i$) based on its flip type. Step 2108 may include reordering the BVP candidate list (Cand[ ]) by ascending TM costs, for example, if all BVP candidates (BVP$_j$) in the BVP candidate list (Cand[ ]) have been iterated through (e.g., steps 2102-2106). Step 2110 may include initializing an empty selection list (Sel[ ]). Step 2112 may include determining a first BVP (BVP$_j$) in the BVP candidate list (Cand[ ]) that is not in the selection list (Sel[ ]). Step 2114 may include removing BVP$_j$ from the BVP candidate list (Cand[ ]) and adding BVP$_j$ to the next cluster (Clusterx) in the selection list (Sel[ ]). Step 2116 may include, for each other BVP candidate (BVP$_k$) in the BVP candidate list (Cand[ ]) within an L2 distance of BVP$_j$, performing step 2118. Step 2118 may include removing BVP$_x$ from the BVP candidate list (Cand[ ]) and adding BVP$_k$ to an alternate list (Alt[ ]). Step 2120 may include determining whether the number of clusters (x) is equal to a target size (e.g., a target size of two BVP candidates for an AMVP list or a target size of six BVP candidates for a merge list), for example, if all other BVP candidates (BVP$_k$) have been iterated through (e.g., steps 2116-2118). The process ends, for example, if the result of determining step 2120 is true (Yes). Step 2122 may be performed, for example, if the result of determining step 2120 is false (No). Step 2122 may include determining whether there are any BVP candidates remaining in the BVP candidate list (Cand[ ]). The number of clusters (x) is incremented and the process iterates again from step 2112, for example, if the result of determining step 2122 is true (Yes). Step 2124 may be performed, for example, if the result of determining step 2122 is false (No). Step 2124 may include filling the selection list (Sel[ ]) to the target size of BVP candidates from the alternate list (Alt[ ]) in order by the lowest TM cost of each BVP$_k$ in the alternate list (Alt[ ]). The process may end because the selection list of BVP candidates is complete (i.e., it is populated for the target size of BVP candidates based on the type of the list of BVP candidates (e.g., AMVP or merge) based on the clustering), for example, after step 2124 is completed.

FIG. 22 shows an example method for determining a list of BVP candidates for a prediction mode. More specifically, FIG. 22 shows a flowchart 2200 of an example method for determining a list of BVP candidates for a prediction mode, based on a plurality of clusters of BVP candidates and flipping types of the BVP candidates. The method of flowchart 2200 may be implemented, for example, by an encoder (e.g., encoder 200 in FIG. 2) or a decoder (e.g., decoder 300 in FIG. 3).

At step 2202, the encoder or decoder may determine, based on an indication of a prediction mode, flipping types for a plurality of block vector predictor (BVP) candidates. Each BVP candidate of the plurality of BVP candidates may indicate a displacement from a current block (CB) to a location in a reconstructed region. The flipping types may comprise horizontal flipping, vertical flipping, or no flipping.

At step 2204, the encoder or decoder may determine costs for the plurality of BVP candidates based on the flipping types. The costs may comprise template matching (TM) costs based on a difference between a template of a current block (CB) and a template of a reference block (RB) displaced from the CB by each respective BVP candidate of the plurality of BVP candidates. The TM costs may be based on the flipping types of each respective BVP candidate of the plurality of BVP candidates. The difference may be a sum of absolute differences (SAD). The encoder or decoder may reorder the plurality of BVP candidates based on the costs. The reordering may be performed, for example, before the determining the first cluster and the determining the second cluster.

At step 2206, the encoder or decoder may determine a first cluster comprising each BVP candidate, of the plurality of BVP candidates, with a distance from a first reference BVP candidate that may be less than or equal to a threshold. The encoder or decoder may determine that the first reference BVP candidate has a lowest cost of the costs of the plurality of BVP candidates. The distance may be an L2 distance between an endpoint of the first reference BVP candidate and an endpoint of each BVP candidate of the first cluster. The threshold may be a radius value, represented in units of pixels, of a circle centered at an endpoint of the first reference BVP candidate, and each BVP candidate of the first cluster may have an endpoint inside the circle. The radius value may comprise ⅛, ¼, ½, 1, 2, 3, 4, 5, 6, 7, 8, 12, 16, 20, 24, 28, 32, 36, 40, 44, 48, 52, 56, 60, and 64. The determining the first cluster may comprise determining that the first reference BVP candidate has a lowest cost of the costs of the plurality of BVP candidates.

At step 2208, the encoder or decoder may determine a second cluster comprising one or more BVP candidates, of the plurality of BVP candidates, not within the first cluster. The second cluster may comprise each BVP candidate, of the one or more BVP candidates not within the first cluster, having a second distance from a second reference BVD candidate that may be less than or equal to a second threshold. The second distance may be an L2 distance between an endpoint of the second reference BVP candidate and an endpoint of each BVP candidate of the second cluster. The second threshold may be a second radius value, represented in units of pixels, of a second circle centered at an endpoint of the second BVP candidate, and each BVP candidate of the second cluster may have an endpoint inside the second circle. The second radius value may comprise ⅛, ¼, ½, 1, 2, 3, 4, 5, 6, 7, 8, 12, 16, 20, 24, 28, 32, 36, 40, 44, 48, 52, 56, 60, and 64. The determining the second cluster may further comprise determining that the second reference BVD candidate has a lowest cost of the costs of each BVP candidate within the second cluster.

At step 2210, the encoder or decoder may select a first BVP candidate from the first cluster based on the costs of the BVP candidates in the first cluster. The selecting the first BVP candidate from the first cluster based on the costs of the BVP candidates in the first cluster may comprise selecting the first BVP candidate from the first cluster based on the first BVP candidate having a lowest cost of the costs of each BVP candidate within the first cluster.

At step 2212, the encoder or decoder may select a second BVP candidate from the second cluster based on the costs of the BVP candidates in the second cluster. The selecting the second BVP candidate from the second cluster based on the costs of the BVP candidates in the second cluster may comprise selecting the second BVP candidate from the second cluster based on the second BVP candidate having a lowest cost of the costs of each BVP candidate within the second cluster.

At step 2214, the encoder or decoder may insert, into a list of BVP candidates for the prediction mode, the selected first BVP candidate and the selected second BVP candidate. The inserting, into the list of BVP candidates, may comprise inserting an indication of the flipping type of each of the selected BVP candidates into the list of BVP candidates. The list of candidates may comprise an intra block copy (IBC) merge list or an advanced motion vector prediction (AMVP) list.

The method may include selecting, based on a flipping type of each BVP candidate in the list of BVP candidates, a BVP candidate from the list of BVP candidates for prediction of a current block (CB). The encoder or decoder may, based on the indication of the prediction mode, determine a respective prediction mode for each of the plurality of BVP candidates. The prediction mode may comprise intra block copy (IBC) merge mode, IBC template matching (TM) merge mode, IBC motion block vector difference (MBVD) merge code, or advanced motion vector prediction (AMVP) for IBC mode. The plurality of BVP candidates may comprise BVP candidates determined from two or more of the IBC merge mode, IBC TM merge mode, IBC MBVD merge mode, or AMVP for IBC mode.

The determining the respective prediction mode for each of the plurality of BVP candidates may, for example, be based on the flipping type of each of the plurality of BVP candidates. The inserting, into the list of BVP candidates for the prediction mode, may comprise inserting an indication of the prediction mode of each of the selected BVP candidates into the list of BVP candidates.

The method may include selecting, from the list of candidates, a BVP candidate for prediction of a current block (CB). The selecting may, for example, be based on a prediction cost of each BVP candidate within the list of candidates. The selecting may, for example, be based on the prediction mode and the flipping type of each BVP candidate within the list of candidates. The method may include signaling, in a bitstream, an index to the BVP candidate selected for prediction. The method may include signaling, in a bitstream, the indication of the prediction mode.

The encoder or decoder may determine a third cluster comprising each BVP candidate, of the one or more BVP candidates not within the first cluster and not within the second cluster, having a third distance from a third reference BVD candidate that may be less than or equal to a third threshold. The determining the third cluster may comprise determining that the third reference BVP candidate may have a lowest cost of the costs of each BVP candidate within the third cluster.

The encoder or decoder may determine that the list of BVP candidates may have a size less than a target number of BVP candidates, and may add, based on the costs, one or more BVP candidates from the plurality of BVP candidates other than the selected first BVP candidate and the selected second BVP candidate to the list of BVP candidates such that the size is equal to the target number of BVP candidates. The one or more BVP candidates may have lowest costs of the costs of the plurality of BVP candidates other than the selected first BVP candidate and the selected second BVP candidate. The target number of BVP candidates may comprise six BVP candidates for a merge list or two BVP candidates for an AMVP list.

The method may include receiving, in a bitstream, an indication of the prediction mode and an index indicating a BVP candidate, from the list of BVP candidates, for decoding a current block (CB), and decoding the CB based on the BVP candidate indicated by the index. The decoding the CB may comprise determining, based on the BVP candidate, a block vector (BV) indicating a displacement from the CB to a reference block (RB), and decoding the CB based on combining the RB with a residual received from the bitstream for the CB. The decoder may, for example, encode the current block. The encoder may, for example, decode the index to the BVP candidate and the indication of the prediction mode. The coder (e.g., encoder or decoder) may, for example, code the current block. The coder (e.g., encoder or decoder) may, for example, code the index to the BVP candidate and the indication of the prediction mode.

Figure 23:
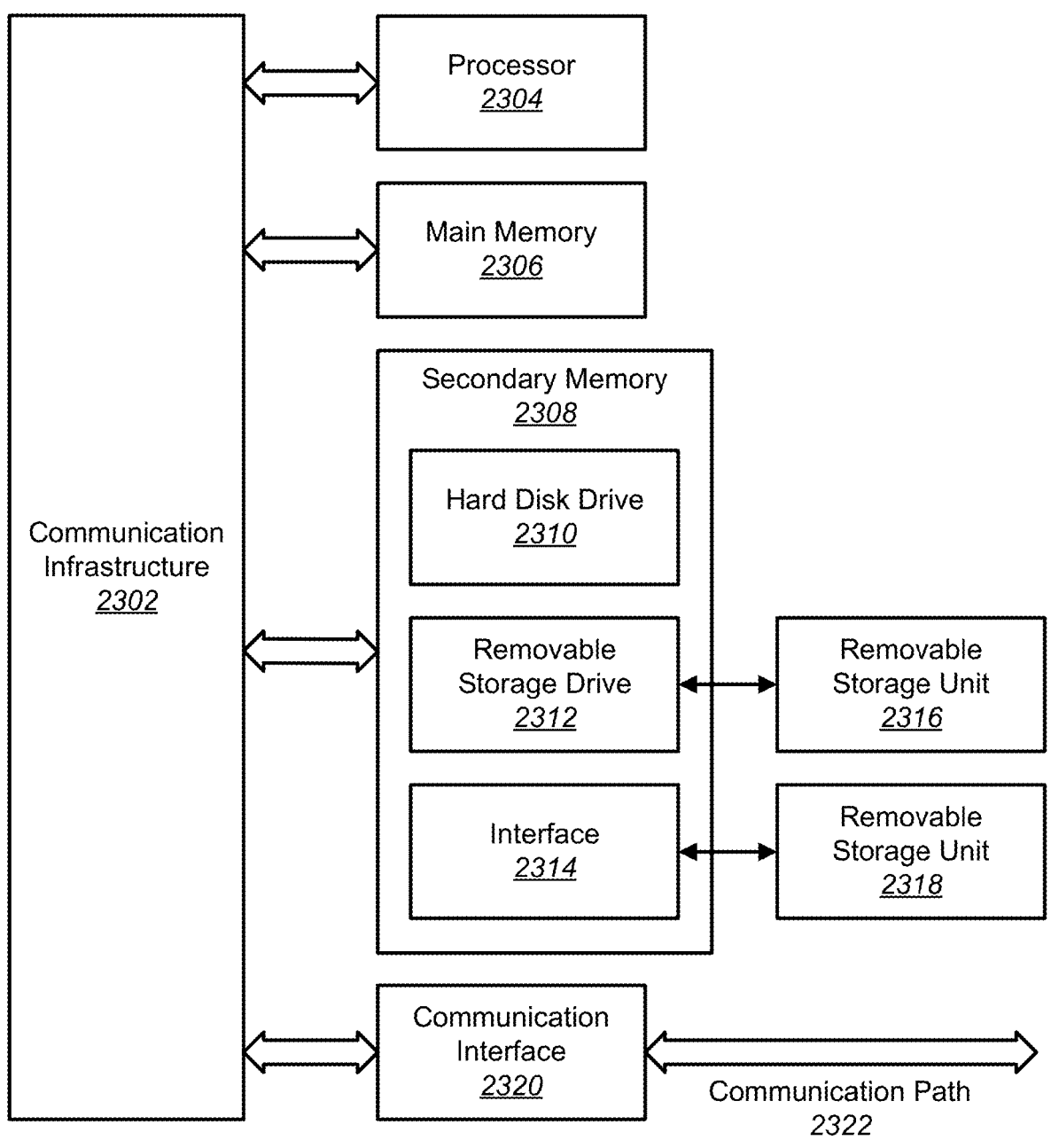
FIG. 23 shows a block diagram of an example computer system in which embodiments of the present disclosure may be implemented.

FIG. 23 shows an example computer system in which examples of the present disclosure may be implemented. For example, the example computer system 2300 shown in FIG. 23 may implement one or more of the methods described herein. For example, various devices and/or systems described herein (e.g., in FIGS. 1, 2, and 3) may be implemented in the form of one or more computer systems 2300. Furthermore, each of the steps of the flowcharts depicted in this disclosure may be implemented on one or more computer systems 2300.

The computer system 2300 may comprise one or more processors, such as a processor 2304. The processor 2304 may be a special purpose processor, a general purpose processor, a microprocessor, and/or a digital signal processor. The processor 2304 may be connected to a communication infrastructure 2302 (for example, a bus or network). The computer system 2300 may also comprise a main memory 2306 (e.g., a random access memory (RAM)), and/or a secondary memory 2308.

The secondary memory 2308 may comprise a hard disk drive 2310 and/or a removable storage drive 2312 (e.g., a magnetic tape drive, an optical disk drive, and/or the like). The removable storage drive 2312 may read from and/or write to a removable storage unit 2316. The removable storage unit 2316 may comprise a magnetic tape, optical disk, and/or the like. The removable storage unit 2316 may be read by and/or may be written to the removable storage drive 2312. The removable storage unit 2316 may comprise a computer usable storage medium having stored therein computer software and/or data.

The secondary memory 2308 may comprise other similar means for allowing computer programs or other instructions to be loaded into the computer system 2300. Such means may include a removable storage unit 2318 and/or an interface 2314. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 2318 and interfaces 2314 which may allow software and/or data to be transferred from the removable storage unit 2318 to the computer system 2300.

The computer system 2300 may also comprise a communications interface 2320. The communications interface 2320 may allow software and data to be transferred between the computer system 2300 and external devices. Examples of the communications interface 2320 may include a modem, a network interface (e.g., an Ethernet card), a communications port, etc. Software and/or data transferred via the communications interface 2320 may be in the form of signals which may be electronic, electromagnetic, optical, and/or other signals capable of being received by the communications interface 2320. The signals may be provided to the communications interface 2320 via a communications path 2322. The communications path 2322 may carry signals and may be implemented using wire or cable, fiber optics, a phone line, a cellular phone link, an RF link, and/or any other communications channel(s).

A computer program medium and/or a computer readable medium may be used to refer to tangible storage media, such as removable storage units 2316 and 2318 or a hard disk installed in the hard disk drive 2310. The computer program products may be means for providing software to the computer system 2300. The computer programs (which may also be called computer control logic) may be stored in the main memory 2306 and/or the secondary memory 2308. The computer programs may be received via the communications interface 2320. Such computer programs, when executed, may enable the computer system 2300 to implement the present disclosure as discussed herein. In particular, the computer programs, when executed, may enable the processor 2304 to implement the processes of the present disclosure, such as any of the methods described herein. Accordingly, such computer programs may represent controllers of the computer system 2300.

Figure 24:
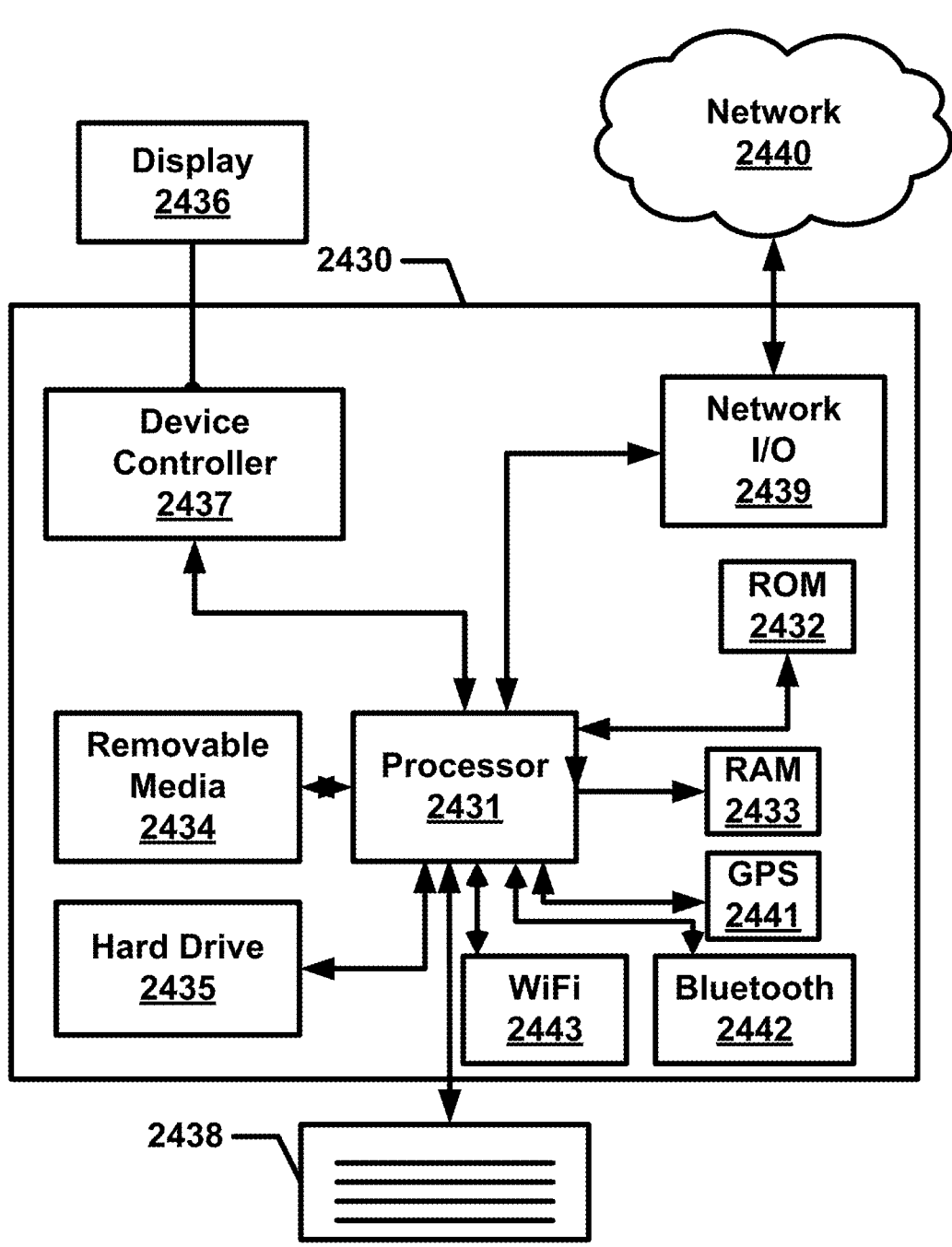
FIG. 24 shows example elements of a computing device that may be used to implement any of the various devices described herein.

FIG. 24 shows example elements of a computing device that may be used to implement any of the various devices described herein, including, for example, a source device (e.g., 102), an encoder (e.g., 200), a destination device (e.g., 106), a decoder (e.g., 300), and/or any computing device described herein. The computing device 2430 may include one or more processors 2431, which may execute instructions stored in the random-access memory (RAM) 2433, the removable media 2434 (such as a Universal Serial Bus (USB) drive, compact disk (CD) or digital versatile disk (DVD), or floppy disk drive), or any other desired storage medium. Instructions may also be stored in an attached (or internal) hard drive 2435. The computing device 2430 may also include a security processor (not shown), which may execute instructions of one or more computer programs to monitor the processes executing on the processor 2431 and any process that requests access to any hardware and/or software components of the computing device 2430 (e.g., ROM 2432, RAM 2433, the removable media 2434, the hard drive 2435, the device controller 2437, a network interface 2439, a GPS 2441, a Bluetooth interface 2442, a WiFi interface 2443, etc.). The computing device 2430 may include one or more output devices, such as the display 2436 (e.g., a screen, a display device, a monitor, a television, etc.), and may include one or more output device controllers 2437, such as a video processor. There may also be one or more user input devices 2438, such as a remote control, keyboard, mouse, touch screen, microphone, etc. The computing device 2430 may also include one or more network interfaces, such as a network interface 2439, which may be a wired interface, a wireless interface, or a combination of the two. The network interface 2439 may provide an interface for the computing device 2430 to communicate with a network 2440 (e.g., a RAN, or any other network). The network interface 2439 may include a modem (e.g., a cable modem), and the external network 2440 may include communication links, an external network, an in-home network, a provider's wireless, coaxial, fiber, or hybrid fiber/coaxial distribution system (e.g., a DOCSIS network), or any other desired network. Additionally, the computing device 2430 may include a location-detecting device, such as a global positioning system (GPS) microprocessor 2441, which may be configured to receive and process global positioning signals and determine, with possible assistance from an external server and antenna, a geographic position of the computing device 2430.

The example in FIG. 24 may be a hardware configuration, although the components shown may be implemented as software as well. Modifications may be made to add, remove, combine, divide, etc. components of the computing device 2430 as desired. Additionally, the components may be implemented using basic computing devices and components, and the same components (e.g., processor 2431, ROM storage 2432, display 2436, etc.) may be used to implement any of the other computing devices and components described herein. For example, the various components described herein may be implemented using computing devices having components such as a processor executing computer-executable instructions stored on a computer-readable medium, as shown in FIG. 24. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may determine, based on an indication of a prediction mode, flipping types for a plurality of block vector predictor (BVP) candidates. The computing device may determine, based on an indication of a prediction mode, flipping types for a plurality of block vector predictor (BVP) candidates. The computing device may determine, based on the flipping types, costs for the plurality of BVP candidates. The computing device may receive, in a bitstream, an index indicating a BVP candidate, from a list of BVP candidates, for decoding a current block (CB) of content. The computing device may determine, based on the BVP candidate, a block vector (BV) indicating a displacement from the CB to a reference block (RB). The computing device may decode the CB based on: the BVP candidate indicated by the index; and combining the RB with a residual associated with the CB. The computing device may receive the residual in the bitstream and the residual may indicate a difference between the CB and the RB. The computing device may select, based on the costs of the BVP candidates in a first cluster, a first BVP candidate from the first cluster; select, based on the costs of the BVP candidates in a second cluster, a second BVP candidate from the second cluster; and insert, into the list of BVP candidates for a prediction mode, the first BVP candidate and the second BVP candidate; wherein the inserting the first BVP candidate and the second BVP candidate further comprises at least one of: inserting an indication of the flipping types of the first BVP candidate and the second BVP candidate into the list of BVP candidates; and inserting an indication of the prediction mode of the first BVP candidate and the second BVP candidate into the list of BVP candidates. The computing device may determine that the list of BVP candidates has a size less than a target number of BVP candidates; and may add, based on the costs, one or more BVP candidates from the plurality of BVP candidates, other than the selected first BVP candidate and the selected second BVP candidate, to the list of BVP candidates such that the size is equal to the target number of BVP candidates. The computing device may determine, based on the indication of the prediction mode, a respective prediction mode for each of the plurality of BVP candidates, wherein the prediction mode comprises at least one of: intra block copy (IBC) merge mode, IBC template matching (TM) merge mode, IBC motion block vector difference (MBVD) merge code, or advanced motion vector prediction (AMVP) for IBC mode, and wherein the determining the respective prediction mode for each of the plurality of BVP candidates is further based on the flipping types of each of the plurality of BVP candidates; wherein the costs for the plurality of BVP candidates comprise template matching (TM) costs based on a difference between a template of the current block (CB)

and a template of a reference block (RB), flipped in the direction of the flipping type, displaced from the CB by each respective BVP candidate of the plurality of BVP candidates. The computing device may reorder the plurality of BVP candidates based on the costs. The computing device may select, based on the flipping type for each BVP candidate in the list of BVP candidates, a BVP candidate from the list of BVP candidates for prediction of a current block (CB); wherein each BVP candidate of the plurality of BVP candidates indicates a displacement from the current block (CB) to a location in a reconstructed region. The computing device may comprise one or more processors; and memory storing instructions that, if executed by the one or more processors, cause the computing device to perform the described method, additional operations and/or include the additional elements. A system may comprise a first computing device configured to perform the described method, additional operations and/or include the additional elements; and a second computing device configured to encode the current block. A computer-readable medium may store instructions that, if executed, cause performance of the described method, additional operations and/or include the additional elements.

A computing device may perform a method comprising multiple operations. The computing device may determine, based on an indication of a prediction mode, flipping types for a plurality of block vector predictor (BVP) candidates. The computing device may determine, based on the flipping types, costs for the plurality of BVP candidates. The computing device may determine a first cluster comprising each BVP candidate, of the plurality of BVP candidates, with a distance from a first reference BVP candidate that is less than or equal to a threshold. The computing device may determine a second cluster comprising one or more BVP candidates, of the plurality of BVP candidates. The computing device may select, based on the costs of the BVP candidates in the first cluster, a first BVP candidate from the first cluster. The computing device may select, based on the costs of the BVP candidates in the second cluster, a second BVP candidate from the second cluster. The computing device may insert, into a list of BVP candidates for the prediction mode, the first BVP candidate and the second BVP candidate. The computing device may determine that the first reference BVP candidate has a lowest cost of costs for the plurality of BVP candidates; wherein the threshold is a radius value of a circle centered at an endpoint of the first reference BVP candidate; and each BVP candidate of the first cluster has an endpoint inside the circle. The computing device may determine a third cluster comprising each BVP candidate, of one or more BVP candidates not within the first cluster and not within the second cluster, having a third distance from a third reference BVP candidate that is less than or equal to a third threshold, wherein the determining the third cluster further comprises determining that the third reference BVP candidate has a lowest cost of the costs of each BVP candidate within the third cluster. The computing device may determine that the list of BVP candidates has a size less than a target number of BVP candidates. The computing device may add, based on the costs, one or more BVP candidates from the plurality of BVP candidates, other than the selected first BVP candidate and the selected second BVP candidate, to the list of BVP candidates such that the size is equal to the target number of BVP candidates. The computing device may select, from the list of BVP candidates, a BVP candidate, for prediction of a current block (CB) of content, based on: a prediction cost, the prediction mode, or the flipping types of each BVP candidate within the list of candidates. The computing device may encode, in a bitstream, an index to the BVP candidate selected for prediction and the indication of the prediction mode. The computing device may receive, in a bitstream, an indication of the prediction mode and an index indicating a BVP candidate, from the list of BVP candidates, for decoding a current block (CB) of content, determining, based on the BVP candidate, a block vector (BV) indicating a displacement from the CB to a reference block (RB), and decode the CB based on the BVP candidate indicated by the index and based on combining the RB with a residual received from the bitstream for the CB. The computing device may comprise one or more processors; and memory storing instructions that, if executed by the one or more processors, cause the computing device to perform the described method, additional operations and/or include the additional elements. A system may comprise a first computing device configured to perform the described method, additional operations and/or include the additional elements; and a second computing device configured to code the current block. A computer-readable medium may store instructions that, if executed, cause performance of the described method, additional operations and/or include the additional elements.

A computing device may perform a method comprising multiple operations. The computing device may determine, based on flipping types, costs for a plurality of BVP candidates. The computing device may select a first BVP candidate based on the costs of the BVP candidates in a first cluster. The computing device may select a second BVP candidate based on the costs of the BVP candidates in a second cluster. The computing device may insert, into a list of BVP candidates for a prediction mode, the first BVP candidate and the second BVP candidate. The computing device may select, from the list of candidates, a BVP candidate for prediction of a current block (CB) of content, based on a prediction cost, the prediction mode, or the flipping types of each BVP candidate within the list of candidates. The computing device may encode, in a bitstream, an index to the BVP candidate selected for prediction and an indication of the prediction mode. The computing device may determine, based on the indication of the prediction mode, the flipping types for a plurality of block vector predictor (BVP) candidates; determine the first cluster comprising each BVP candidate, of the plurality of BVP candidates, with a distance from a first reference BVP candidate that is less than or equal to a threshold; and determine the second cluster comprising one or more BVP candidates, of the plurality of BVP candidates, wherein the inserting, into the list of BVP candidates, further comprises inserting an indication of the flipping types of the first BVP candidate and the second BVP candidate into the list of BVP candidates, and inserting an indication of the prediction mode of the first BVP candidate and the second BVP candidate into the list of BVP candidates, wherein the costs for the plurality of BVP candidates comprise template matching (TM) costs based on a difference between a template of the current block (CB) and a template of a reference block (RB), flipped in the direction of the flipping type, displaced from the CB by each respective BVP candidate of the plurality of BVP candidates, and wherein the method further comprises: reordering the plurality of BVP candidates based on the costs, wherein the list of candidates comprises an intra block copy (IBC) merge list or an advanced motion vector prediction (AMVP) list. The computing device may comprise one or more processors; and memory storing instructions that, if executed by the one or more processors, cause the computing device to perform the described method, additional operations and/or include the additional elements. A system may comprise a first computing device configured to perform the described method, additional operations and/or include the additional elements; and a second computing device configured to decode the index to the BVP candidate and the indication of the prediction mode. A computer-readable medium may store instructions that, if executed, cause performance of the described method, additional operations and/or include the additional elements.

A computing device may perform a method comprising multiple operations. The computing device may determine, based on an indication of a prediction mode, flipping types for a plurality of block vector predictor (BVP) candidates. The computing device may determine costs for the plurality of BVP candidates based on the flipping types. The computing device may determine a first cluster comprising each BVP candidate, of the plurality of BVP candidates, with a distance from a first reference BVP candidate that is less than or equal to a threshold. The computing device may determine a second cluster comprising one or more BVP candidates, of the plurality of BVP candidates, not within the first cluster. The computing device may select a first BVP candidate from the first cluster based on the costs of the BVP candidates in the first cluster. The computing device may select a second BVP candidate from the second cluster based on the costs of the BVP candidates in the second cluster. The computing device may insert, into a list of BVP candidates for the prediction mode, the selected first BVP candidate and the selected second BVP candidate, wherein the inserting, into the list of BVP candidates, further comprises inserting an indication of the flipping type of each of the selected BVP candidates into the list of BVP candidates. The computing device may select, based on a flipping type of each BVP candidate in the list of BVP candidates, a BVP candidate from the list of BVP candidates for prediction of a current block (CB). The computing device may, based on the indication of the prediction mode, determine a respective prediction mode for each of the plurality of BVP candidates, wherein the prediction mode comprises intra block copy (IBC) merge mode, IBC template matching (TM) merge mode, IBC motion block vector difference (MBVD) merge code, or advanced motion vector prediction (AMVP) for IBC mode, wherein the plurality of BVP candidates comprise BVP candidates determined from two or more of the IBC merge mode, IBC TM merge mode, IBC MBVD merge mode, or AMVP for IBC mode; wherein the determining the respective prediction mode for each of the plurality of BVP candidates is further based on the flipping type of each of the plurality of BVP candidates; and wherein the inserting, into the list of BVP candidates for the prediction mode, further comprises inserting an indication of the prediction mode of each of the selected BVP candidates into the list of BVP candidates. The computing device may determine that the first reference BVP candidate has a lowest cost of the costs of the plurality of BVP candidates, wherein the distance is an L2 distance between an endpoint of the first reference BVP candidate and an endpoint of each BVP candidate of the first cluster; wherein: the threshold is a radius value, represented in units of pixels, of a circle centered at an endpoint of the first reference BVP candidate; and each BVP candidate of the first cluster has an endpoint inside the circle; wherein the radius value comprises: ⅛, ¼, ½, 1, 2, 3, 4, 5, 6, 7, 8, 12, 16, 20, 24, 28, 32, 36, 40, 44, 48, 52, 56, 60, and 64; wherein each BVP candidate of the plurality of BVP candidates indicates a displacement from a current block (CB) to a location in a reconstructed region; wherein the second cluster further comprises each BVP candidate, of the one or more BVP candidates not within the first cluster, having a second distance from a second reference BVD candidate that is less than or equal to a second threshold; wherein the second distance is an L2 distance between an endpoint of the second reference BVP candidate and an endpoint of each BVP candidate of the second cluster; wherein: the second threshold is a second radius value, represented in units of pixels, of a second circle centered at an endpoint of the second BVP candidate; and each BVP candidate of the second cluster has an endpoint inside the second circle; wherein the second radius value comprises: ⅛, ¼, ½, 1, 2, 3, 4, 5, 6, 7, 8, 12, 16, 20, 24, 28, 32, 36, 40, 44, 48, 52, 56, 60, and 64; wherein the costs comprise template matching (TM) costs based on a difference between a template of a current block (CB) and a template of a reference block (RB), flipped in the direction of the flipping type, displaced from the CB by each respective BVP candidate of the plurality of BVP candidates; wherein the TM costs are further based on the flipping types of each respective BVP candidate of the plurality of BVP candidates; wherein the difference is a sum of absolute differences (SAD). The computing device may reorder the plurality of BVP candidates based on the costs, wherein the reordering is before the determining the first cluster and the determining the second cluster; wherein the determining the first cluster further comprises determining that the first reference BVP candidate has a lowest cost of the costs of the plurality of BVP candidates; wherein the selecting the first BVP candidate from the first cluster based on the costs of the BVP candidates in the first cluster further comprises selecting the first BVP candidate from the first cluster based on the first BVP candidate having a lowest cost of the costs of each BVP candidate within the first cluster; wherein the determining the second cluster further comprises determining that the second reference BVD candidate has a lowest cost of the costs of each BVP candidate within the second cluster; wherein the selecting the second BVP candidate from the second cluster based on the costs of the BVP candidates in the second cluster further comprises selecting the second BVP candidate from the second cluster based on the second BVP candidate having a lowest cost of the costs of each BVP candidate within the second cluster; wherein the flipping types comprise horizontal flipping, vertical flipping, or no flipping; wherein the list of candidates comprises an intra block copy (IBC) merge list or an advanced motion vector prediction (AMVP) list. The computing device may select, from the list of candidates, a BVP candidate for prediction of a current block (CB), wherein the selecting is further based on a prediction cost of each BVP candidate within the list of candidates, wherein the selecting is further based on the prediction mode and the flipping type of each BVP candidate within the list of candidates. The computing device may encode, in a bitstream, an index to the BVP candidate selected for prediction. The computing device may encode, in a bitstream, the indication of the prediction mode. The computing device may determine a third cluster comprising each BVP candidate, of the one or more BVP candidates not within the first cluster and not within the second cluster, having a third distance from a third reference BVD candidate that is less than or equal to a third threshold, wherein the determining the third cluster further comprises determining that the third reference BVP candidate has a lowest cost of the costs of each BVP candidate within the third cluster. The computing device may determine that the list of BVP candidates has a size less than a target number of BVP candidates; and may add, based on the costs, one or more BVP candidates from the plurality of BVP candidates other than the selected first BVP candidate and the selected second BVP candidate to the list of BVP candidates such that the size is equal to the target number of BVP candidates; wherein the one or more BVP candidates have lowest costs of the costs of the plurality of BVP candidates other than the selected first BVP candidate and the selected second BVP candidate; wherein the target number of BVP candidates comprises six BVP candidates for a merge list or two BVP candidates for an AMVP list. The computing device may receive, in a bitstream, an indication of the prediction mode and an index indicating a BVP candidate, from the list of BVP candidates, for decoding a current block (CB) and may decode the CB based on the BVP candidate indicated by the index, wherein the decoding the CB further comprises: determining, based on the BVP candidate, a block vector (BV) indicating a displacement from the CB to a reference block (RB); and decoding the CB based on combining the RB with a residual received from the bitstream for the CB. The computing device may comprise one or more processors; and memory storing instructions that, if executed by the one or more processors, cause the computing device to perform the described method, additional operations and/or include the additional elements. A system may comprise a first computing device configured to perform the described method, additional operations and/or include the additional elements; and a second computing device configured to code the current block. A computer-readable medium may store instructions that, if executed, cause performance of the described method, additional operations and/or include the additional elements.

A computing device may perform a method comprising multiple operations. The computing device may determine, based on an indication of a prediction mode, flipping types for a plurality of block vector predictor (BVP) candidates. The computing device may determine, based on the flipping types, costs for the plurality of BVP candidates. The computing device may receive, in a bitstream, an index indicating a BVP candidate, from a list of BVP candidates, for decoding a current block (CB) of content. The computing device may determine, based on the BVP candidate, a block vector (BV) indicating a displacement from the CB to a reference block (RB). The computing device may decode the CB based on: the BVP candidate indicated by the index; and combining the RB with a residual associated with the CB. The computing device may receive the residual in the bitstream and the residual may indicate a difference between the CB and the RB. The computing device may determine a first cluster comprising each BVP candidate, of the plurality of BVP candidates, with a distance from a first reference BVP candidate that is less than or equal to a threshold. The computing device may determine a second cluster comprising one or more BVP candidates, of the plurality of BVP candidates. The computing device may determine that the first reference BVP candidate has a lowest cost of the costs for the plurality of BVP candidates. The computing device may select, based on the costs of the BVP candidates in a first cluster, a first BVP candidate from the first cluster. The computing device may select, based on the costs of the BVP candidates in a second cluster, a second BVP candidate from the second cluster. The computing device may insert, into the list of BVP candidates for a prediction mode, the first BVP candidate and the second BVP candidate, wherein inserting the first BVP candidate and the second BVP candidate further comprises at least one of: inserting an indication of the flipping types of the first BVP candidate and the second BVP candidate into the list of BVP candidates; and inserting an indication of the prediction mode of the first BVP candidate and the second BVP candidate into the list of BVP candidates. The computing device may determine that the list of BVP candidates has a size less than a target number of BVP candidates. The computing device may add, based on the costs, one or more BVP candidates from the plurality of BVP candidates, other than the selected first BVP candidate and the selected second BVP candidate, to the list of BVP candidates such that the size is equal to the target number of BVP candidates. The computing device may determine, based on the indication of the prediction mode, a respective prediction mode for each of the plurality of BVP candidates, wherein the prediction mode comprises at least one of: intra block copy (IBC) merge mode, IBC template matching (TM) merge mode, IBC motion block vector difference (MBVD) merge code, or advanced motion vector prediction (AMVP) for IBC mode, and wherein the determining the respective prediction mode for each of the plurality of BVP candidates is further based on the flipping types of each of the plurality of BVP candidates; wherein the costs for the plurality of BVP candidates comprise template matching (TM) costs based on a difference between a template of the current block (CB) and a template of a reference block (RB), flipped in the direction of the flipping type, displaced from the CB by each respective BVP candidate of the plurality of BVP candidates, and wherein the method further comprises: reordering the plurality of BVP candidates based on the costs. The computing device may select, based on the flipping type for each BVP candidate in the list of BVP candidates, a BVP candidate from the list of BVP candidates for prediction of a current block (CB), wherein each BVP candidate of the plurality of BVP candidates indicates a displacement from the current block (CB) to a location in a reconstructed region, wherein: the threshold is a radius value of a circle centered at an endpoint of the first reference BVP candidate; and each BVP candidate of the first cluster has an endpoint inside the circle. The computing device may determine a third cluster comprising each BVP candidate, of one or more BVP candidates not within the first cluster and not within the second cluster, having a third distance from a third reference BVP candidate that is less than or equal to a third threshold, wherein determining the third cluster further comprises determining that the third reference BVP candidate has a lowest cost of the costs of each BVP candidate within the third cluster. The computing device may select, from the list of BVP candidates, a BVP candidate, for prediction of a current block (CB) of content, based on: a prediction cost, the prediction mode, or the flipping types of each BVP candidate within the list of candidates. The computing device may encode, in a bitstream, an index to the BVP candidate selected for prediction and the indication of the prediction mode. The computing device may comprise one or more processors; and memory storing instructions that, if executed by the one or more processors, cause the computing device to perform the described method, additional operations and/or include the additional elements. A system may comprise a first computing device configured to perform the described method, additional operations and/or include the additional elements; and a second computing device configured to encode the current block. A computer-readable medium may store instructions that, if executed, cause performance of the described method, additional operations and/or include the additional elements.

A computing device may perform a method comprising multiple operations. The computing device may determine, based on an indication of a prediction mode, flipping types for a plurality of block vector predictor (BVP) candidates. The computing device may determine, based on the flipping types, costs for the plurality of BVP candidates. The computing device may receive, in a bitstream, an index indicating a BVP candidate, from a list of BVP candidates, for decoding a current block (CB) of content. The computing device may determine, based on the BVP candidate, a block vector (BV) indicating a displacement from the CB to a reference block (RB). The computing device may decode the CB based on: the BVP candidate indicated by the index; and combining the RB with a residual associated with the CB. The computing device may receive the residual in the bitstream and the residual may indicate a difference between the CB and the RB. The computing device may select, based on the costs of the BVP candidates in a first cluster, a first BVP candidate from the first cluster. The computing device may select, based on the costs of the BVP candidates in a second cluster, a second BVP candidate from the second cluster. The computing device may insert, into the list of BVP candidates for a prediction mode, the first BVP candidate and the second BVP candidate. The computing device may insert an indication of the flipping types of the first BVP candidate and the second BVP candidate into the list of BVP candidates. The computing device may insert an indication of the prediction mode of the first BVP candidate and the second BVP candidate into the list of BVP candidates. The computing device may determine that the list of BVP candidates has a size less than a target number of BVP candidates. The computing device may add, based on the costs, one or more BVP candidates from the plurality of BVP candidates, other than the selected first BVP candidate and the selected second BVP candidate, to the list of BVP candidates such that the size is equal to the target number of BVP candidates. The computing device may determine, based on the indication of the prediction mode, a respective prediction mode for each of the plurality of BVP candidates, wherein the prediction mode comprises at least one of: intra block copy (IBC) merge mode, IBC template matching (TM) merge mode, IBC motion block vector difference (MBVD) merge code, or advanced motion vector prediction (AMVP) for IBC mode, and wherein the determining the respective prediction mode for each of the plurality of BVP candidates is further based on the flipping types of each of the plurality of BVP candidates; wherein the costs for the plurality of BVP candidates comprise template matching (TM) costs based on a difference between a template of the current block (CB) and a template of a reference block (RB), flipped in the direction of the flipping type, displaced from the CB by each respective BVP candidate of the plurality of BVP candidates, and wherein the method further comprises: reordering the plurality of BVP candidates based on the costs. The computing device may select, based on the flipping type for each BVP candidate in the list of BVP candidates, a BVP candidate from the list of BVP candidates for prediction of a current block (CB). The computing device may comprise one or more processors; and memory storing instructions that, if executed by the one or more processors, cause the computing device to perform the described method, additional operations and/or include the additional elements. A system may comprise a first computing device configured to perform the described method, additional operations and/or include the additional elements; and a second computing device configured to encode the current block. A computer-readable medium may store instructions that, if executed, cause performance of the described method, additional operations and/or include the additional elements.

A computing device may perform a method comprising multiple operations. The computing device may determine, based on flipping types, costs for a plurality of BVP candidates. The computing device may select a first BVP candidate based on the costs of the BVP candidates in a first cluster. The computing device may select a second BVP candidate based on the costs of the BVP candidates in a second cluster. The computing device may insert, into a list of BVP candidates for a prediction mode, the first BVP candidate and the second BVP candidate. The computing device may select, from the list of candidates, a BVP candidate for prediction of a current block (CB) of content, based on a prediction cost, the prediction mode, or the flipping types of each BVP candidate within the list of candidates. The computing device may encode, in a bitstream, an index to the BVP candidate selected for prediction and an indication of the prediction mode. The computing device may determine, based on the indication of the prediction mode, the flipping types for a plurality of block vector predictor (BVP) candidates. The computing device may determine the first cluster comprising each BVP candidate, of the plurality of BVP candidates, with a distance from a first reference BVP candidate that is less than or equal to a threshold. The computing device may determine the second cluster comprising one or more BVP candidates, of the plurality of BVP candidates. The computing device may insert an indication of the flipping types of the first BVP candidate and the second BVP candidate into the list of BVP candidates, and inserting an indication of the prediction mode of the first BVP candidate and the second BVP candidate into the list of BVP candidates; wherein the costs for the plurality of BVP candidates comprise template matching (TM) costs based on a difference between a template of the current block (CB) and a template of a reference block (RB), flipped in the direction of the flipping type, displaced from the CB by each respective BVP candidate of the plurality of BVP candidates, and wherein the method further comprises: reordering the plurality of BVP candidates based on the costs; wherein the list of candidates comprises an intra block copy (IBC) merge list or an advanced motion vector prediction (AMVP) list. The computing device may determine that a first reference BVP candidate has a lowest cost of the costs for the plurality of BVP candidates; wherein the threshold is a radius value of a circle centered at an endpoint of the first reference BVP candidate; and each BVP candidate of the first cluster has an endpoint inside the circle. The computing device may comprise one or more processors; and memory storing instructions that, if executed by the one or more processors, cause the computing device to perform the described method, additional operations and/or include the additional elements. A system may comprise a first computing device configured to perform the described method, additional operations and/or include the additional elements; and a second computing device configured to decode the index to the BVP candidate and the indication of the prediction mode. A computer-readable medium may store instructions that, if executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
determining, by a computing device and based on one or more indications of prediction modes for a plurality of block vector predictor (BVP) candidates, flipping types for the plurality of BVP candidates;
determining, for the plurality of BVP candidates, template matching costs between:
a template of a current block (CB) of content; and
templates, of reference blocks (RBs), based on the flipping types for the plurality of BVP candidates;
determining, based on the template matching costs, a list of BVP candidates;
receiving, in a bitstream, an index indicating a BVP candidate, from the list of BVP candidates, for decoding the CB;
determining, based on the BVP candidate indicated by the index, a block vector (BV) indicating a displacement from the CB to a reference block (RB); and
decoding the CB based on:
the BVP; and
combining the RB with a residual associated with the CB.

2. The method of claim 1, further comprising:
based on the template matching costs of BVP candidates, of the plurality of BVP candidates, in a first cluster, selecting a first BVP candidate from the first cluster;
based on the template matching costs of the BVP candidates, of the plurality of BVP candidates, in a second cluster, selecting a second BVP candidate from the second cluster; and
inserting, into the list of BVP candidates for a prediction mode, the first BVP candidate and the second BVP candidate.

3. The method of claim 2, wherein the inserting the first BVP candidate and the second BVP candidate further comprises at least one of:
inserting indications of the flipping types of the first BVP candidate and the second BVP candidate into the list of BVP candidates; and
inserting an indication of the prediction mode of the first BVP candidate and the second BVP candidate into the list of BVP candidates.

4. The method of claim 2, further comprising:
determining that the list of BVP candidates has a size less than a target number of BVP candidates; and
adding, based on the template matching costs, one or more BVP candidates from the plurality of BVP candidates, other than the selected first BVP candidate and the selected second BVP candidate, to the list of BVP candidates such that the size is equal to the target number of BVP candidates.

5. The method of claim 1, further comprising:
determining, based on the one or more indications of the prediction modes, a respective prediction mode for each of the plurality of BVP candidates,
wherein the respective prediction mode comprises at least one of:
intra block copy (IBC) merge mode,
IBC template matching (TM) merge mode,
IBC motion block vector difference (MBVD) merge code, or
advanced motion vector prediction (AMVP) for IBC mode, and
wherein the determining the respective prediction mode for each of the plurality of BVP candidates is further based on the flipping types of each of the plurality of BVP candidates.

6. The method of claim 1, wherein each template matching cost, of the template matching costs, for a corresponding BVP candidate of the plurality of BVP candidates is based on a difference between:
a template of the CB, and
a template, of a RB of the RBs, flipped according to a flipping type for the corresponding BVP candidate, and displaced from the CB by the corresponding BVP candidate, and
wherein the method further comprises:
reordering the plurality of BVP candidates based on the template matching costs.

7. The method of claim 1, further comprising:
selecting, based on flipping types for BVP candidates in the list of BVP candidates, a BVP candidate from the list of BVP candidates for prediction of the CB.

8. The method of claim 1, wherein the residual is received in the bitstream and indicates a difference between the CB and the RB.

9. A method comprising:
determining, by a computing device and based on one or more indications of prediction modes for a plurality of block vector predictor (BVP) candidates, flipping types for the plurality of BVP candidates;
determining, for the plurality of BVP candidates, template matching costs between:
a template of a current block (CB) of content, and
templates, of reference blocks (RBs) of the content, based on the flipping types for the plurality of BVP candidates;
determining a first cluster comprising each BVP candidate, of the plurality of BVP candidates, with a distance from a first reference BVP candidate that is less than or equal to a threshold;
determining a second cluster comprising one or more BVP candidates, of the plurality of BVP candidates;
selecting, based on the template matching costs of the BVP candidates in the first cluster, a first BVP candidate from the first cluster;
selecting, based on the template matching costs of the BVP candidates in the second cluster, a second BVP candidate from the second cluster; and
inserting, into a list of BVP candidates for a prediction mode, the first BVP candidate and the second BVP candidate.

10. The method of claim 9, further comprising:
determining that the first reference BVP candidate has a lowest template matching cost of the template matching costs for the plurality of BVP candidates.

11. The method of claim 9, wherein:
the threshold is a radius value of a circle centered at an endpoint of the first reference BVP candidate; and each BVP candidate of the first cluster has an endpoint inside the circle.

12. The method of claim 9, further comprising:

determining a third cluster comprising each BVP candidate, of one or more BVP candidates not within the first cluster and not within the second cluster, having a third distance from a third reference BVP candidate that is less than or equal to a third threshold, wherein the determining the third cluster further comprises determining that the third reference BVP candidate has a lowest template matching cost of one or more template matching costs of one or more BVP candidates within the third cluster.

13. The method of claim 9, further comprising:

determining that the list of BVP candidates has a size less than a target number of BVP candidates; and adding, based on the template matching costs, one or more BVP candidates from the plurality of BVP candidates, other than the selected first BVP candidate and the selected second BVP candidate, to the list of BVP candidates such that the size is equal to the target number of BVP candidates.

14. The method of claim 9, further comprising selecting, from the list of BVP candidates, a BVP candidate, for prediction of a current block (CB) of content, based on:

a prediction cost, the prediction mode, or flipping types for the BVP candidates within the list of BVP candidates; and encoding, in a bitstream, an index to the BVP candidate selected for prediction and an indication of the prediction mode.

15. The method of claim 9, further comprising:

receiving, in a bitstream, an indication of the prediction mode and an index indicating a BVP candidate, from the list of BVP candidates, for decoding a current block (CB) of content;

determining, based on the BVP candidate, a block vector (BV) indicating a displacement from the CB to a reference block (RB); and decoding the CB based on the BVP candidate indicated by the index and based on combining the RB with a residual received from the bitstream for the CB.

16. A method comprising:

determining, by a computing device and for a plurality of block vector predictor (BVP) candidates, template matching costs between:

a template of a current block (CB) of content, and templates, of reference blocks (RBs), based on flipping types for the plurality of BVP candidates;

selecting a first BVP candidate based on the template matching costs of the BVP candidates in a first cluster;

selecting a second BVP candidate based on the template matching costs of the BVP candidates in a second cluster;

inserting, into a list of BVP candidates for a prediction mode, the first BVP candidate and the second BVP candidate;

selecting, from the list of BVP candidates, a BVP candidate for prediction of the CB, wherein the selecting the BVP candidate is based on a prediction cost, the prediction mode, or flipping types for BVP candidates within the list of BVP candidates; and encoding, in a bitstream, an index to the BVP candidate selected for prediction and an indication of the prediction mode.

17. The method of claim 16, further comprising:

determining, based on the indication of the prediction mode, the flipping types for the plurality of BVP candidates;

determining the first cluster comprising each BVP candidate, of the plurality of BVP candidates, with a distance from a first reference BVP candidate that is less than or equal to a threshold; and determining the second cluster comprising one or more BVP candidates, of the plurality of BVP candidates, with a difference from the first reference BVP candidate that is greater than the threshold.

18. The method of claim 16, wherein the inserting, into the list of BVP candidates, further comprises:

inserting one or more indications of a flipping type of for the first BVP candidate and of a flipping type for the second BVP candidate into the list of BVP candidates; and inserting an indication of the prediction mode of the first BVP candidate and the second BVP candidate into the list of BVP candidates.

19. The method of claim 16, wherein each template matching cost, of the template matching costs, for a corresponding BVP candidate, of the plurality of BVP candidates, is based on a difference between:

a template of the CB, and a template of a RB, of the RBs, flipped according to a flipping type for the corresponding BVP candidate, and displaced from the CB by the corresponding BVP candidate, and wherein the method further comprises:

reordering the plurality of BVP candidates based on the template matching costs.

20. The method of claim 16, wherein the list of BVP candidates comprises an intra block copy (IBC) merge list or an advanced motion vector prediction (AMVP) list.

\* \* \* \* \*